United States Patent
Sekiguchi et al.

(10) Patent No.: US 9,336,019 B2
(45) Date of Patent: May 10, 2016

(54) INFORMATION PROCESSING APPARATUS AND METHOD THEREFOR

(71) Applicant: FUJITSU LIMITED, Kawasaki-shi, Kanagawa (JP)

(72) Inventors: Atsuji Sekiguchi, Kawasaki (JP); Masazumi Matsubara, Yamato (JP); Yuji Wada, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 323 days.

(21) Appl. No.: 14/020,159

(22) Filed: Sep. 6, 2013

(65) Prior Publication Data

US 2014/0013099 A1    Jan. 9, 2014

Related U.S. Application Data

(63) Continuation of application No. PCT/JP2011/055765, filed on Mar. 11, 2011.

(51) Int. Cl.
*H04L 12/24* (2006.01)
*G06F 9/445* (2006.01)
*G06F 9/44* (2006.01)

(52) U.S. Cl.
CPC ........ *G06F 9/44505* (2013.01); *H04L 41/0803* (2013.01); *H04L 41/0843* (2013.01); *G06F 8/71* (2013.01)

(58) Field of Classification Search
CPC .................. H04L 41/0803; H04L 41/0843
See application file for complete search history.

(56) References Cited

U.S. PATENT DOCUMENTS

| | | | |
|---|---|---|---|
| 6,178,551 B1 | 1/2001 | Sana et al. | |
| 7,054,924 B1 * | 5/2006 | Harvey | H04L 67/303 709/203 |
| 2002/0100023 A1 | 7/2002 | Ueki et al. | |
| 2004/0015959 A1 | 1/2004 | Kobayashi | |
| 2005/0065993 A1 | 3/2005 | Honda et al. | |

(Continued)

FOREIGN PATENT DOCUMENTS

| | | |
|---|---|---|
| EP | 0999496 | 5/2000 |
| EP | 1376347 | 1/2004 |

(Continued)

OTHER PUBLICATIONS

International Search Report mailed Apr. 19, 2011 in corresponding International Application No. PCT/JP2011/055765.

(Continued)

*Primary Examiner* — Albert Wang
(74) *Attorney, Agent, or Firm* — Staas & Halsey LLP

(57) ABSTRACT

An extracting unit extracts, from a collection of procedure information sets individually indicating operating procedures for configuration modification of systems according to contents of the configuration modification, in which operating procedures specific information pieces of the individual systems have been replaced with individually corresponding variable names, a procedure information set indicating an operating procedure according to a content of the configuration modification to be applied to a modification-target system. A replacing unit replaces a variable name in the extracted procedure information set with a corresponding specific information piece of the modification-target system, which specific information piece is acquired from a configuration information set defining a configuration of the modification-target system.

15 Claims, 59 Drawing Sheets

(56) References Cited

U.S. PATENT DOCUMENTS

2005/0102564 A1    5/2005  Oeda et al.
2006/0047793 A1*   3/2006  Agrawal ............. H04L 41/0843
                                                         709/221

FOREIGN PATENT DOCUMENTS

| | | |
|---|---|---|
| JP | 6-243118 | 9/1994 |
| JP | 10-177473 | 6/1998 |
| JP | 2002-55853 | 2/2002 |
| JP | 2002-334146 | 11/2002 |
| JP | 2004-86863 | 3/2004 |
| JP | 2005-92542 | 4/2005 |
| JP | 2005-148779 | 6/2005 |
| JP | 2007-4734 | 1/2007 |
| JP | 2007-11728 | 1/2007 |
| JP | 2007-87268 | 4/2007 |

OTHER PUBLICATIONS

W. L. da Costa Cordeiro et al., "CHANGEMINER: A Solution for Discovering IT Change Templates from Past Execution Traces," *IEEE International Symposium on Integrated Network Management*, 2009, pp. 97-104.

Patent Abstracts of Japan, Publication No. 06-243118, Published Sep. 2, 1994.
Patent Abstracts of Japan, Publication No. 10-177473, Published Jun. 30, 1998.
Patent Abstracts of Japan, Publication No. 2002-055853, Published Feb. 2, 2002.
Patent Abstracts of Japan, Publication No. 2002-334146, Published Nov. 22, 2002.
Patent Abstracts of Japan, Publication No. 2004-086863, Published Mar. 18, 2004.
Patent Abstracts of Japan, Publication No. 2005-092542, Published Apr. 7, 2005.
Patent Abstracts of Japan, Publication No. 2005-148779, Published Jun. 9, 2005.
Patent Abstracts of Japan, Publication No. 2007-004734, Published Jan. 11, 2007.
Patent Abstracts of Japan, Publication No. 2007-011728, Published Jan. 18, 2007.
Patent Abstracts of Japan, Publication No. 2007-087268, Published Apr. 5, 2007.
Japanese Office Action issued Nov. 11, 2014 in corresponding Japanese Patent Application No. 2013-504417.

* cited by examiner

FIG. 23

151 VARIABLE CORRESPONDENCE TABLE

| VARIABLE NAME | MATCH PATTERN |
|---|---|
| $var1 | %Server/#*/Server[./Software/@version="2.2.15"]/@ipaddress |

58a CONVERSION TABLE

| ORIGINAL CHARACTER STRING | VARIABLE NAME |
|---|---|
| 192.168.1.10 | $var1 |

FIG. 24

58a CONVERSION TABLE

| ORIGINAL CHARACTER STRING | VARIABLE NAME |
|---|---|
| 192.168.1.10 | $var1 |

58b CONVERSION TABLE

| ORIGINAL CHARACTER STRING | VARIABLE NAME |
|---|---|
| 192.168.1.10 | $var1 |
| 1.2.3.4 | $var2 |
| 10.0.0.6 | $var3 |

58c CONVERSION TABLE

| ORIGINAL CHARACTER STRING | VARIABLE NAME |
|---|---|
| 192.168.10.4 | $var1 |

FIG. 54

95 PROSPECTIVE PROCEDURE LIST

| PROSPECTIVE PROCEDURE NUMBER | SUM |
|---|---|
| 1 | 55 |
| 2 | 40 |
| 3 | 35 |
| 4 | 20 |

FIG. 56

96 PROSPECTIVE PROCEDURE LIST

| PROSPECTIVE PROCEDURE NUMBER | COMMAND SUPPORT RATE |
|---|---|
| 1 | 1 |
| 3 | 1 |
| 2 | 0.75 |
| 4 | 0.75 |

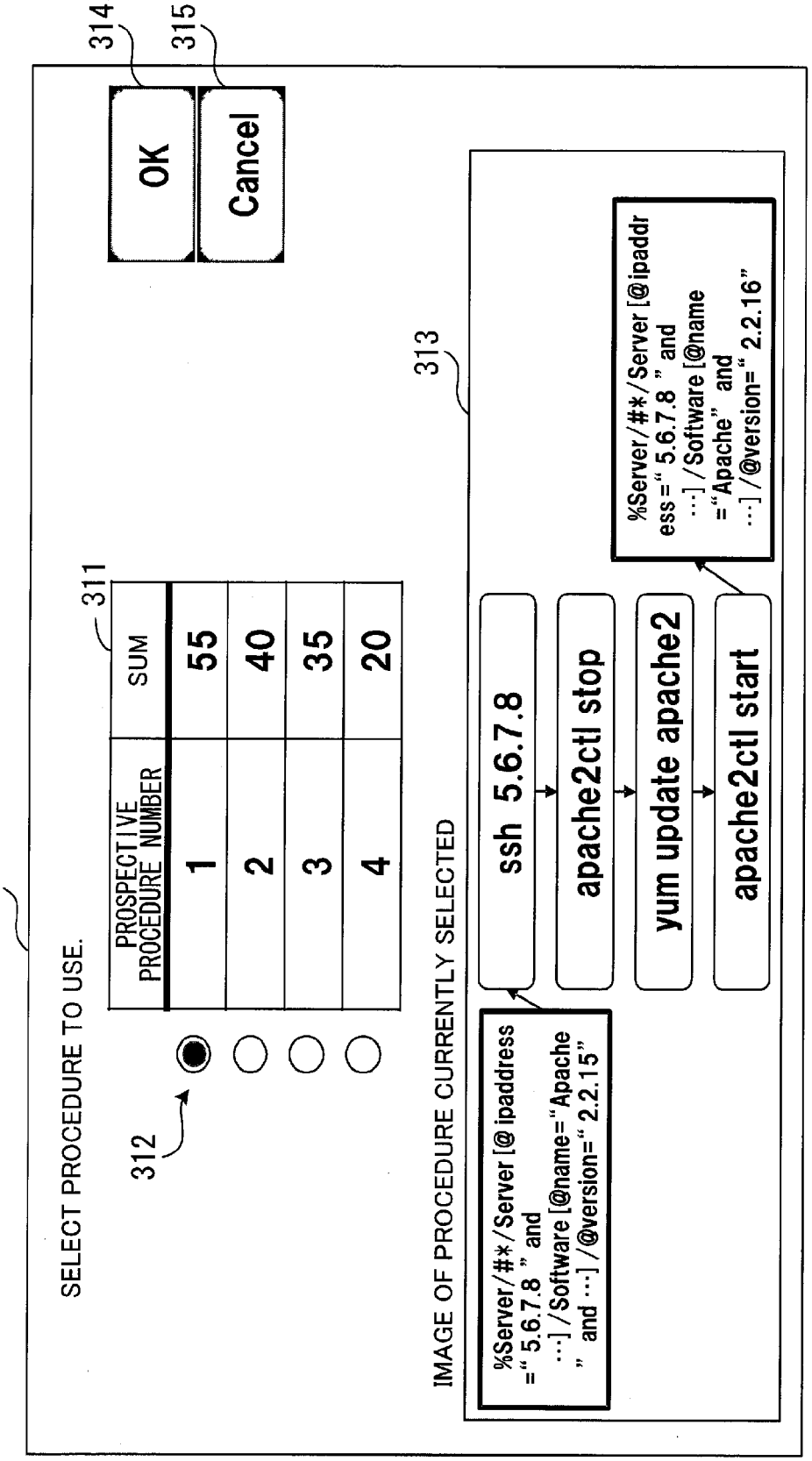

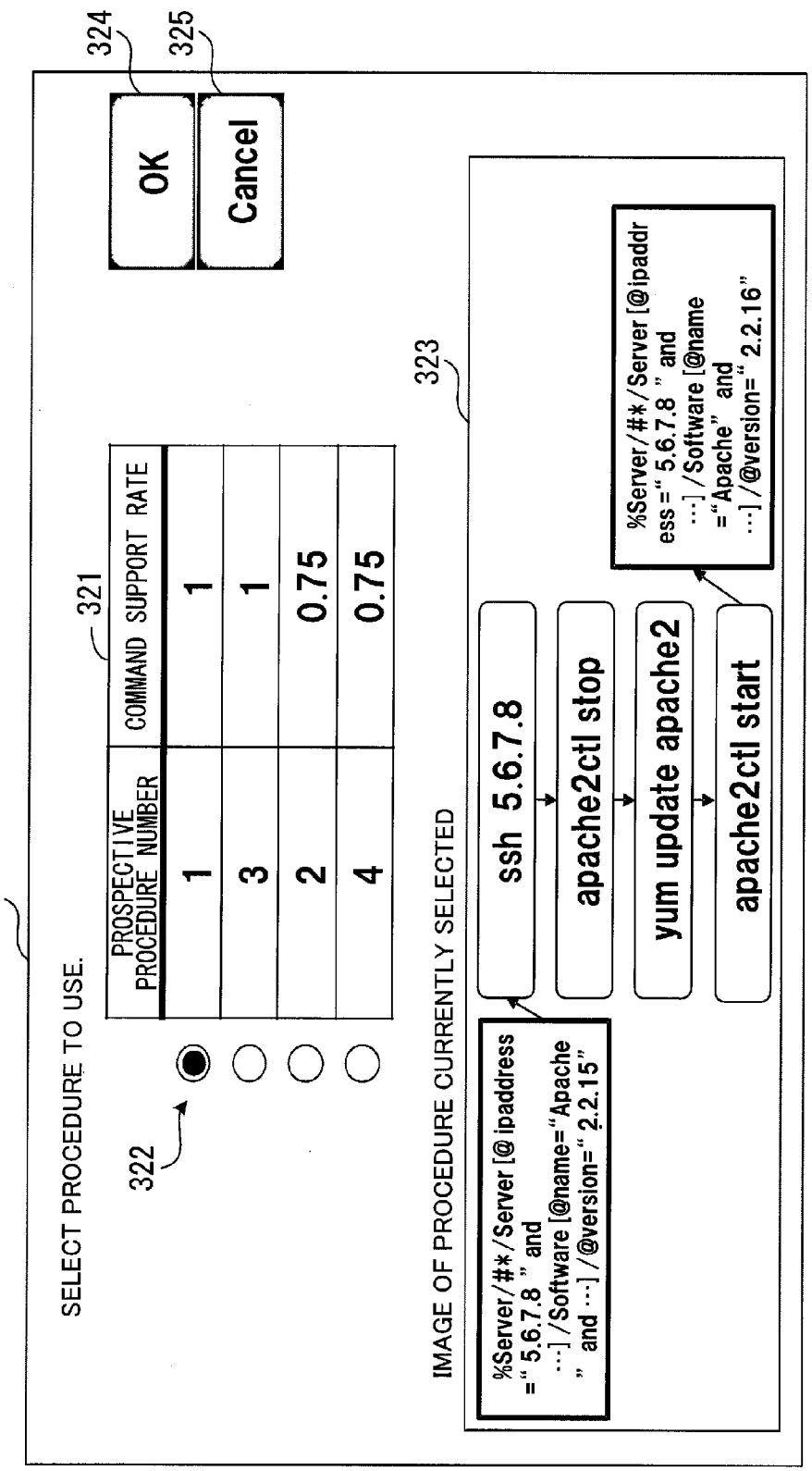

INFORMATION PROCESSING APPARATUS AND METHOD THEREFOR

CROSS-REFERENCE TO RELATED APPLICATION

This application is a continuation application of International Application PCT/JP2011/055765 filed on Mar. 11, 2011 which designated the U.S., the entire contents of which are incorporated herein by reference.

FIELD

The embodiments discussed herein are related to an information processing apparatus and a method therefor.

BACKGROUND

As for system operations management, such as for information and communication technology (ICT) systems, modification in the system configuration involves operations such as start and stop of the system, changes in values set for the system, and a software update. In such a case, if an administrator has to develop an operating procedure from step one each time an operation needs to be done, the working efficiency would be low and errors are likely to take place.

In view of the above, a technology has been proposed with the purpose of supporting operations associated with the system operations management, in which based on history of user's operations on applications of a computer system, operating procedure knowledge matching the user's intention is loaded into an expert system. In addition, another proposed technology is to discover templates from past execution history.

Japanese Laid-open Patent Publication No. 06-243118

Cordeiro, W. Machado et al., "CHANGEMINER: A solution for discovering IT change templates from past execution traces", Integrated Network Management, 2009. IM '09. IFIP/IEEE International Symposium, 2009, pp. 97-104

However, some part of the operations for modifying a system configuration depends on the system configuration and, therefore, past operation history and templates cannot be used directly to a system having a different configuration. Hence, it is needed to make modification so as to tailor procedures of the past operation history and the templates to the configuration of the managed system. However, this entails identification of sections to be modified and consideration for appropriate modification contents, thus not gaining full efficiency of the operations for modifying the system configuration.

SUMMARY

According to one aspect, there is provided an information processing apparatus including a processor configured to perform a procedure including extracting, from a collection of procedure information sets individually indicating operating procedures for configuration modification of systems according to contents of the configuration modification, in which operating procedures specific information pieces of the individual systems have been replaced with individually corresponding variable names, a procedure information set indicating an operating procedure according to a content of the configuration modification to be applied to a modification-target system; and replacing a variable name in the extracted procedure information set with a corresponding specific information piece of the modification-target system, which specific information piece is acquired from a configuration information set defining a configuration of the modification-target system.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 23 illustrates an example of assigning a variable name;

FIG. 24 illustrates an example of conversion tables;

FIG. 54 illustrates an example of a sorted prospective procedure list;

FIG. 56 illustrates an example of a sorted prospective procedure list according to command support rate;

FIG. 58 illustrates a first example of a prospective procedure list displayed on a terminal; and FIG. 59 illustrates a second example of the prospective procedure list displayed on the terminal.

DESCRIPTION OF EMBODIMENTS

Figure 1:
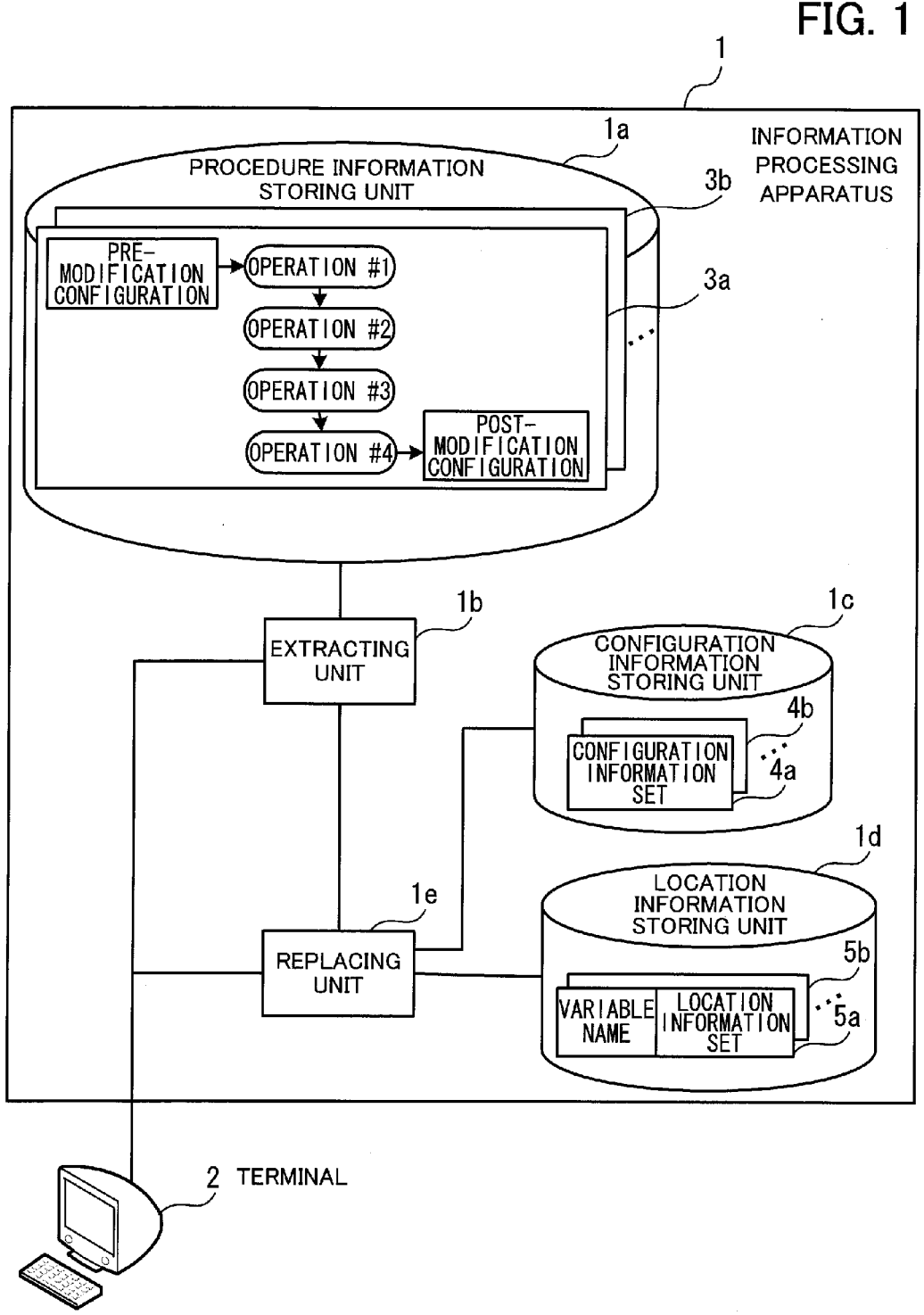
FIG. 1 illustrates an example of a functional configuration of an apparatus according to a first embodiment.

Several embodiments will be described below with reference to the accompanying drawings, wherein like reference numerals refer to like elements throughout. Note that two or more of the embodiments below may be combined for implementation in such a way that no contradiction arises.

(a) First Embodiment

FIG. 1 illustrates an example of a functional configuration of an apparatus according to a first embodiment. An information processing apparatus 1 includes a procedure information storing unit 1a, an extracting unit 1b, a configuration information storing unit 1c, a location information storing unit 1d, and a replacing unit 1e.

The procedure information storing unit 1a stores therein a collection of procedure information sets 3a, 3b, and . . . each indicating a configuration modification operating procedure according to a content of configuration modification of a system. Note that in each procedure information set, system-specific information in the operating procedure has been replaced with a corresponding variable name. In addition, each procedure information set may be represented by a digraph, for example. Furthermore, multiple procedure information sets including common operations may be combined together.

The extracting unit 1b extracts, from the collection of procedure information sets 3a, 3b, and . . . , a procedure information set indicating an operating procedure according to the content of configuration modification applied to a system targeted for the modification. For example, when a procedure request indicating the content of configuration modification applied to the target system is entered from a terminal 2, the extracting unit 1b extracts a procedure information set according to the procedure request.

The configuration information storing unit 1c stores therein configuration information sets 4a, 4b, and . . . , each of which defines a system configuration.

The location information storing unit 1d stores therein variable names included in the collection of procedure information sets 3a, 3b, and . . . and location information sets 5a, 5b, and . . . each indicating a location in a configuration information set, at which location specific information corresponding to an associated variable name appears.

The replacing unit 1e acquires, from a configuration information set defining the configuration of the system targeted for the modification, specific information of the target system, which specific information is associated with a variable name included in the procedure information set extracted by the extracting unit 1b. For example, with reference to the location information sets 5a, 5b, and . . . , the replacing unit 1e determines a location of the specific information appearing in the configuration information set and then acquires a character string at the determined location as the specific information. Subsequently, the replacing unit 1e replaces the variable name in the procedure information set extracted by the extracting unit 1b with the specific information acquired from the configuration information set. The replacing unit 1e transmits, to the terminal 2, the procedure information set whose variable name has been replaced with the specific information, for example.

Note that, in FIG. 1, each line connecting the individual components represents a part of communication paths, and communication paths other than those illustrated in FIG. 1 are also configurable.

Figure 2:
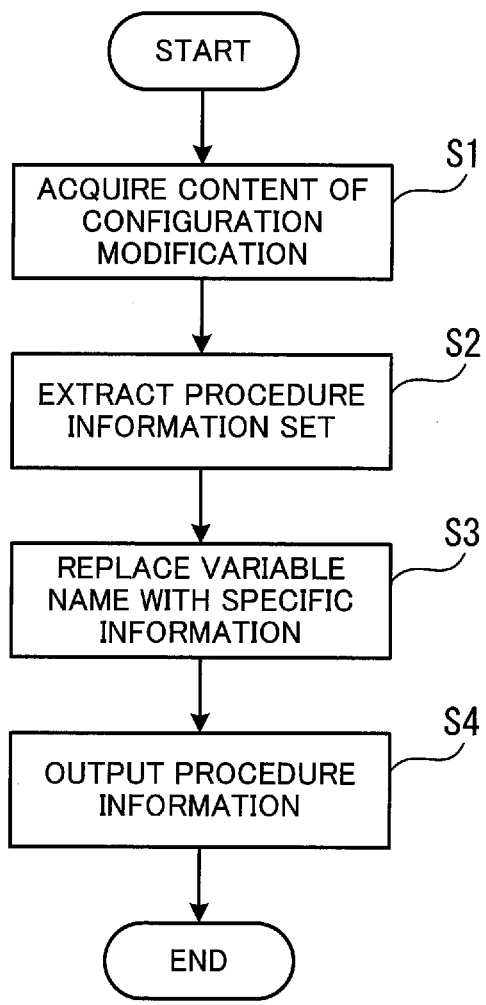
FIG. 2 is a flowchart illustrating an example of a process procedure according to the first embodiment.

The information processing apparatus 1 having the functional configuration described above executes a process in the following procedure. FIG. 2 is a flowchart illustrating an example of a process procedure according to the first embodiment. The process of FIG. 2 is described next according to the step numbers in the flowchart.

[Step S1] The extracting unit 1b acquires content of configuration modification applied to a system targeted for the modification. For example, the extracting unit 1b acquires the content of configuration modification from a procedure request received from the terminal 2.

[Step S2] The extracting unit 1b extracts, from the procedure information storing unit 1a, a procedure information set according to the content of configuration modification. For example, according to the content of configuration modification, the extracting unit 1b determines pre-modification and post-modification configurations for the case where the configuration of the target system is modified. Subsequently, the extracting unit 1b extracts, from the procedure information storing unit 1a, a procedure information set corresponding to the paired pre-modification and post-modification configurations.

[Step S3] The replacing unit 1e acquires, from a configuration information set defining the configuration of the target system, specific information of the target system, which specific information is associated with a variable name included in the extracted procedure information set. The replacing unit 1e, then, replaces the variable name in the procedure information set with the acquired specific information. For example, with reference to the location information storing unit 1d, the replacing unit 1e acquires a location information set associated with the variable name included in the extracted procedure information set. Next, the replacing unit 1e determines, in the configuration information set of the target system found in the configuration information storing unit 1c, a location corresponding to the acquired location information set, and then acquires specific information at the location. Subsequently, the replacing unit 1e replaces the variable name in the procedure information set extracted by the extracting unit 1b with the specific information acquired from the configuration information storing unit 1c.

[Step S4] The replacing unit 1e outputs the procedure information set whose variable name has been replaced with the specific information. For example, the replacing unit 1e outputs the procedure information set to the terminal 2 having issued the procedure request.

Figure 3:
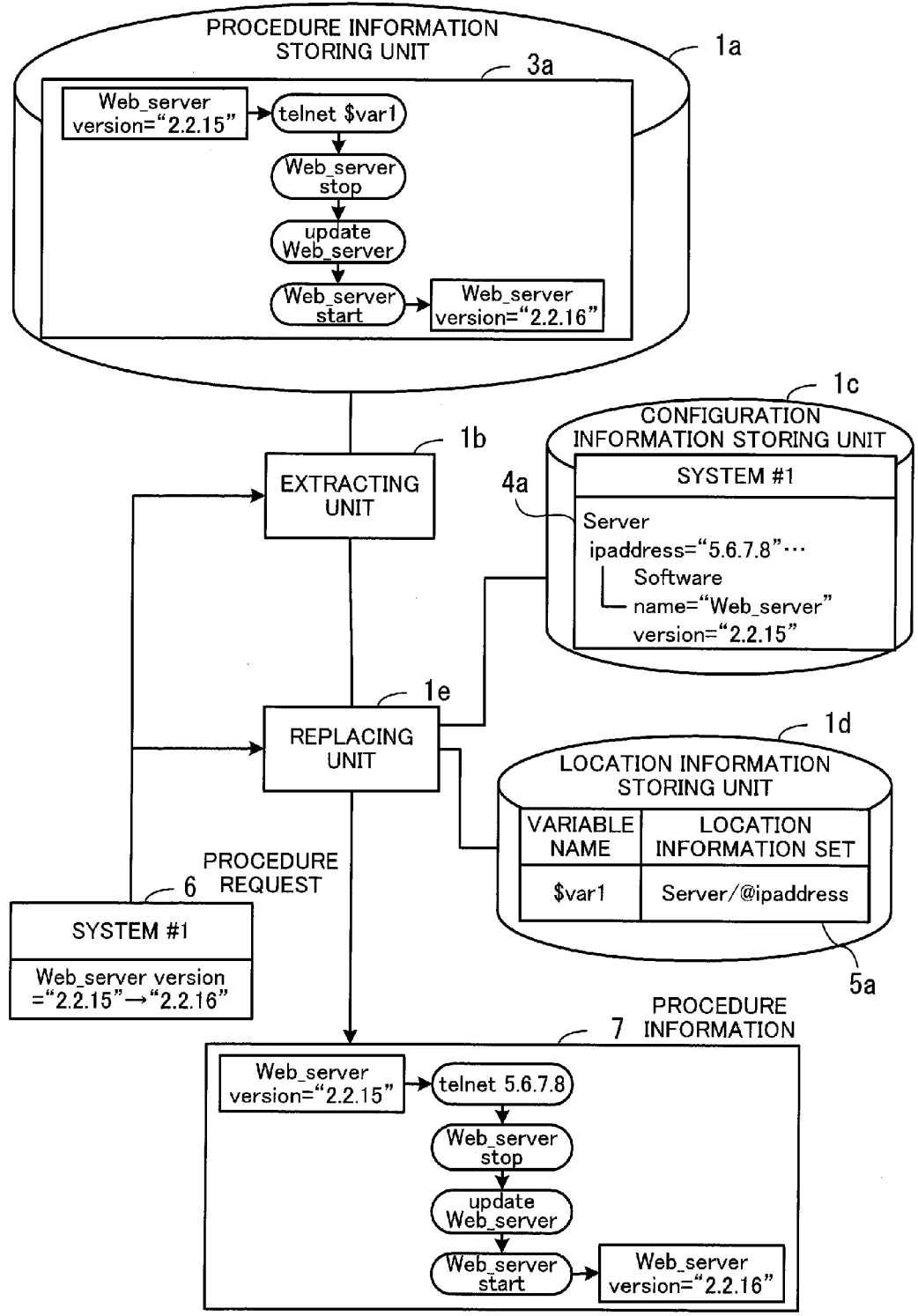
FIG. 3 illustrates an example of generating procedure information according to the first embodiment.

In the above-described manner, it is possible to acquire a procedure information set in which specific information of a system targeted for modification has been reflected. A specific operation example is described next. FIG. 3 illustrates an example of generating procedure information according to the first embodiment. The example of FIG. 3 is concerned with the case of updating Web server software of a system, whose identification information is 'system #1', from Version 2.2.15 to Version 2.2.16. In the example of FIG. 3, a procedure request 6 is entered. The procedure request 6 includes identification information of a system targeted for configuration modification and a content of the configuration modification.

Upon the entry of the procedure request 6, the extracting unit 1b extracts, from the procedure information storing unit 1a, a procedure information set according to the content of the configuration modification of the system. In the example of FIG. 3, the procedure information set 3a for updating Web server software from Version 2.2.15 to Version 2.2.16 is extracted. The extracted procedure information set 3a is passed from the extracting unit 1b to the replacing unit 1e.

The replacing unit 1e acquires a variable name included in the extracted procedure information set 3a. In the example of FIG. 3, a variable name '$var1' is acquired. Next, the replacing unit 1e acquires, from the location information storing unit 1d, a location information set corresponding to the acquired variable name '$var1'. In the example of FIG. 3, the location information set 5a of 'Server/@ipaddress' is acquired. The location information set 5a indicates that a value of an attribute 'ipaddress' under an element 'Server' is specific information. Therefore, the replacing unit 1e refers to, in the configuration information storing unit 1c, the configuration information set 4a of the target system and then acquires a value '5.6.7.8' found, in the configuration information set 4a, at a location indicated by the location information set 5a. Subsequently, the replacing unit 1e generates procedure information 7 in which the variable name '$var1' in the extracted procedure information set 3a has been replaced with the specific information '5.6.7.8'.

The replacing unit 1e then outputs the generated procedure information 7. For example, if the procedure request 6 has been issued by the terminal 2, the procedure information 7 is transmitted to the terminal 2, at which a content of the procedure information 7 is displayed.

Since the specific information tailored to the target system has been set in the procedure information 7, a user of the terminal 2 is able to make the desired configuration modification of the target system simply by inputting operations presented in the procedure information 7 directly to the terminal 2. Even if the user of the terminal 2 handles the procedure for the first time, he/she is able to make prompt implementation of the procedure, thus improving the working efficiency.

Note that the extracting unit 1b and the replacing unit 1e may be implemented by functions provided for a central processing unit (CPU) of the information processing apparatus 1. In addition, the procedure information storing unit 1a, the configuration information storing unit 1c, and the location information storing unit 1d may be implemented, for example, by a random access memory (RAM) or a hard disk drive (HDD) of the information processing apparatus 1.

(b) Second Embodiment

A second embodiment is described next. The second embodiment is directed to presenting an operating procedure to a user with the use of an administrative server that supervises and manages servers used by individual users, thereby reducing the management load involved in server operations of the user.

Figure 4:
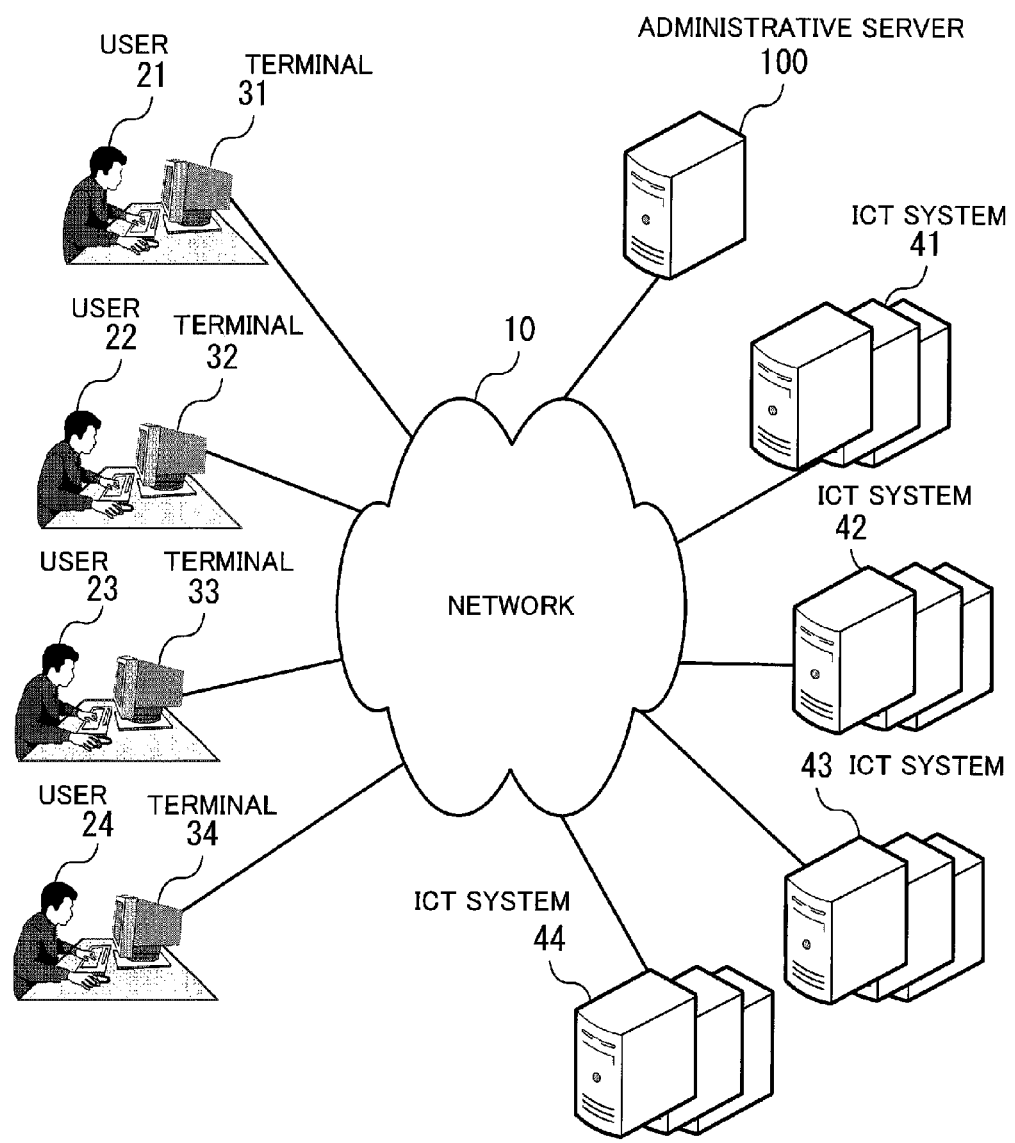
FIG. 4 illustrates an example of a system configuration according to a second embodiment.

FIG. 4 illustrates an example of a system configuration according to the second embodiment. To an administrative server 100, multiple ICT systems 41 to 44 are connected via a network 10. To the network 10, multiple terminals 31 to 34 used by individual users 21 to 24, respectively, are connected. The ICT systems 41 to 44 are individually managed by a different one of the users 21 to 24. In addition, each of the ICT systems 41 to 44 is made up of one or more servers.

In the example of FIG. 4, the user 21 manages the ICT system 41 using the terminal 31. Similarly, the user 22 manages the ICT system 42 using the terminal 32. The user 23 manages the ICT system 43 using the terminal 33. The user 24 manages the ICT system 44 using the terminal 34.

The administrative server 100 acquires, from the ICT systems 41 to 44, contents of operations carried out by the users 21 to 24 on the ICT systems 41 to 44 via the terminals 31 to 34, and then holds the acquired contents of operations as operation history. In addition, based on the operation history, the administrative server 100 generates a procedure graph indicating operating procedures according to the operation contents. Further, in response to each of procedure requests from the users 21 to 24 via the terminals 31 to 34, the administrative server 100 generates an operating procedure tailored to the configuration of a server used by the user having issued the procedure request, and then responds the terminal having output the procedure request with the generated operating procedure.

Assume here that identification information of the user 21 (user ID) is 'user #1', a user ID of the user 22 is 'user #2', a user ID of the user 23 is 'user #3', and a user ID of the user 4 is 'user #4'. Assume also that each of the ICT systems 41 to 44 managed by the users 21 to 24, respectively, is identified within the administrative server 100 by the user ID of the user managing the ICT system. That is, according to the second embodiment, the user ID of the user managing each of the ICT systems 41 to 44 is used as identification information of the ICT system.

Figure 5:
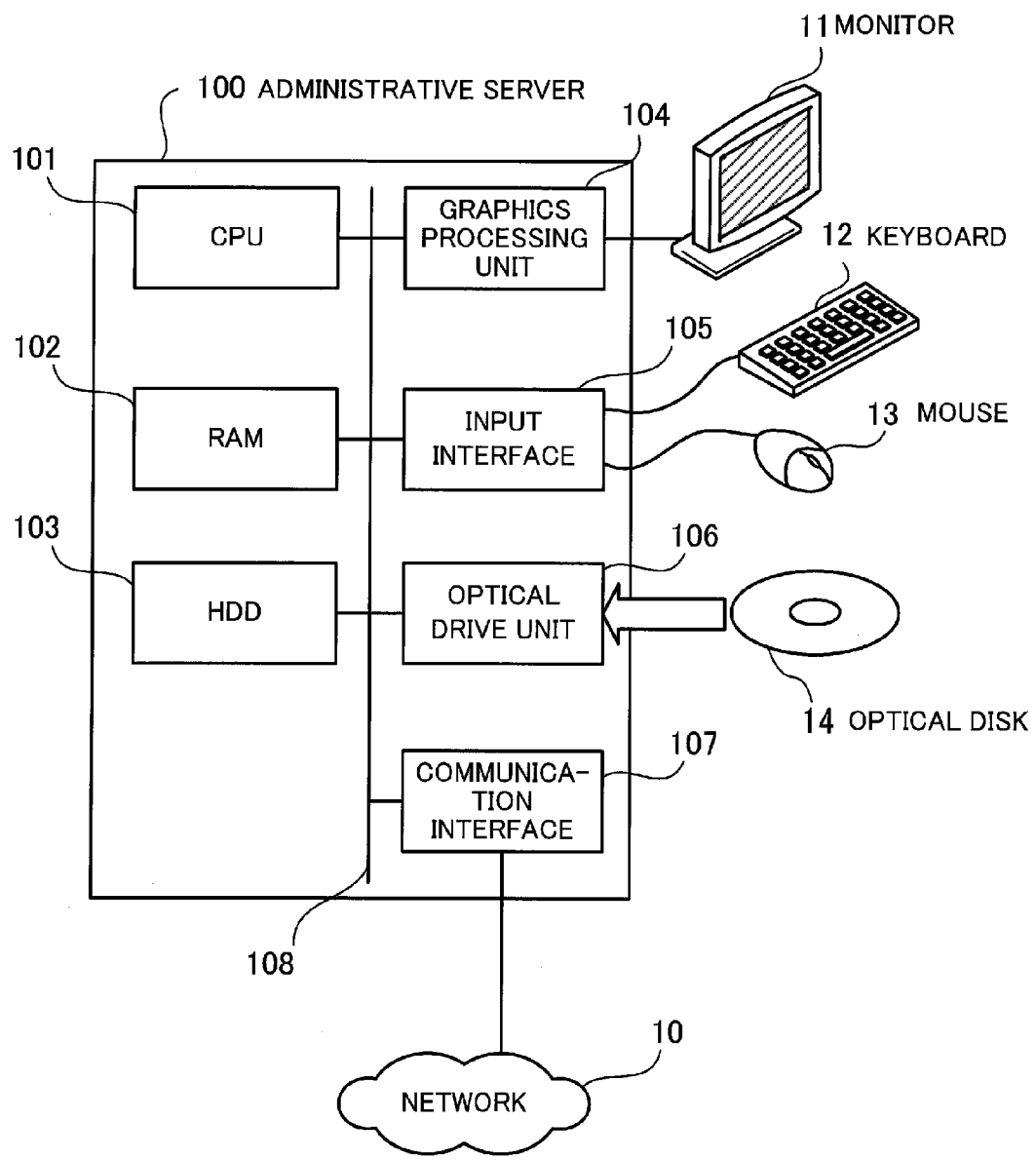
FIG. 5 illustrates an example of a hardware configuration of an administrative server.

FIG. 5 illustrates an example of a hardware configuration of an administrative server. Overall control of the administrative server 100 is exercised by a CPU 101. To the CPU 101, a RAM 102 and multiple peripherals are connected via a bus 108.

The RAM 102 is used as a main storage device of the administrative server 100. The RAM 102 temporarily stores at least part of an operating system (OS) program and application programs to be executed by the CPU 101. The RAM 102 also stores therein various types of data to be used by the CPU 101 for its processing.

The peripherals connected to the bus 108 include a HDD 103, a graphics processing unit 104, an input interface 105, an optical drive unit 106, and a communication interface 107.

The HDD 103 magnetically writes and reads data to and from a built-in disk, and is used as a secondary storage device of the administrative server 100. The HDD 103 stores therein the OS program, application programs, and various types of data. Note that a semiconductor storage device such as a flash memory may be used as a secondary storage device in place of the HDD 103.

To the graphics processing unit 104, a monitor 11 is connected. According to an instruction from the CPU 101, the graphics processing unit 104 displays an image on a screen of the monitor 11. A cathode ray tube (CRT) display or a liquid crystal display, for example, may be used as the monitor 11.

To the input interface 105, a keyboard 12 and a mouse 13 are connected. The input interface 105 transmits signals sent from the keyboard 12 and the mouse 13 to the CPU 101. Note that the mouse 13 is just an example of pointing devices, and a different pointing device such as a touch panel, a tablet, a touch-pad, and a trackball, may be used instead.

The optical drive unit 106 reads data recorded on an optical disk 14 using, for example, laser light. The optical disk 14 is a portable recording medium on which data is recorded in such a manner as to be read by reflection of light. Examples of the optical disk 14 include a digital versatile disc (DVD), a DVD-RAM, a compact disk read only memory (CD-ROM), a CD recordable (CD-R), and a CD-rewritable (CD-RW).

The communication interface 107 is connected to the network 10. Via the network 10, the communication interface 107 transmits and receives data to and from different computers and communication devices.

The hardware configuration described above achieves the processing functions of this embodiment. Note that FIG. 5 illustrates the hardware configuration of the administrative server 100, however, each of the terminals 31 to 34 and the servers making up the individual ICT systems 41 to 44 may be constructed with the same hardware configuration. In addition, the information processing apparatus 1 of the first embodiment may be constructed with the same hardware configuration as the administrative server 100 of FIG. 5.

Figure 6:
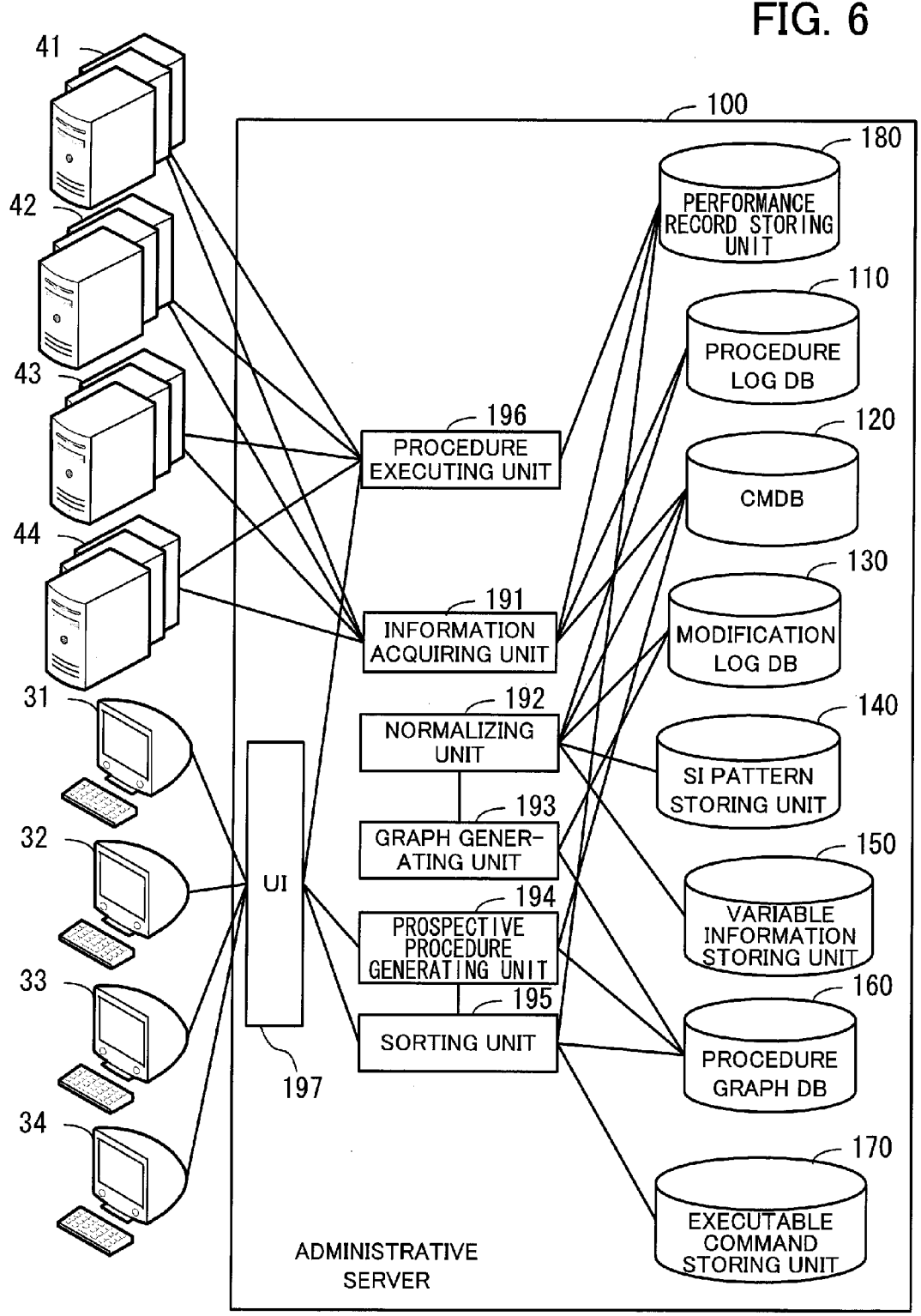
FIG. 6 is a block diagram illustrating an example of functions of the administrative server.

FIG. 6 is a block diagram illustrating an example of functions of an administrative server. The administrative server 100 includes the following functions as information storage functions: a procedure log database (DB) 110; a configuration management database (CMDB) 120; a modification log database 130; a specific information pattern storing (SI pattern storing) unit 140; a variable information storing unit 150; a procedure graph database 160; an executable command storing unit 170; and a performance record storing unit 180.

The procedure log database 110 stores therein procedure logs indicating, among history information of operations carried out on the individual ICT systems 41 to 44, history information of operations for modifying server configurations. For example, a part of the storage area of the RAM 102 or the HDD 103 may be used as the procedure log database 110. Note that a procedure log is an example of a procedure information set of the first embodiment.

The CMDB 120 stores therein configuration information sets of the individual ICT systems 41 to 44. For example, a part of the storage area of the RAM 102 or the HDD 103 may be used for the CMDB 120.

The modification log database 130 stores therein contents of modifications each made in the configuration of an ICT system by a series of operations of a corresponding user. For example, a part of the storage area of the RAM 102 or the HDD 103 may be used as the modification log database 130.

The SI pattern storing unit 140 stores therein, among operation contents included in the procedure logs, specific information patterns each indicating a criterion for detecting information specific to an ICT system or a server included in an ICT system. For example, a part of the storage area of the RAM 102 or the HDD 103 may be used as the SI pattern storing unit 140.

The variable information storing unit 150 stores therein correspondences between variable names and match patterns. The variable names here individually indicate types of specific information, and the match patterns here individually indicate locations in configuration information sets of ICT systems, at each of which locations specific information associated with a corresponding variable name appears. For example, a part of the storage area of the RAM 102 or the HDD 103 may be used as the variable information storing unit 150.

The procedure graph database 160 stores therein a procedure graph representing a series of operations carried out by users. For example, a part of the storage area of the RAM 102 or the HDD 103 may be used as the procedure graph database 160. Note that the procedure graph includes information indicated in procedure logs, and is an example of the procedure information sets of the first embodiment.

The executable command storing unit 170 stores therein a list of commands executable on the individual ICT systems 41 to 44. For example, a part of the storage area of the RAM 102 or the HDD 103 may be used as the executable command string unit 170.

The performance record storing unit 180 stores therein execution performance of each command. The execution performance indicates, for example, the number of times the command has been used for operations of configuration modifications and the time taken to execute the command. For example, a part of the storage area of the RAM 102 or the HDD 103 may be used as the performance record storing unit 180.

The administrative server 100 includes the following functions as management functions: an information acquiring unit 191; a normalizing unit 192; a graph generating unit 193; a prospective procedure generating unit 194; a sorting unit 195; and a procedure executing unit 196.

The information acquiring unit 191 manages configurations of the ICT systems 41 to 44. For example, the information acquiring unit 191 acquires a configuration information set from each of the ICT systems 41 to 44, and then stores the acquired configuration information set in the CMDB 120. In addition, the information acquiring unit 191 acquires information indicating operations for modifying the configurations of the individual ICT systems 41 to 44 and a processing execution state according to each of the modification operations. For example, the ICT systems 41 to 44 transmit, to the administrative server 100, information of commands entered from the corresponding terminals 31 to 34 and the time needed to execute each command (operational time). Based on the information of commands transmitted from each of the ICT systems 41 to 44, the information acquiring unit 191 generates a procedure log which is then stored in the procedure log database 110. In addition, based on the information of commands transmitted from each of the ICT systems 41 to 44 and the operational time of each command, the information acquiring unit 191 updates performance record information in the performance record storing unit 180. Further, the information acquiring unit 191 generates a modification log for a series of operations based on the procedure log database 110 and a content of configuration modification made by the series of operations, and then stores the modification log in the modification log database 130.

The normalizing unit 192 normalizes the generated modification log. Normalization of a modification log is a process of replacing information specific to each ICT system included in the modification log with a variable name corresponding to the type of the specific information. Specific information, such as Internet Protocol (IP) addresses, included in procedure logs and modification logs varies for each user. Therefore, the normalizing unit 192 converts the specific information to a reusable form. To achieve this, the normalizing unit 192 executes a two-step process including extracting specific information and converting the extracted specific information to a reusable form. Then, the normalizing unit 192 passes the normalized modification log to the graph generating unit 193. In addition, as for a variable name associated with the normalized specific information, the normalizing unit 192 stores a correspondence between the variable name and its match pattern in the variable information storing unit 150.

The graph generating unit 193 generates a procedure graph based on normalized modification logs, and then stores the generated procedure graph in the procedure graph database 160.

The prospective procedure generating unit 194 extracts prospective procedures from the procedure graph database 160 according to a procedure request sent from one of the terminals 31 to 34. The prospective procedure generating unit 194 then transmits the extracted prospective procedures to the sorting unit 195. Note that the prospective procedure generating unit 194 has functions of the extracting unit 1b and the replacing unit 1e of the first embodiment.

The sorting unit 195 sorts the order of the extracted prospective procedures based on a predetermined criterion. To sort the order of the prospective procedures, the sorting unit 195 refers to, for example, the executable command storing unit 170 and the performance record storing unit 180. The sorting unit 195 transmits the sorted prospective procedures to the terminal having issued the procedure request.

Upon entry of an operating procedure to be executed from one of the terminals 31 to 34, the procedure executing unit 196 executes commands as indicated by the entered operating procedure on a server corresponding to a user using the terminal having entered the operating procedure. Based on an execution result of the operating procedure, the procedure executing unit 196 updates information in the performance record storing unit 180.

Note that, in FIG. 6, each line connecting the individual components represents a part of communication paths, and communication paths other than those illustrated in FIG. 6 are also configurable.

Figure 7:
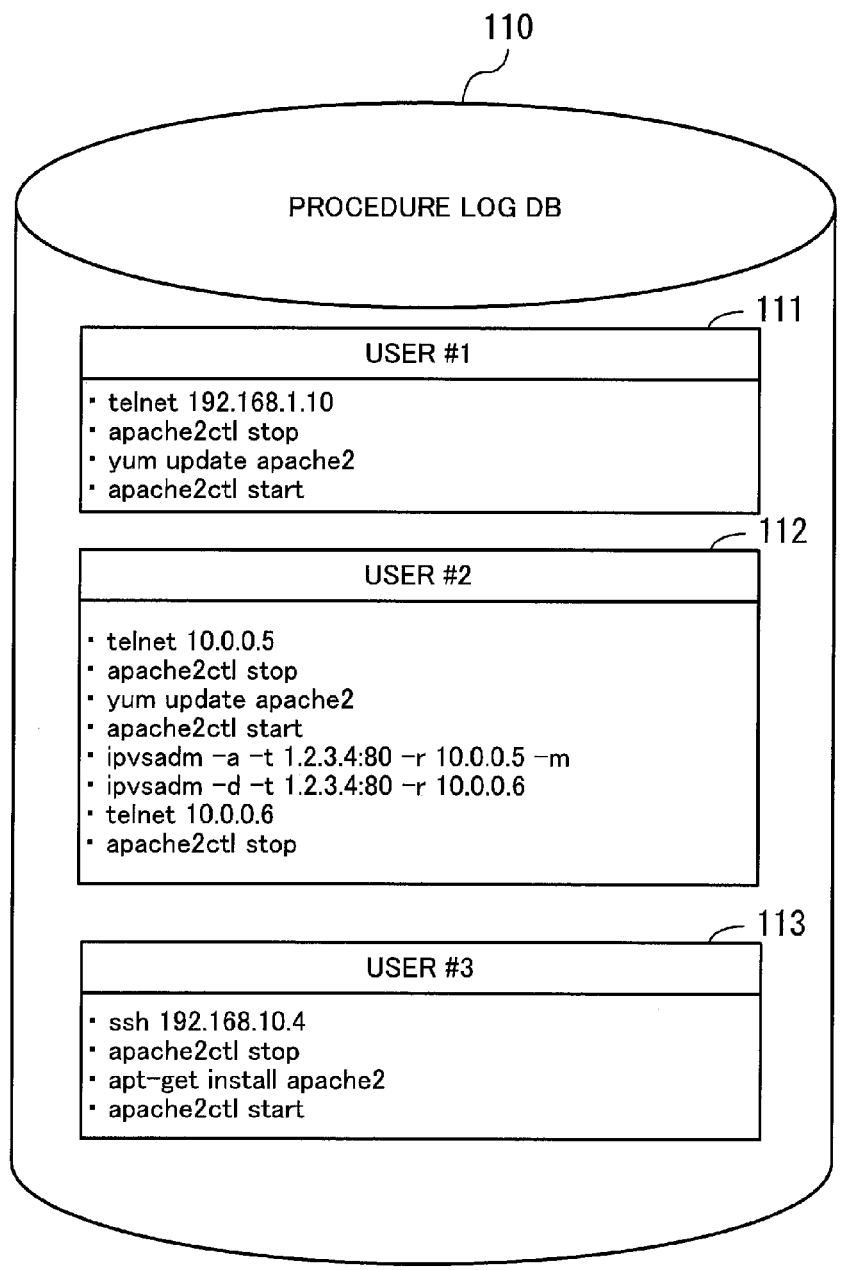
FIG. 7 illustrates an example of a data structure of a procedure log database.

Next described are data structures of various information stored in the administrative server 100. First, the data structure of the procedure log database 110 is described. FIG. 7 illustrates an example of a data structure of a procedure log database. The procedure log database 110 stores therein procedure logs 111 to 113 for individual users. In each of the procedure logs 111 to 113, a series of commands having been entered into a server by a corresponding user using a terminal is stored in association with, for example, identification information of the user (user ID).

In the example of FIG. 7, a series of operating information pieces having been entered to update Web server software is included in each of the procedure logs 111 to 113. Each series of operating information pieces includes, for example, commands entered in the operating procedure and parameters used at the time of entry of the individual commands. The entered operating information pieces of the procedure logs 111 to 113 are at least partly different from each other.

For example, the procedure log 111 of the user with the user ID 'user #1' represents an executed operating procedure in which the following commands are sequentially entered: 'telnet 192.168.1.10', 'apache2ctl stop', 'yum update apache2', and 'apache2ctl start'. On the other hand, the procedure log 112 of the user 22 with the user ID 'user #2' represents an executed operating procedure in which commands for configuring load balancer and commands for stopping functions of a Web server not being used follow after commands similar to those of the procedure log 111. The procedure log 113 of the user 23 with the user ID 'user #3' represents an executed operating procedure in which a 'ssh' command is entered in place of the 'telnet' command of the procedure log 111, to thereby remotely log in a server and update Web server software.

Figure 8:
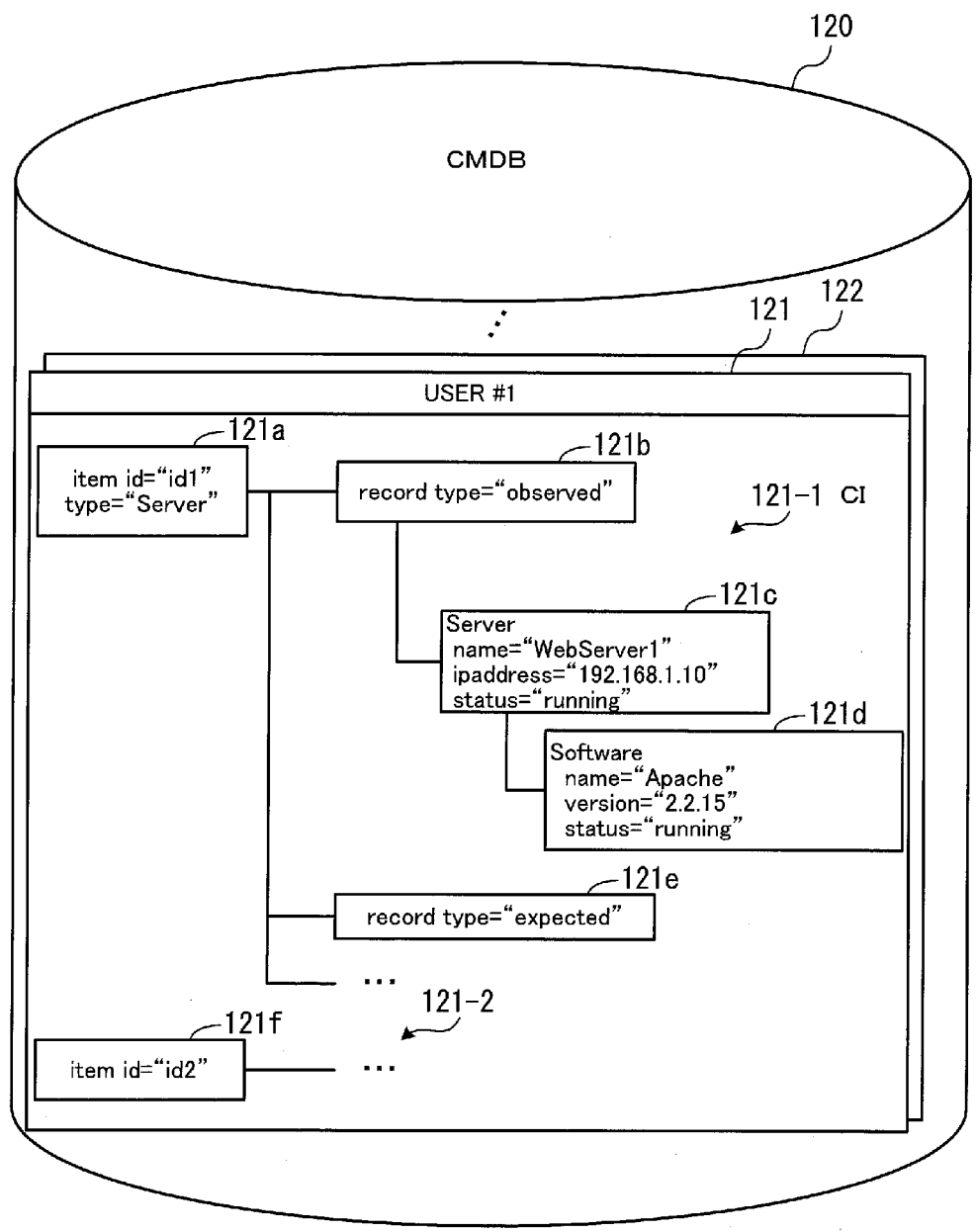
FIG. 8 illustrates an example of a data structure of a configuration management database (CMDB)

Next, the data structure of the CMDB 120 is described. FIG. 8 illustrates an example of a data structure of a CMDB. The CMDB 120 stores therein configuration information sets 121, 122, and . . . for the individual ICT systems.

The configuration information set 121 of the CMDB 120 includes multiple configuration items (CI) 121-1, 121-2, and . . . . Here, one configuration item corresponds to one item. Each item includes multiple records. Under a record, configuration information such as related to a server and a network is provided in a given form.

For example, as for the configuration item 121-1, elements 121b, 121e, and . . . each representing a record are provided under an element 121a in which item ID and type are set. Under the element 121b, multiple elements 121c and 121d are set in a hierarchical structure. The first row in each of the elements 121c and 121d indicates an element name. For example, the element name of the element 121c is 'Server'. In addition, character strings of individual rows following the element name in each element indicate attributes. For example, 'ipaddress="192.168.1.10"' in the element 121c is one attribute, and "192.168.1.10" is a value of the attribute.

Note that in the case where a configuration information set in the CMDB 120 is updated, information before the update is also held in the CMDB 120 or the RAM 102 until, for example, a procedure graph according to operating procedures carried out for the update is generated.

The configuration information set 121 of FIG. 8 is an example of configuration information of the ICT system 41 managed by the user 21 with the user ID 'user #1'. A location of data in the CMDB 120 may be specified by, for example, the XML Path Language (XPath). Here, the XPath is a syntax language designed by the World Wide Web Consortium (W3C) for defining parts of an Extensible Markup Language (XML) document.

Figure 9:
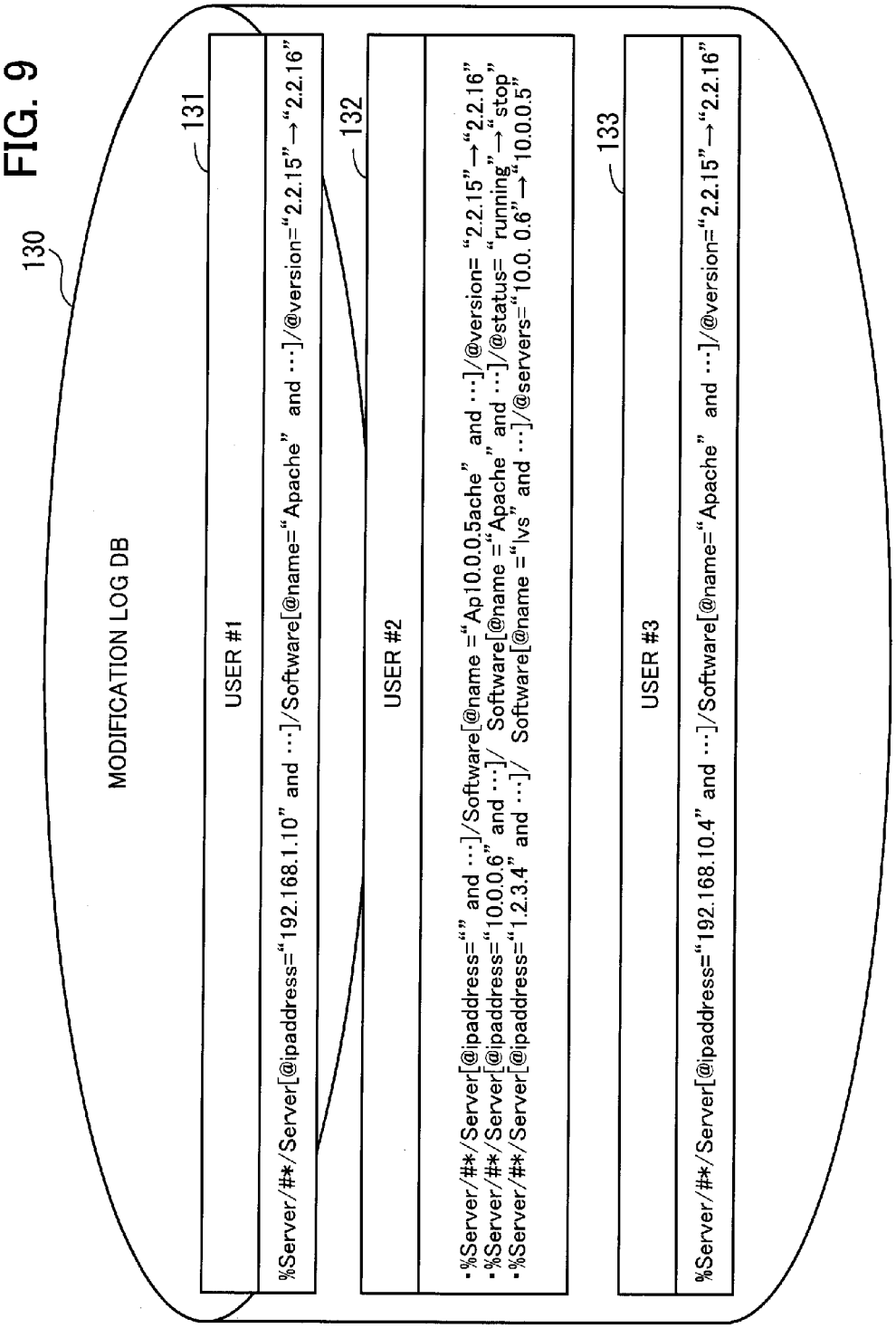
FIG. 9 illustrates an example of a data structure of a modification log database.

Next, the data structure of the modification log database 130 is described. FIG. 9 illustrates an example of a data structure of a modification log database. The modification log database 130 stores therein modification logs 131 to 133. In each of the modification logs 131 to 133, information indicating a modified section in the CMDB 120 and a content of the modification is stored in association with a corresponding user ID. In the example of FIG. 9, the modified sections are indicated by the XPath. As for the content of each modification, an arrow indicates the direction of the modification from pre-modification information to post-modification information.

For example, the modification log 131 indicates that, in the configuration information set 121, '2.2.15' at a location specified by '% Server/#*/Server[@ipaddress="192.168.1.10" and . . . ]/Software[@name="Apache" and . . . ]/@version="2.2.15"' is modified to '2.2.16'. By holding such a modification log, it is possible to reproduce, based on the modification log, pre-modification and post-modification information of a modified section in a configuration information set of the CMDB 120.

Figure 10:
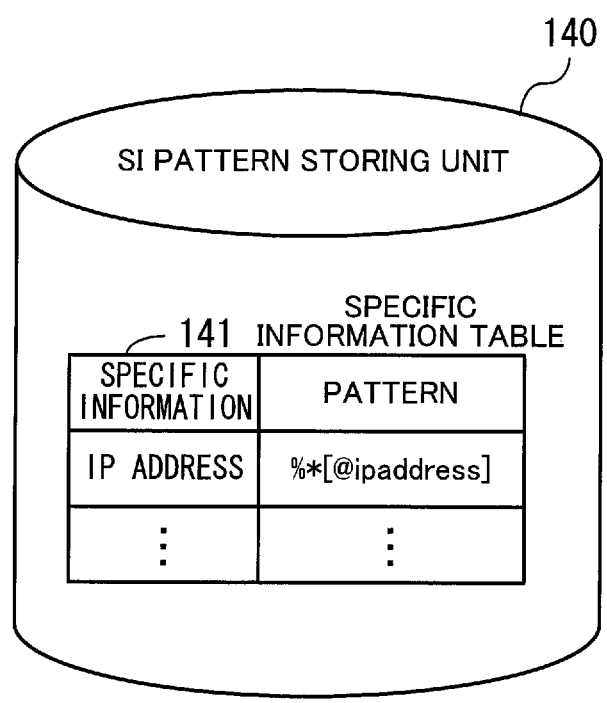
FIG. 10 illustrates an example of a data structure of a specific information (SI) pattern storing unit.

Next, the data structure of the SI pattern storing unit 140 is described. FIG. 10 illustrates an example of a data structure of a SI pattern storing unit. The SI pattern storing unit 140 stores therein a specific information table 141 including columns of 'specific information' and 'pattern'. Each field in the specific information column has a type name of specific information. Each field in the pattern column has a pattern used in a modification log to describe the type of information indicated in a corresponding field of the specific information column.

Thus, for the purpose of extracting specific information, patterns of data to be recognized as specific information are preliminarily registered in the specific information table 141. Examples of specific information types include IP address, user information, and machine name. In the example of FIG. 10, 'IP address' is set as specific information, and an XPath expression matching data in the CMDB 120 is registered as a corresponding pattern. For example, '%*[@ipaddress]' is set as a pattern of the specific information the type of which is 'IP address'. This indicates that a value set in a part of a modification log, which part matches the pattern '%*[@ipaddress]', (i.e., the part is the attribute '[@ipaddress]') is the specific information 'IP address'.

Figure 11:
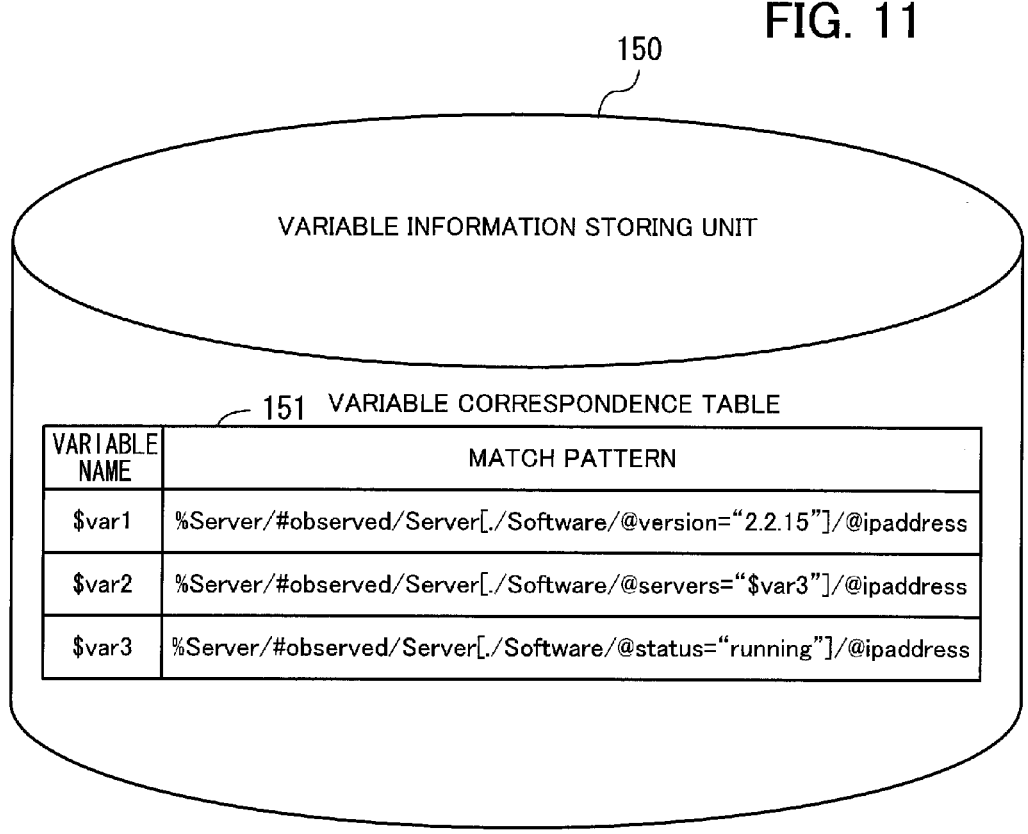
FIG. 11 illustrates an example of a data structure of a variable information storing unit.

Next, the data structure of the variable information storing unit 150 is described. FIG. 11 illustrates an example of a data structure of a variable information storing unit. The variable information storing unit 150 stores therein a variable correspondence table 151 including columns of 'variable name' and 'match pattern'. Each field in the variable name column has a variable name generated by a normalization process. Each field in the match pattern column has a match pattern indicating a location at which specific information corresponding to a variable identified by its associated variable name appears. According to FIG. 11, for example, specific information corresponding to the variable name '$var1' is set as a parameter value at a location specified by '% Server/#observed/Server[./Software/@version="2.2.15"]/@ipaddress'.

Note that a match pattern associated with a variable name '$var2' includes therein a different variable name '$var3'. This indicates that, at the time of generating the match pattern, specific information included therein was replaced with the variable name.

Figure 12:
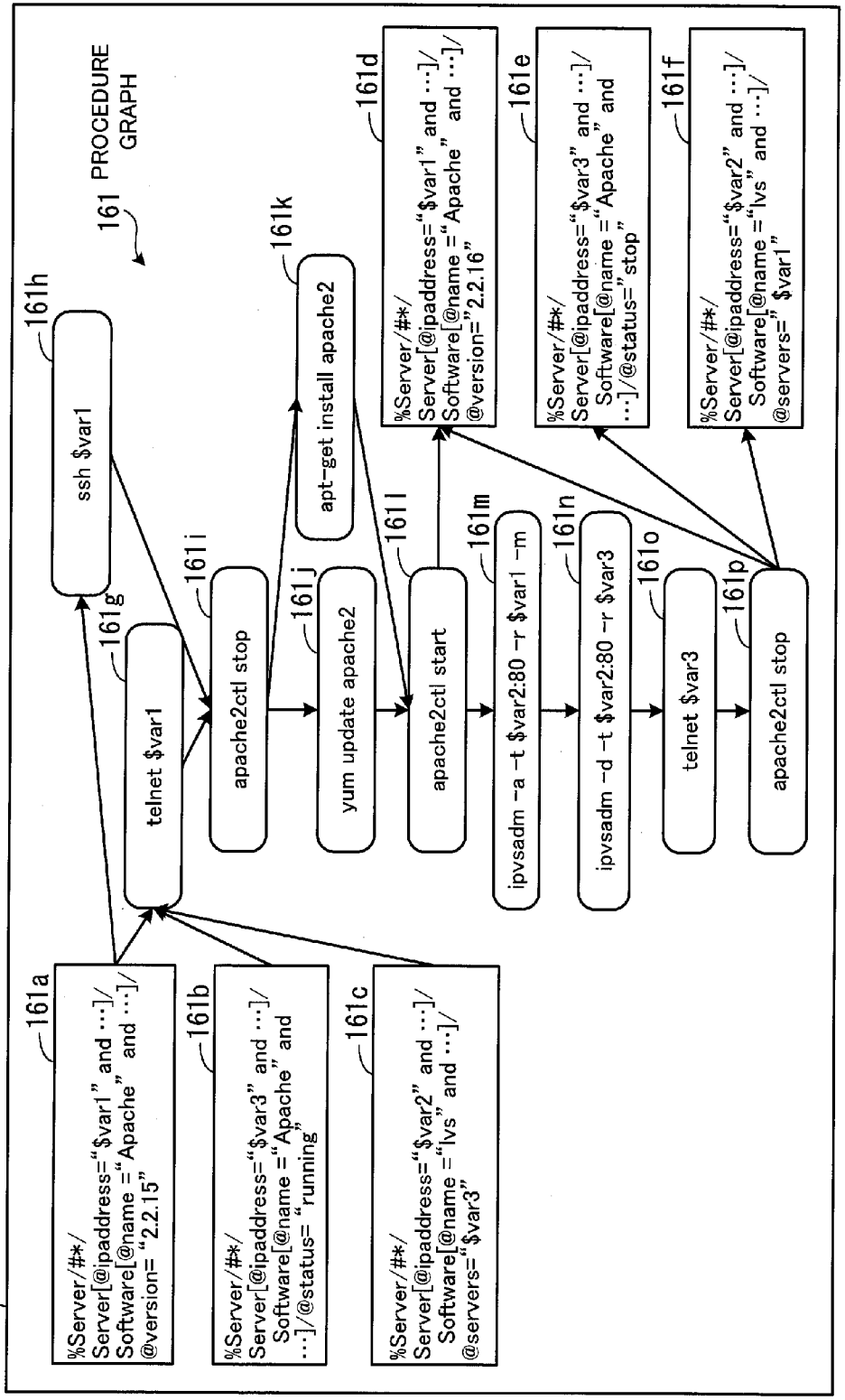
FIG. 12 is a first diagram illustrating an example of a data structure of a procedure graph database.

Next, the data structure of the procedure graph database 160 is described. FIG. 12 is a first diagram illustrating an example of a data structure of a procedure graph database. The procedure graph database 160 stores therein a procedure graph 161. In the procedure graph 161 of FIG. 12, a digraph represents an operating procedure for transforming a configuration from one of three input information sets 161a, 161b, and 161c to one of three output information sets 161d, 161e, and 161f. The operating procedure is represented by multiple nodes 161g, 161h, 161i, 161j, 161k, 161l, 161m, 161n, 161o, and 161p connected by edges. Each node corresponds to an operating information piece indicating an operation carried out in the operating procedure. The edges connecting the nodes indicate the order of operations carried out by arrows. Each edge points from a node corresponding to an operation to another node corresponding to the next operation.

Figure 13:
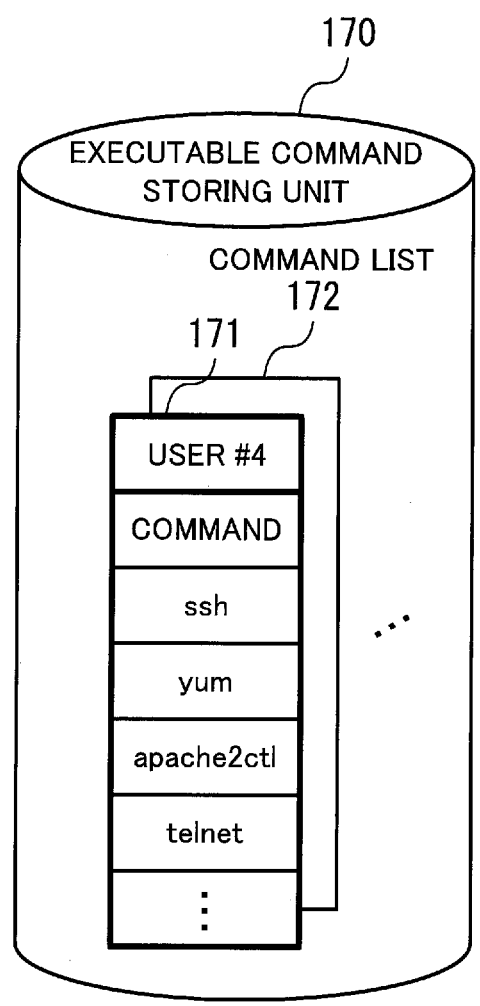
FIG. 13 illustrates an example of a data structure of an executable command storing unit.

Next, the data structure of the executable command storing unit 170 is described. FIG. 13 illustrates an example of a data structure of an executable command storing unit. The executable command storing unit 170 stores therein command lists 171, 172, and . . . for the individual ICT systems. In each of the command lists 171, 172, and . . . , a list of commands executable on its managed ICT system is registered in association with a user ID of a user managing the ICT system. Commands executable on an ICT system are, for example, those for calling programs installed on the ICT system.

Figure 14:
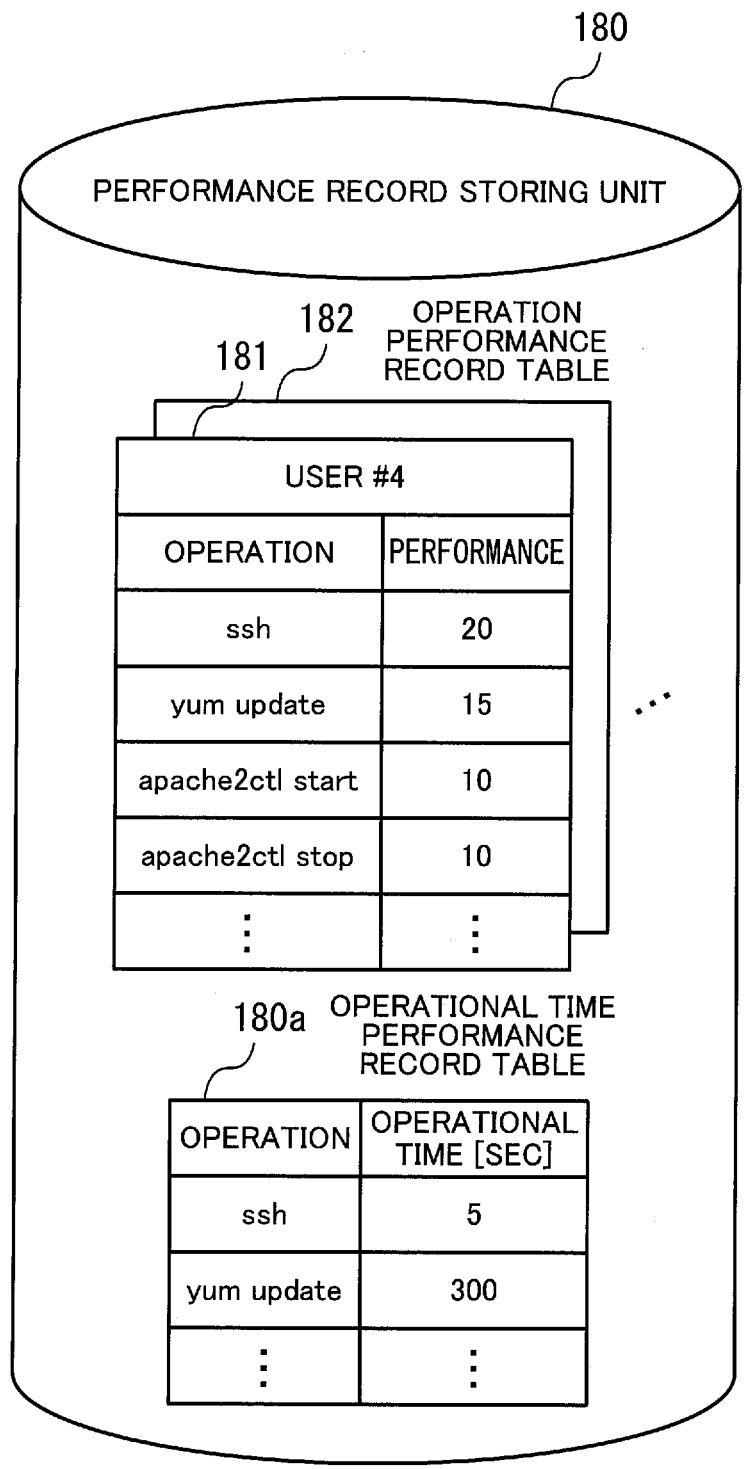
FIG. 14 illustrates an example of a data structure of a performance storing unit.

Next, the data structure of the performance record storing unit 180 is described. FIG. 14 illustrates an example of a data structure of a performance record storing unit. The performance record storing unit 180 stores therein operation performance record tables 181, 182, and . . . for the individual users and an operational time performance record table 180a.

Each of the operation performance record tables 181, 182, and . . . is associated with a user ID, and includes columns of 'operation' and 'performance'. Each field in the operation column has a command having been executed on an ICT system managed by a user identified by an associated user ID. Each field in the performance column has the number of times a corresponding command has been executed.

The operational time performance record table 180a includes columns of 'operation' and 'operational time'. Each field in the operation column has a command having been executed on one or more of the ICT systems. Each field in the operational time column has an average operational time taken when a corresponding command was executed, which average time is expressed in seconds. Note that the operational time taken to execute each command is updated, for example, each time the command is executed on an ICT system. Alternatively, a time measured in advance for each command, for example, may be used as a fixed value.

The administrative server 100 having the above-described configuration carries out processes of generating a procedure graph (hereinafter, referred to as the 'procedure graph generating process') and providing prospective procedures based on the generated procedure graph (the 'prospective procedure providing process').

1. Procedure Graph Generating Process

Figure 15:
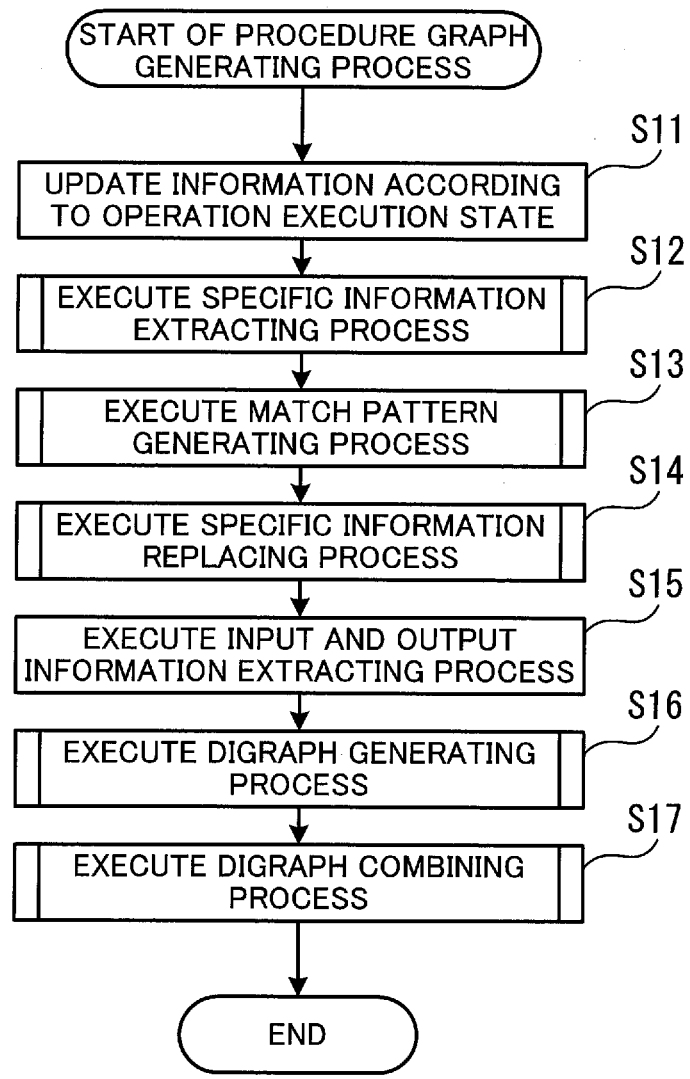
FIG. 15 is a flowchart illustrating a procedure example of a procedure graph generating process.

First, the procedure graph generating process is described in detail. FIG. 15 is a flowchart illustrating a procedure example of a procedure graph generating process. The process of FIG. 15 is described next according to the step numbers in the flowchart.

[Step S11] The information acquiring unit 191 acquires operation execution state of each ICT system and then updates information stored in the procedure log database 110, the CMDB 120, and the performance record storing unit 180. In addition, the information acquiring unit 191 generates modification logs in accordance with modification of configuration information sets stored in the CMDB 120, and then stores the modification logs in the modification log database 130.

[Step S12] Based on each of the modification logs stored in the modification log database 130, the normalizing unit 192 executes a process of extracting specific information of a corresponding ICT system or server included in an ICT system. This process, hereinafter referred to as the 'specific information extracting process', is described in detail later (see FIGS. 17 and 18).

[Step S13] For each type of the extracted specific information, the normalizing unit 192 generates a match pattern indicating a location at which the specific information type appears. This process, hereinafter referred to as the 'match pattern generating process', is described in detail later (see FIG. 20).

[Step S14] The normalizing unit 192 normalizes specific information at a location matching each of the match patterns. In the normalization process, for example, the normalizing unit 192 replaces specific information with a variable name corresponding to the type of the specific information. This process, hereinafter referred to as the 'specific information replacing process', is described in detail later (see FIG. 25).

[Step S15] The graph generating unit 193 extracts pairs of input and output information. For example, each pair of input and output information extracted by the graph generating unit 193 is pre-modification and post-modification information, respectively, of a section modified in a configuration information set as a result of operations having been executed on an ICT system according to an operating procedure indicated by a corresponding procedure log. This process is hereinafter referred to as the 'input and output information extracting process'.

[Step S16] The graph generating unit 193 generates digraphs each representing an operating procedure for transforming a corresponding configuration information set from paired input information to output information. This process, hereinafter referred to as the 'digraph generating process', is described in detail later (see FIG. 31).

[Step S17] The graph generating unit 193 combines the digraphs to thereby generate the procedure graph 161, which is then stored in the procedure graph database 160. This process, hereinafter referred to as the 'digraph combining process', is described in detail later (see FIGS. 35 to 39).

In the above-described procedure, the procedure graph 161 is generated. The following describes in detail each of the processing steps of FIG. 15.

1-1. Process of Updating Information according to Operation Execution State

Next described is the process of updating information according to operation execution state (step S11 of FIG. 15). For example, the information acquiring unit 191 acquires, from each ICT system, a series of operations input from a terminal used by a user. Each series of operations is represented by commands input to the ICT system and parameters of the commands. In addition, the information acquiring unit 191 recognizes, for example, multiple operations input during a predetermined period of time as a series of operations.

The information acquiring unit 191 then generates a procedure log including the acquired series of operations. Subsequently, the information acquiring unit 191 stores, in the procedure log database 110, the generated procedure log in association with a user ID of the user managing the ICT system on which, the series of operations have been executed.

Note that the information acquiring unit 191 prestores, in a storage device such as a memory, a correspondence between, for example, identification information of ICT systems and user IDs of users managing the individual ICT systems. Then, the information acquiring unit 191 attaches a user ID corresponding to an ICT system, from which a series of operations has been acquired, to a procedure log generated based on the series of operations.

In addition, the information acquiring unit 191 updates the performance record information in the performance record storing unit 180 according to the acquired series of operations. For example, the information acquiring unit 191 increments, in an operation performance record table associated with a user ID of the user having carried out the series of operations, a value in the performance column corresponding to each command included in the series of operations by the number of times the command has been executed in the series of operations. The information acquiring unit 191 also acquires, from the corresponding ICT system, an operational time taken to execute each command included in the series of operations. Based on the operational time of each executed command, the information acquiring unit 191 updates, in the operational time performance record table 180a, a value in the operational time column corresponding to the command.

Further, in the case where the configuration of the ICT system has been modified due to the series of operations having been executed on the ICT system, the information acquiring unit 191 acquires, from the ICT system, a configuration information set after the modification, which is then stored in the CMDB 120. Note here that when a series of operations accompanied by configuration modification of an ICT system is executed and the configuration of the ICT system is therefore modified, a corresponding configuration information set in the CMDB 120 is also modified. Upon the modification of the content of the configuration information set, the information acquiring unit 191 generates a modification log indicating the modification content.

Figure 16:
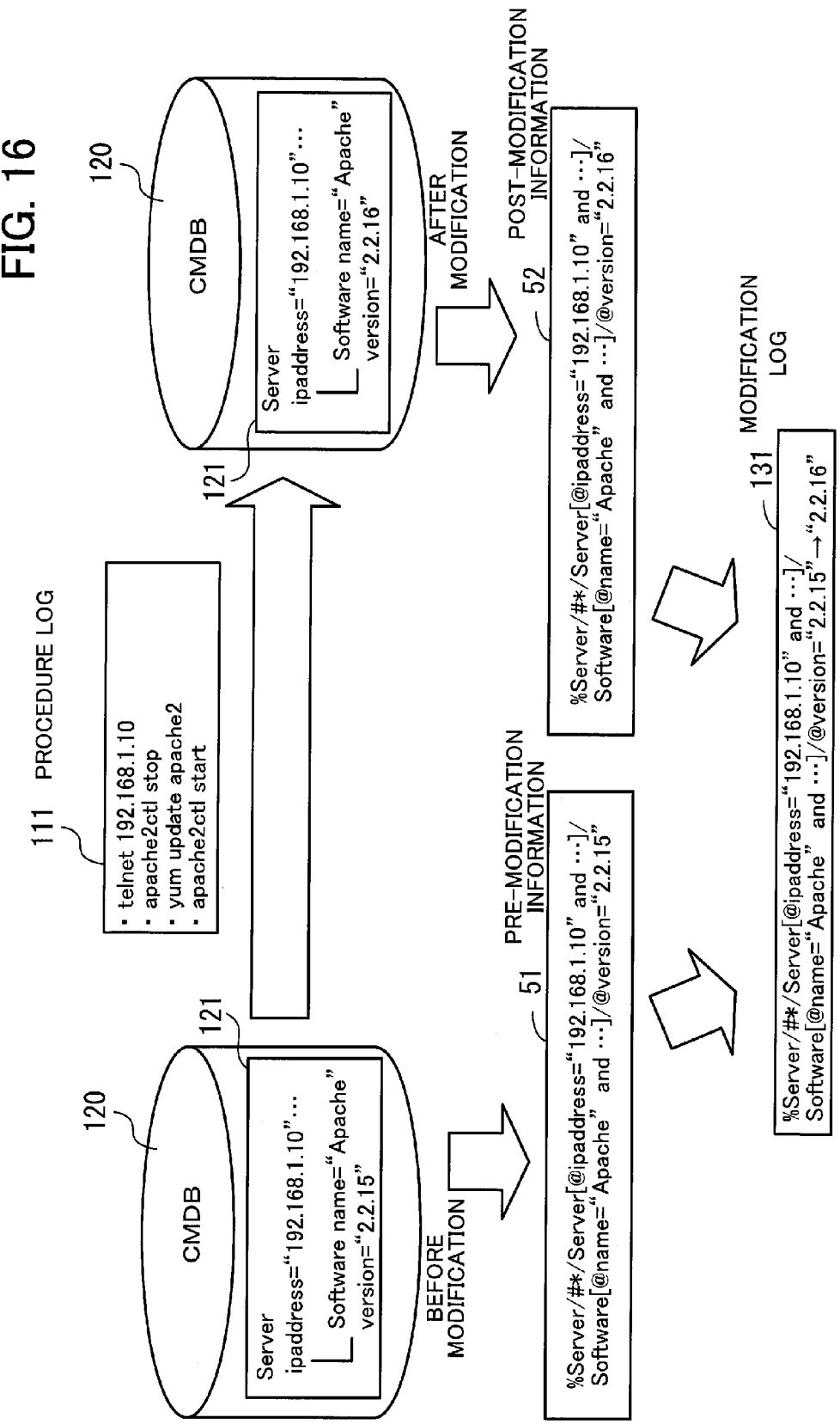
FIG. 16 illustrates an example of generating a modification log.

FIG. 16 illustrates an example of generating a modification log. The example of FIG. 16 represents a case in which the modification log 131 is generated when operations set out in the procedure log 111 are carried out. In the case where the operations set out in the procedure log 111 are carried out, a process of updating Web server software is performed in the ICT system 41. Assume that the Web server software is updated from Version 2.2.15 to Version 2.2.16. In this case, by referring to, in the CMDB 120, the configuration information set 121 before the update associated with the user 21, the information acquiring unit 191 generates pre-modification information 51 that includes an XPath expression defining a location of the version of the Web server software and its version number. In addition, the information acquiring unit 191 updates, in the CMDB 120, the configuration information set 121 associated with the user 21. Then, by referring to the configuration information set 121 after the update, the information acquiring unit 191 generates post-modification information that includes an XPath expression defining a location of the version of the Web server software and its version number.

Subsequently, the information acquiring unit 191 generates the modification log 131 indicating a modified content of the post-modification information 52 relative to the pre-modification information 51. The modification log 131 indicates the modified content by replacing the section modified in the pre-modification information 51 with 'pre-modification value→post-modification value'. According to the example of FIG. 16, within the modification log 131, "2.2.15"→"2.2.16" is set in the section for the version number, thereby indicating that the version has been changed from Version 2.2.15 to Version 2.2.16. The modification log 131 generated in the above-described manner is then stored in the modification log database 130 by the information acquiring unit 191.

1-2. Specific Information Extracting Process

Figure 17:
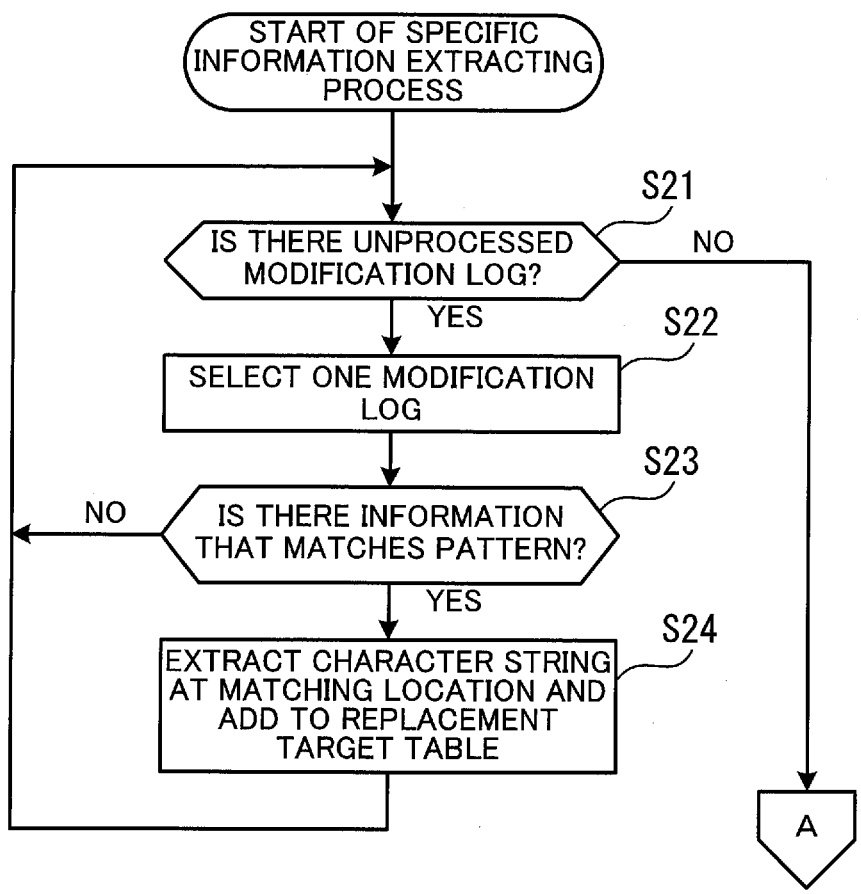
FIG. 17 is a flowchart illustrating a first part of a procedure example of a specific information extracting process.

Next described is the specific information extracting process (step S12 of FIG. 15). FIG. 17 is a flowchart illustrating a first part of a procedure example of a specific information extracting process. In the first part of the specific information extracting process, specific information is extracted from modification logs. The process of FIG. 17 is described next according to the step numbers in the flowchart.

[Step S21] The normalizing unit 192 determines whether there is an unprocessed modification log in the modification log database 130. If there is an unprocessed modification log, the normalizing unit 192 proceeds to step S22. On the other hand, if processing of steps S22 to S24 has been completed for all modification logs of the modification log database 130, the normalizing unit 192 proceeds to step S31 (see FIG. 18).

[Step S22] The normalizing unit 192 selects one unprocessed modification log from the modification log database 130.

[Step S23] The normalizing unit 192 determines whether the selected modification log includes information matching a pattern registered in the specific information table 141 of the specific information pattern storing unit 140. For example, if a location of data in the modification log matches a pattern in the specific information table 141, the normalizing unit 192 recognizes the data as specific information needed to be converted.

According to the example of FIG. 9, an XPath expression of the modification log 131 is '% Server/#*/Server[@ipaddress="192.168.1.10" and . . . ]/Software[@name="Apache" and . . . ]@version="2.2.15"→"2.2.16"'. The normalizing unit 192 recognizes, as specific information, a value "192.168.1.10" set in a part of the modification log 131, which part matches the pattern '%*[@ipaddress]' of the specific information table 141.

If there is information matching a pattern in the specific information table 141, the normalizing unit 192 proceeds to step S24. If not, the normalizing unit 192 proceeds to step S21.

[Step S24] The normalizing unit 192 extracts a character string at the matching location in the selected modification log, and adds the character string to a replacement target table. For example, the normalizing unit 192 adds, to the replacement target table, a pair of the character string and a user ID corresponding to the modification log from which the character string has been extracted. Subsequently, the normalizing unit 192 proceeds to step S21.

In the above-described manner, specific information is extracted from modification logs. According to the example of FIG. 9, the modification logs 131 to 133 include, as specific information, IP addresses of servers included in individual ICT systems. Therefore, the IP addresses are extracted as specific information from the modification logs 131 to 133.

Figure 18:
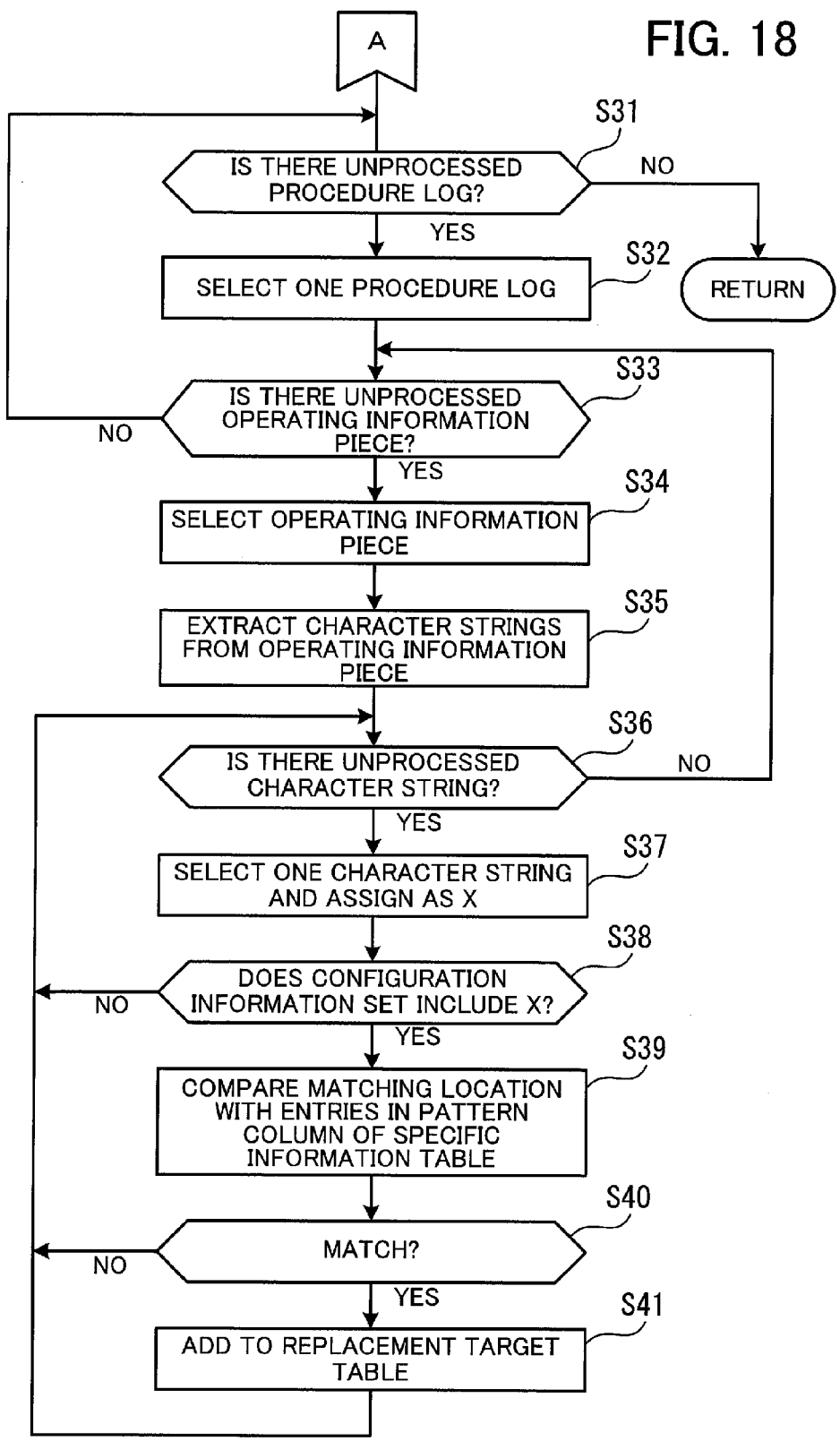
FIG. 18 is a flowchart illustrating a second part of the procedure example of the specific information extracting process.

FIG. 18 is a flowchart illustrating a second part of the procedure example of the specific information extracting process. In the second part of the specific information extracting process, specific information is extracted from procedure logs. The process of FIG. 18 is described next according to the step numbers in the flowchart.

[Step S31] The normalizing unit 192 determines whether, in the procedure log database 110, there is a procedure log not having undergone processing of steps S32 to S41. If there is an unprocessed procedure log, the normalizing unit 192 proceeds to step S32. If not, the normalizing unit 192 ends the specific information extracting process.

[Step S32] The normalizing unit 192 selects one unprocessed procedure log from the procedure log database 110.

[Step S33] The normalizing unit 192 determines whether, in the procedure log selected in step S32, there is an operating information piece not having undergone processing of steps S34 to S41. If there is an unprocessed operating information piece, the normalizing unit 192 proceeds to step S34. If not, the normalizing unit 192 proceeds to step S31.

[Step S34] The normalizing unit 192 selects one unprocessed operating information piece from the procedure log selected in step S32.

[Step S35] The normalizing unit 192 extracts a character string group from the selected operating information piece. For example, the normalizing unit 192 splits the operating information piece into multiple character strings using spaces as separators. Then, the normalizing unit 192 extracts the split character strings.

[Step S36] The normalizing unit 192 determines whether, in the character strings extracted in step S35, there is a character string not having undergone processing of steps S37 to S41. If there is an unprocessed character string, the normalizing unit 192 proceeds to step S37. If not, the normalizing unit 192 proceeds to step S33.

[Step S37] The normalizing unit 192 selects one unprocessed character string from the character strings extracted in step S35 and assigns the character string as Variable X.

[Step S38] By referring to, in the CMDB 120, a configuration information set associated with a user corresponding to the procedure log selected in step S32, the normalizing unit 192 determines whether the character string assigned as Variable X is included in the configuration information set. If the character string assigned as Variable X is included, the normalizing unit 192 proceeds to step S39. If not, the normalizing unit 192 proceeds to step S36.

[Step S39] The normalizing unit 192 compares a location in the configuration information set, at which a character string matching the character string of Variable X appears, with the entries in the pattern column of the specific information table 141.

[Step S40] As a result of the comparison, the normalizing unit 192 determines whether the appearance location of the character string of Variable X in the configuration information set matches a pattern in the specific information table 141. If the appearance location matches a pattern in the specific information table 141, the normalizing unit 192 proceeds to step S41. If not, the normalizing unit 192 proceeds to step S36.

[Step S41] The normalizing unit 192 adds the character string assigned as Variable X to the replacement target table. For example, the normalizing unit 192 adds, to the replacement target table, a pair of the character string and a user ID corresponding to the procedure log from which the character string has been extracted. Subsequently, the normalizing unit 192 proceeds to step S36.

In the above-described manner, character strings are extracted by splitting each operating information piece of a procedure log based on spaces included in the operating information piece, and each of the extracted character strings is searched for in a corresponding configuration information set of the CMDB 120. Then, it is determined whether the location in the configuration information set, at which a character string matching the extracted character string appears, matches an XPath expression in the pattern column of the specific information table 141. In the case where the location matches a pattern, the character string is determined as specific information.

According to the example of FIG. 7, in the procedure log 111, the first operating information piece includes a character string '192.168.1.10'. When, in the CMDB 120, the character string '192.168.1.10' is searched for in the configuration information set 121 associated with the user 21 with the user ID 'user #1', it matches a configuration item 'Server ipaddress="192.168.1.10"'. 'ipaddress' of the configuration item matches the XPath expression '%*[@ipaddress]' in the specific information table 141. As a result, the character string '192.168.1.10' is determined as specific information.

Thus, character strings of specific information extracted from procedure logs and modification logs are registered in replacement target tables. Character strings registered in replacement target tables are hereinafter referred to as 'original character strings'.

Figure 19:
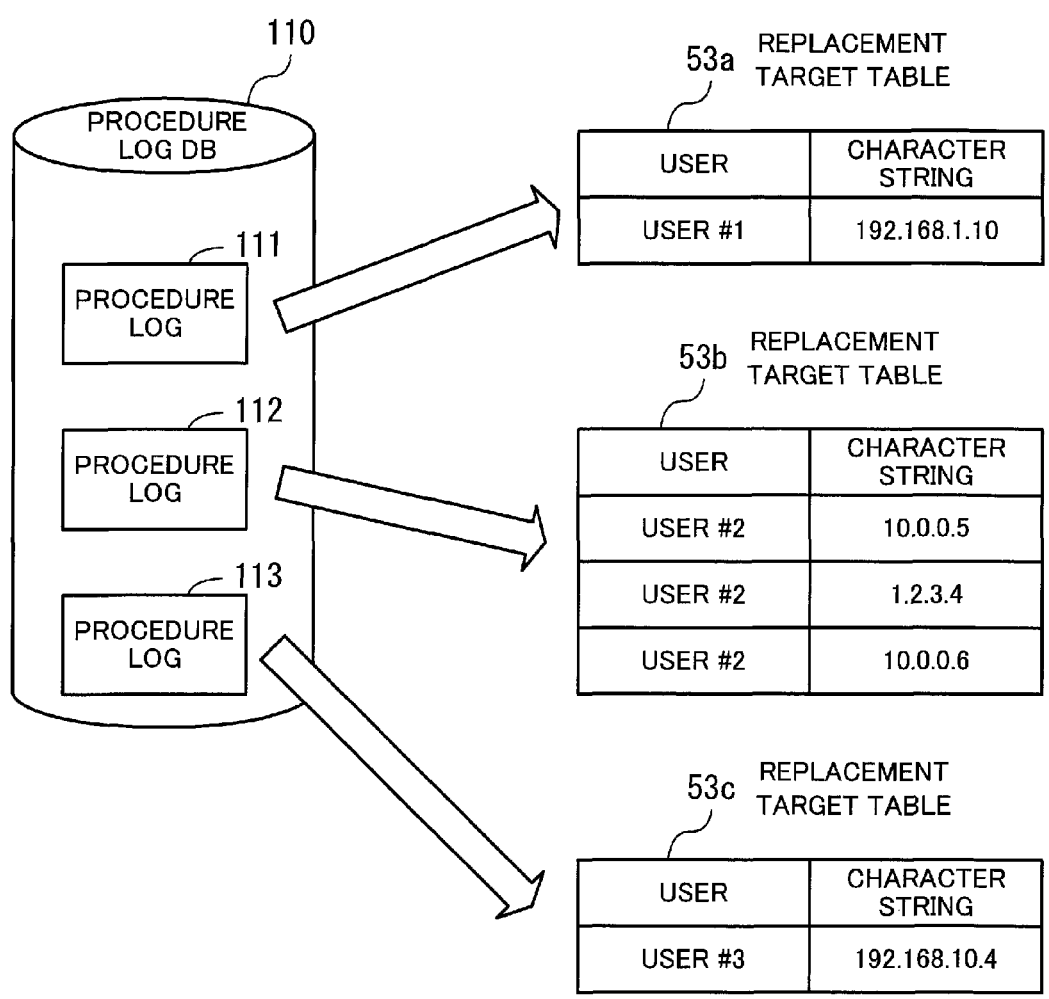
FIG. 19 illustrates an example of a data structure of replacement target tables.

FIG. 19 illustrates an example of a data structure of replacement target tables. FIG. 19 depicts replacement target tables 53a, 53b, and 53c generated when individual operating procedures corresponding to the procedure logs 111 to 113 of FIG. 7 are carried out. Each of the replacement target tables 53a, 53b, and 53c includes columns of 'user' and 'character string'. Each field in the user column has a user ID of a user associated with a procedure log or a modification log from which corresponding specific information has been extracted. Each field in the character string column has a character string extracted as specific information. The replacement target tables 53a, 53b, and 53c are stored, for example, in a storage area within the RAM 102, managed by the normalizing unit 192.

1-3. Match Pattern Generating Process

Next described is the match pattern generating process (step S13 of FIG. 15). Upon extraction of specific information from procedure logs and modification logs, the specific information is converted to reusable expressions with reference to the individual configuration information sets of the CMDB 120. At this point, the specific information is converted to patterns allowing configurations of the same type to be expressed in the same manner.

Such a conversion is explained here with an example using the CMDB 120. In the CMDB 120, configuration information sets are expressed in a common data description format (schema) and, therefore, configurations of the same type are expressed in the same manner. For example, the procedure log 111 of FIG. 7 includes the IP address '192.168.1.10' as specific information. The IP address corresponds to a value "192.168.1.10" of the IP address (ipaddress=) of the server (type="Server") in the configuration information set 121 (see FIG. 8) associated with the user 21 with the user ID 'user #1'. By using the CMDB 120, the location of the IP address is expressed in the XPath language as '% Server//@ipaddress'. This expression is also usable for configuration information sets of different users. An XPath expression indicating a location in the CMDB 120 at which location a value of specific information appears is an example of match patterns. Match patterns may be expressions in a format other than XPath expressions defining locations in the CMDB 120 as long as the patterns are capable of abstracting, for example, type names of components (e.g., server and software) and application names (e.g., Apache) in operating procedures and are, therefore, reusable.

Figure 20:
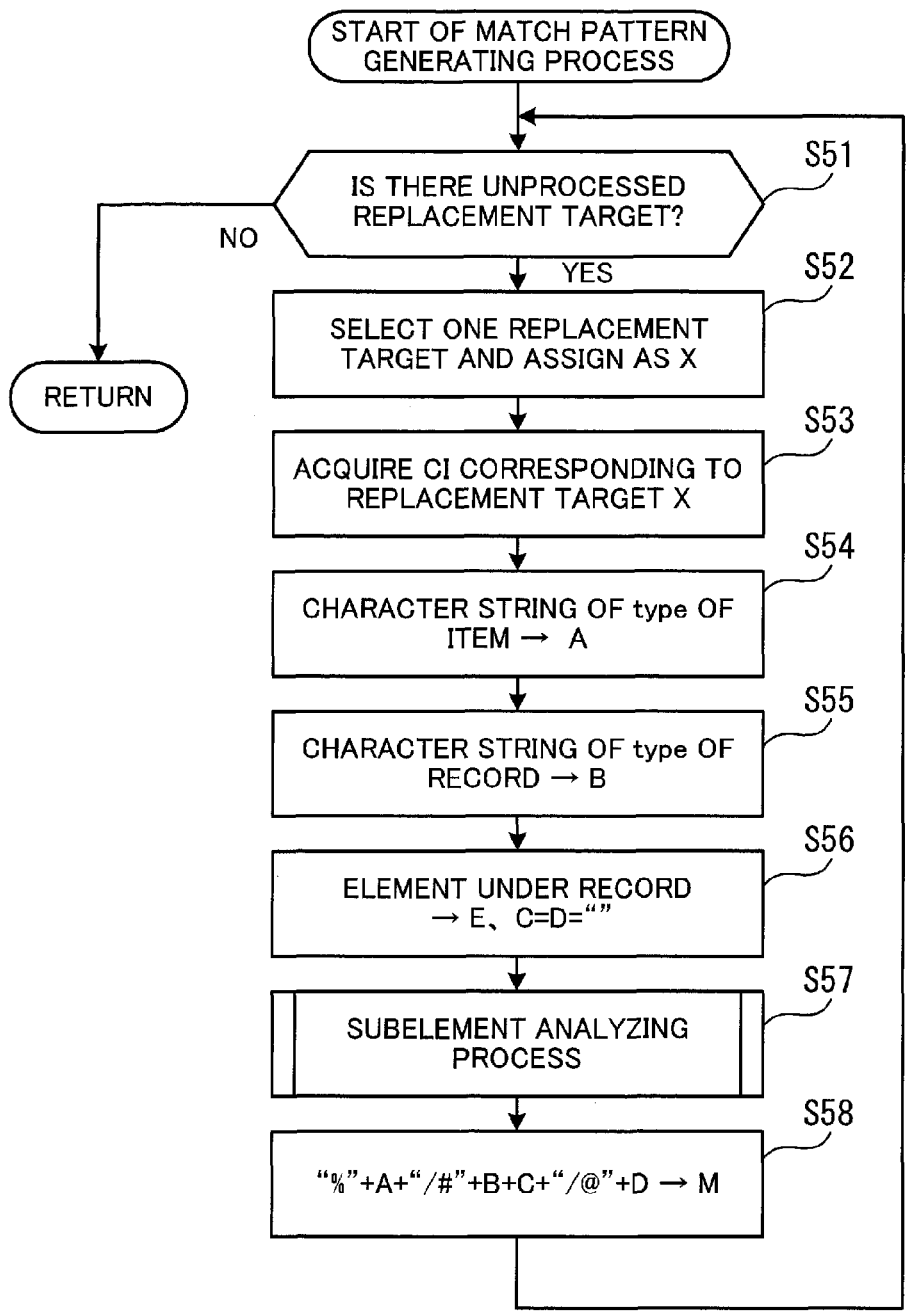
FIG. 20 is a flowchart illustrating a procedure example of a match pattern generating process.

As an example, in the following description, a replacement target is expressed by a match pattern using an XPath expression defining a location in the CMDB 120. FIG. 20 is a flowchart illustrating a procedure example of a match pattern generating process. The process of FIG. 20 is described next according to the step numbers in the flowchart.

[Step S51] The normalizing unit 192 determines whether there is a replacement target not having undergone processing of steps S52 to S58 in replacement target tables. If there is an unprocessed replacement target, the normalizing unit 192 proceeds to step S52. If not, the normalizing unit 192 ends the match pattern generating process.

[Step S52] The normalizing unit 192 selects one unprocessed replacement target from the replacement target tables and assigns the replacement target as Variable X.

[Step S53] Among configuration items of a configuration information set associated with a user ID corresponding to the selected replacement target, the normalizing unit 192 acquires a configuration item including an original character string of the replacement target.

[Step S54] The normalizing unit 192 assigns, as Variable A, a character string of 'type' of the item of the acquired configuration item.

[Step S55] The normalizing unit 192 assigns, as Variable B, a character string of 'type' of a record of the acquired configuration item.

[Step S56] The normalizing unit 192 assigns, as Variable E, an element under the record. In addition, the normalizing unit 192 empties contents of Variables C and D.

[Step S57] The normalizing unit 192 executes a subelement analyzing process on a subelement indicated by Variable E. The subelement analyzing process is described in detail later (see FIG. 21).

[Step S58] The normalizing unit 192 assigns a value '"%"+A+"/#"+B+C+"/@"+D' as Variable M. Here, as for the letters in double quotation marks (" "), the letters are set in Variable M. The values of Variables A, B, C, and D are set in the corresponding positions in the value '"%"+A+"/#"+B+C+"/@"+D'. Subsequently, the normalizing unit 192 proceeds to step S51.

Figure 21:
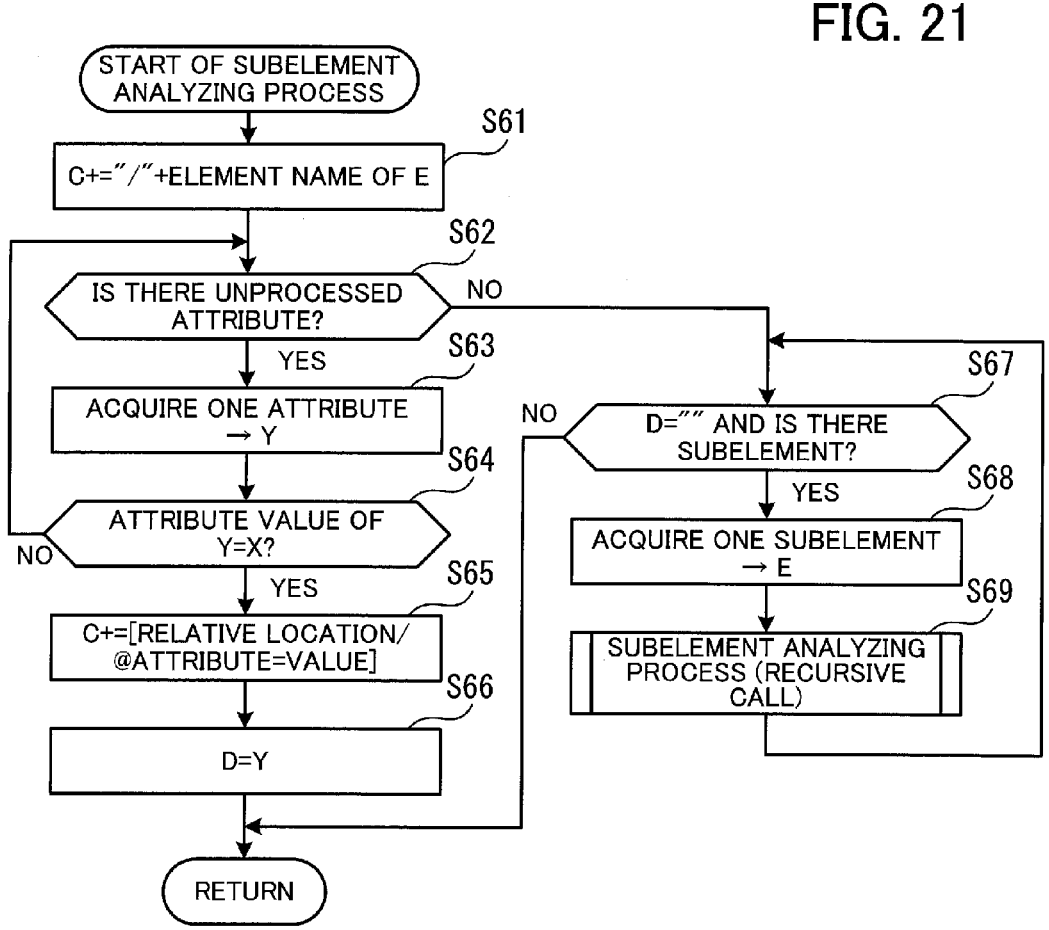
FIG. 21 is a flowchart illustrating a procedure example of a subelement analyzing process.

FIG. 21 is a flowchart illustrating a procedure example of a subelement analyzing process. The process of FIG. 21 is described next according to the step numbers in the flowchart.

[Step S61] The normalizing unit 192 adds, to the value set as Variable C, a letter '/' and the value of Variable E to be positioned at the back. This processing is expressed as 'C+="/"+element name of E'. '+=' in the expression is a compound assignment operator, and the expression represents adding the value on the right side of the expression to the back of the current value of Variable C and assigning the result of the addition as a new value of Variable C.

[Step S62] The normalizing unit 192 determines whether, among attributes in the element indicated by Variable E, there is an attribute not having undergone processing of step S63. If there is an unprocessed attribute, the normalizing unit 192 proceeds to step S63. If not, the normalizing unit 192 proceeds to step S67.

[Step S63] The normalizing unit 192 acquires one unprocessed attribute from the element indicated by Variable E and assigns the attribute as Variable Y.

[Step S64] The normalizing unit 192 determines whether a value of the attribute assigned as Variable Y is equal to the value of Variable X which indicates the original character string of the replacement target. If the two values are equal to each other, the normalizing unit 192 proceeds to step S65. If not, the normalizing unit 192 proceeds to step S62.

[Step S65] The normalizing unit 192 adds 'relative location/@attribute=value' to the back of the value assigned as Variable C. This processing is expressed as 'C+=[relative location/@attribute=value]'. In the expression, '+=' is a compound assignment operator. In addition, 'relative location' here is an XPath expression defining a relative location of the attribute having a value equal to the original character string of the replacement target to a location of pre-modification information (XPath expression defining a modified location) of a modification log corresponding to an operating procedure from which the replacement target has been extracted.

[Step S66] The normalizing unit 192 assigns the value of Variable Y as Variable D, and then ends the subelement analyzing process.

[Step S67] In the case where, in the element indicated by Variable E, there is no attribute having an attribute value equal to Variable X (NO in step S62), the normalizing unit 192 determines whether the value of Variable D is empty and there is a subelement under the element indicated by Variable E. If the value of Variable D is empty and there is a subelement, the normalizing unit 192 proceeds to step S68. On the other hand, if the value of Variable D is not empty or there is no subelement, the normalizing unit 192 ends the subelement analyzing process.

[Step S68] The normalizing unit 192 acquires one unselected subelement from among subelements under the element indicated by the current Variable E, and assigns the acquired subelement as a new Variable E.

[Step S69] The normalizing unit 192 recursively carries out the subelement analyzing process. Upon completion of the subelement analyzing process executed by the recursive call, the normalizing unit 192 proceeds to step S67.

In the above-described manner, a match pattern is generated for each extracted replacement target based on a configuration item including an original character string of the replacement target. In particular, since including an XPath defining a relative location of modification, the match pattern has better coordination with the modification content.

Figure 22:
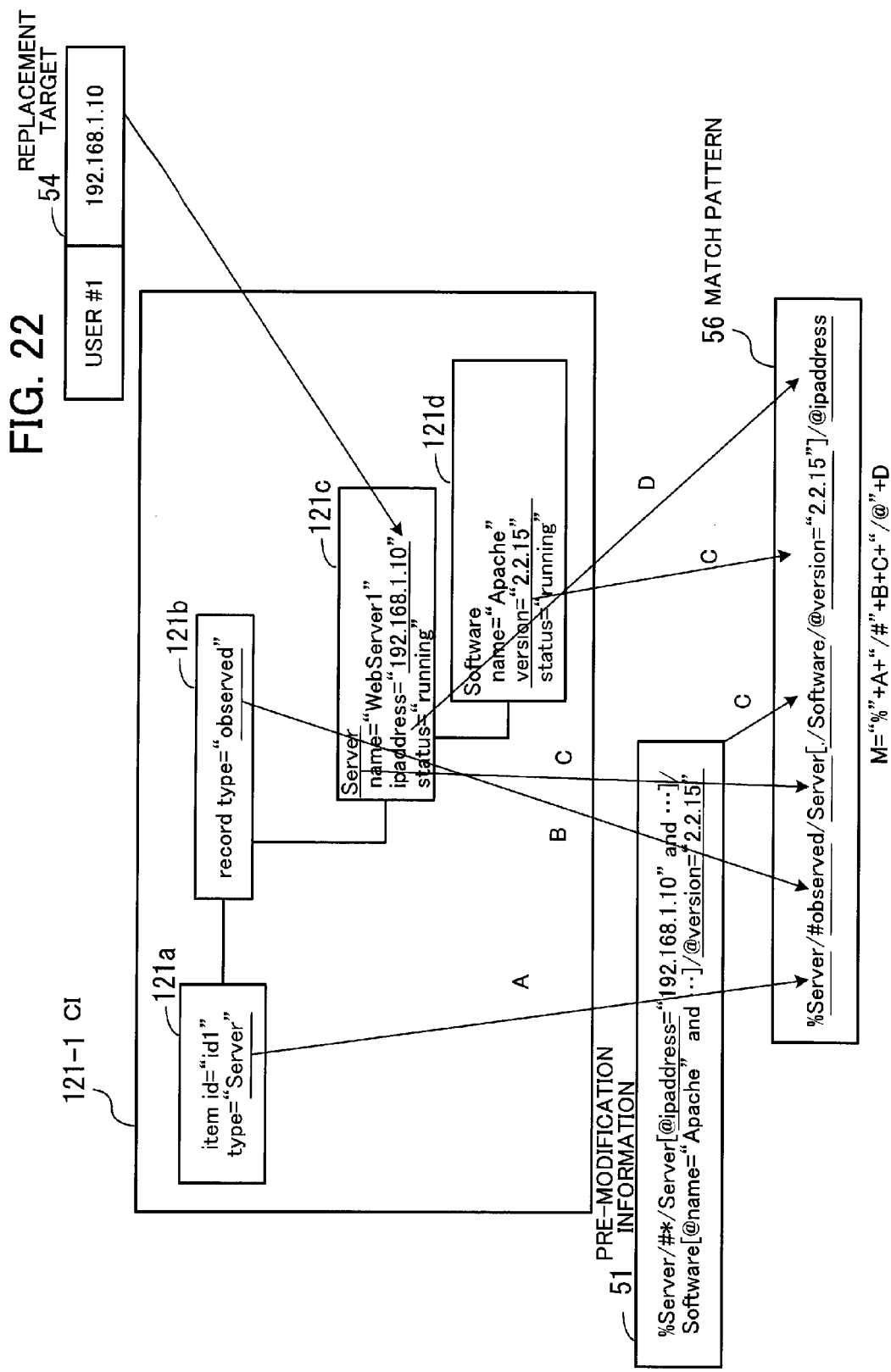
FIG. 22 illustrates an example of generating a match pattern.

The following gives a specific example of generating a match pattern. FIG. 22 illustrates an example of generating a match pattern. The example of FIG. 22 is directed to generation of a match pattern 56 for the case where a replacement target 54 is the IP address '192.168.1.10' extracted from a procedure log having been generated based on operations carried out by the user 21 (with the user ID 'user #1'). The replacement target 54 is associated with the user ID 'user #1'. Therefore, from among configuration items in the configuration information set 121 corresponding to 'user #1', the configuration item 121-1 including the original character string of the replacement target 54 is acquired.

From among information of the configuration item 121-1, a character string (Server) of 'type' of the item in the element 121a is acquired and assigned as Variable A. In addition, a character string (observed) of 'type' of the record in the element 121b is acquired and assigned as Variable B. Further, values of Variables C and D are emptied (C=D=" "), and the following process is executed on a group of attributes of the element 121c under the element 121b.

First, an element name (Server) of the element 121c is assigned as Variable C (C+="/"+element name). Second, a value of each attribute is checked to be equal to the original character string (192.168.1.10) of the replacement target 54. Subsequently, an attribute (ipaddress) having a value equal to the original character string of the replacement target 54 is assigned as Variable D.

Further, '[relative location/@attribute=value]' is added to Variable C, where 'relative location' (./Software) is a relative location of the attribute assigned as Variable D to a location of an attribute targeted for modification in the pre-modification information 51 of the modification log 131; 'attribute' (version) is the attribute targeted for modification; and 'value' ("2.2.15") is a value of the attribute targeted for modification. As long as D=" " and there is still a subelement, the subelement analyzing process is recursively carried out. Then, Variables A, B, C, and D are assigned to the XPath expression '"%"+A+"/#"+B+C+"/@"+D', to form the match pattern 56. In the above-described manner, a match pattern corresponding to an original character string of each replacement target is generated.

1-4. Specific Information Replacing Process

Next described is the specific information replacing process (step S14 of FIG. 15). If, when a match pattern is generated, the match pattern already exists in the variable correspondence table 151 (see FIG. 11), a variable name associated with the match pattern is used. If the match pattern does not exist, a new variable name unique to the match pattern is created and then added to the variable correspondence table 151 in association with the match pattern.

For example, the normalizing unit 192 registers the variable name corresponding to the match pattern in a conversion table so that the variable name is used to replace the original character string. FIG. 23 illustrates an example of assigning a variable name. In the example of FIG. 23, the variable name '$var1' is associated with the original character string '192.168.1.10', and the paired original character string and variable name are registered in a conversion table 58a. In addition, the match pattern generated based on the registered original character string '192.168.1.10' is associated with the same variable name '$var1' with which the original character string is associated, and the paired variable name and match pattern are registered in the variable correspondence table 151. Such a conversion table is generated each time a procedure log is acquired.

FIG. 24 illustrates an example of conversion tables. The conversion table 58a is generated based on the modification log 131 and the procedure log 111 corresponding to the user ID 'user #1'. A conversion table 58b is generated based on the modification log 132 and the procedure log 112 corresponding to the user ID 'user #2'. A conversion table 58c is generated based on the modification log 133 and the procedure log 113 corresponding to the user ID 'user #3'.

Based on the conversion table 58a, the normalizing unit 192 converts specific information in the procedure log 111 to the variable name. At this point, the match pattern may include specific information. Therefore, in the specific information extracting process, the normalizing unit 192 confirms whether the match pattern includes specific information. If specific information is included, the normalizing unit 192 carries out registration in the variable correspondence table 151 and the conversion table 58a and replacement of the specific information according to the above-described flow.

Figure 25:
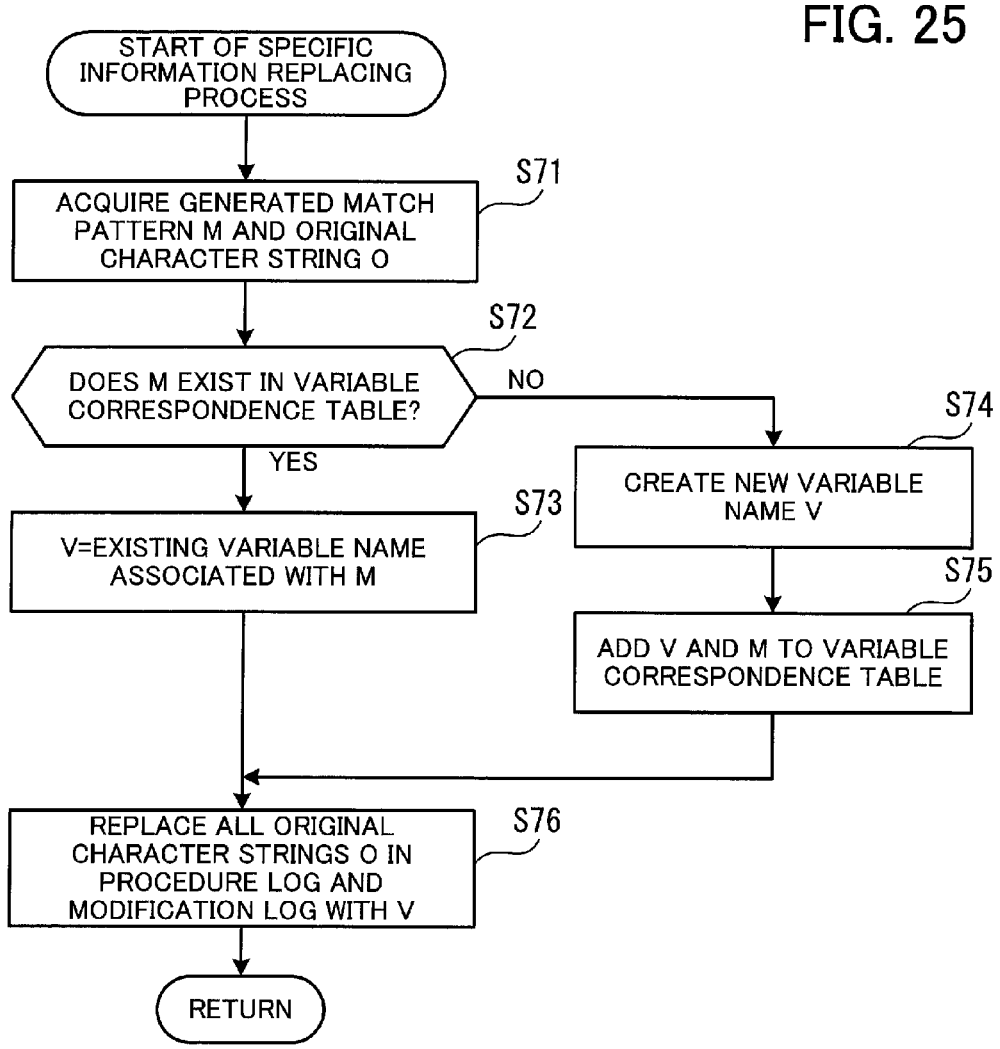
FIG. 25 is a flowchart illustrating a procedure example of a specific information replacing process.

FIG. 25 is a flowchart illustrating a procedure example of a specific information replacing process. The process of FIG. 25 is described next according to the step numbers in the flowchart. Note that the process of FIG. 25 is carried out each time a match pattern is generated.

[Step S71] The normalizing unit 192 assigns a generated match pattern as Variable M, and assigns an original character string based on which the match pattern has been generated as Variable O.

[Step S72] The normalizing unit 192 determines whether the same match pattern as that assigned as Variable M exists in the variable correspondence table 151. If the same match pattern exists, the normalizing unit 192 proceeds to step S73. If not, the normalizing unit 192 proceeds to step S74.

[Step S73] The normalizing unit 192 assigns, as Variable V, a variable name associated with the match pattern assigned as Variable M in the variable correspondence table 151. Subsequently, the normalizing unit 192 proceeds to step S76. At this point, the normalizing unit 192 additionally registers the paired original character string assigned as Variable O and variable name assigned as Variable V in a corresponding conversion table.

[Step S74] The normalizing unit 192 creates a new variable name and assigns the new variable name as Variable V. The newly created variable name is different from variable names already registered in the variable correspondence table 151. At this point, the normalizing unit 192 additionally registers the paired original character string assigned as Variable O and variable name assigned as Variable V in a corresponding conversion table.

[Step S75] The normalizing unit 192 additionally registers the paired variable name assigned as Variable V and match pattern assigned as Variable M in the variable correspondence table 151.

[Step S76] The normalizing unit 192 replaces, with the variable name assigned as Variable V, the same character strings as that assigned as Variable O in the procedure log and the modification log based on which the match pattern has been generated.

Figure 26:
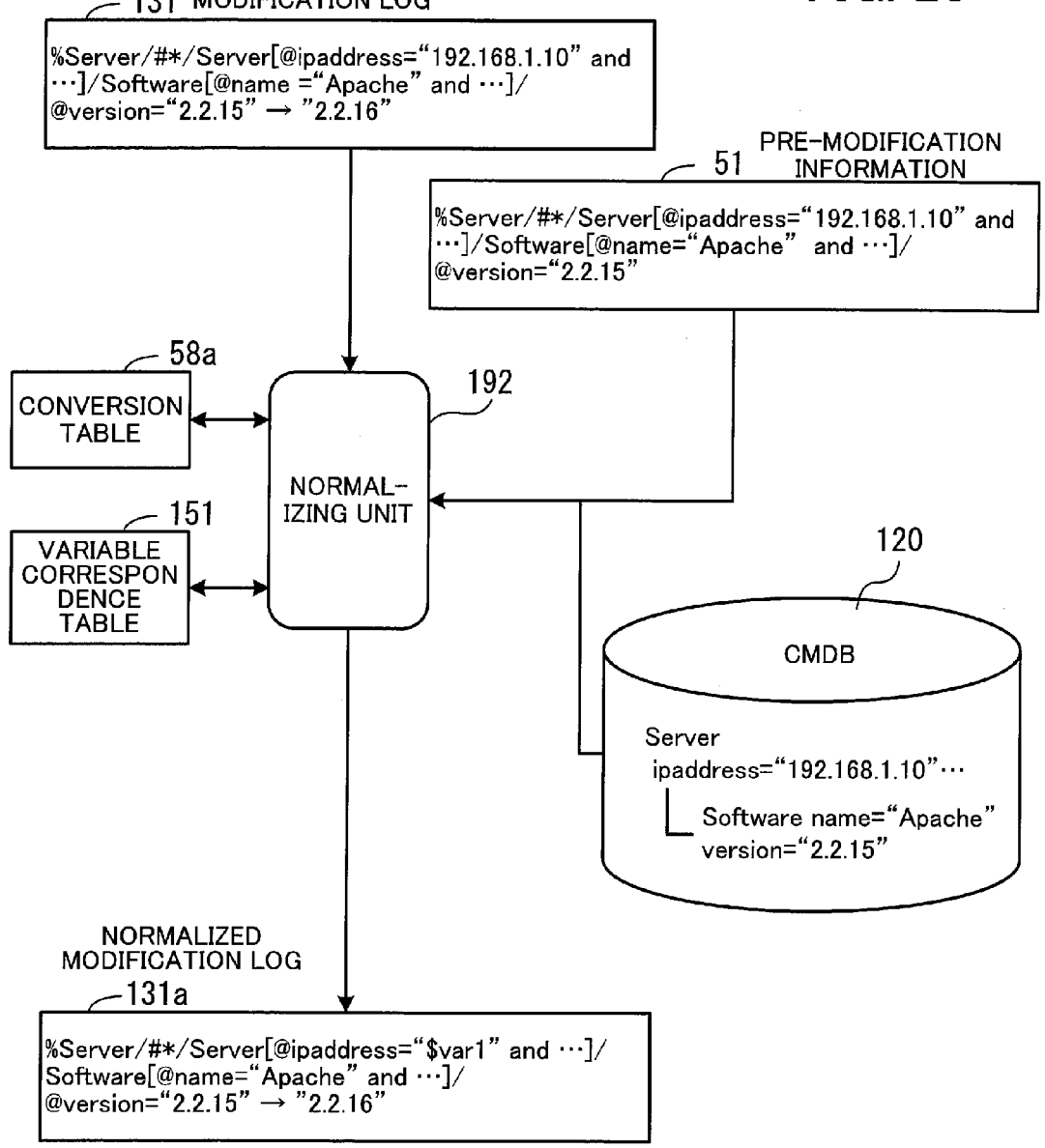
FIG. 26 illustrates an example of normalizing the modification log.

In the above-described manner, specific information is replaced. FIG. 26 illustrates an example of normalizing a modification log. According to an example of FIG. 26, the character string '192.168.1.10' in the modification log 131 is an original character string targeted for replacement. The normalizing unit 192 replaces the original character string with the variable name '$var1' by referring to the pre-modification information 51 and the CMDB 120 and using the conversion table 58a and the variable correspondence table 151. In this manner, a normalized modification log 131a including no original character string is generated.

Figure 27:
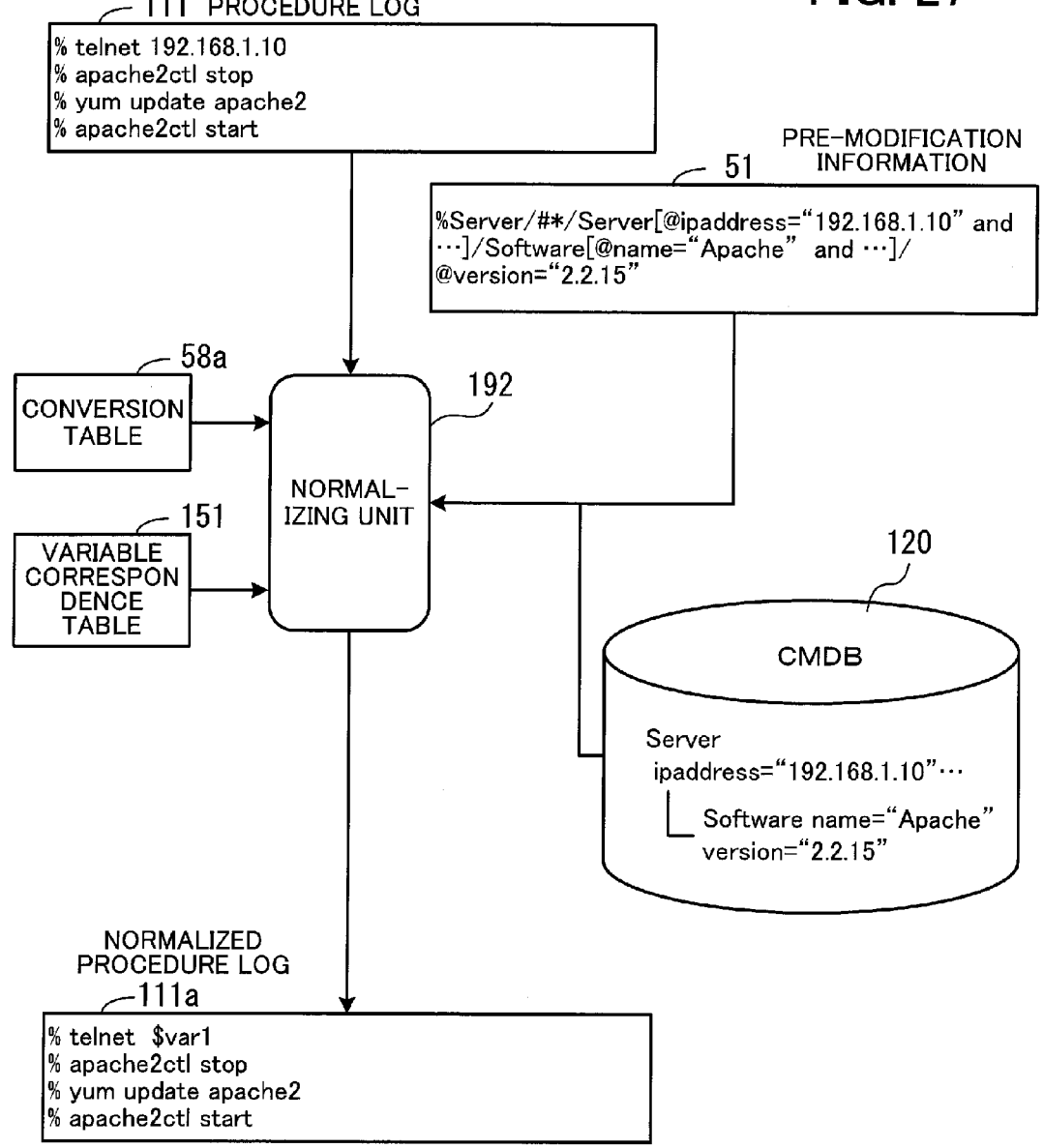
FIG. 27 illustrates an example of normalizing a procedure log.

In a similar fashion to replacing the specific information in the modification log with the variable name, specific information in a corresponding procedure log is replaced with a variable name. FIG. 27 illustrates an example of normalizing a procedure log. According to an example of FIG. 27, the character string '192.168.1.10' in the procedure log 111 is an original character string targeted for replacement. The normalizing unit 192 replaces the original character string with the variable name '$var1' by referring to the pre-modification information 51 and the CMDB 120 and using the conversion table 58a and the variable correspondence table 151. In this manner, a normalized procedure log 111a including no original character string is generated.

Note that in the case where a corresponding modification log has been normalized prior to the normalization of the procedure log, it is possible to use information already registered in the variable correspondence table 151 and the conversion table 58a during the replacing process for the modification log. For example, in the case of the procedure log 111, the character string '192.168.1.10' is extracted as specific information. A variable name of a match pattern matching the character string '192.168.1.10' has already been registered as '$var1' in the variable correspondence table 151. In addition, the character string '192.168.1.10' has been registered also in the conversion table 58a as '$var1'. Since no particular changes have been made in the variable correspondence table 151 and the conversion table 58a, the original character string in the procedure log 111 may be replaced with the variable name based on these tables.

Figure 28:
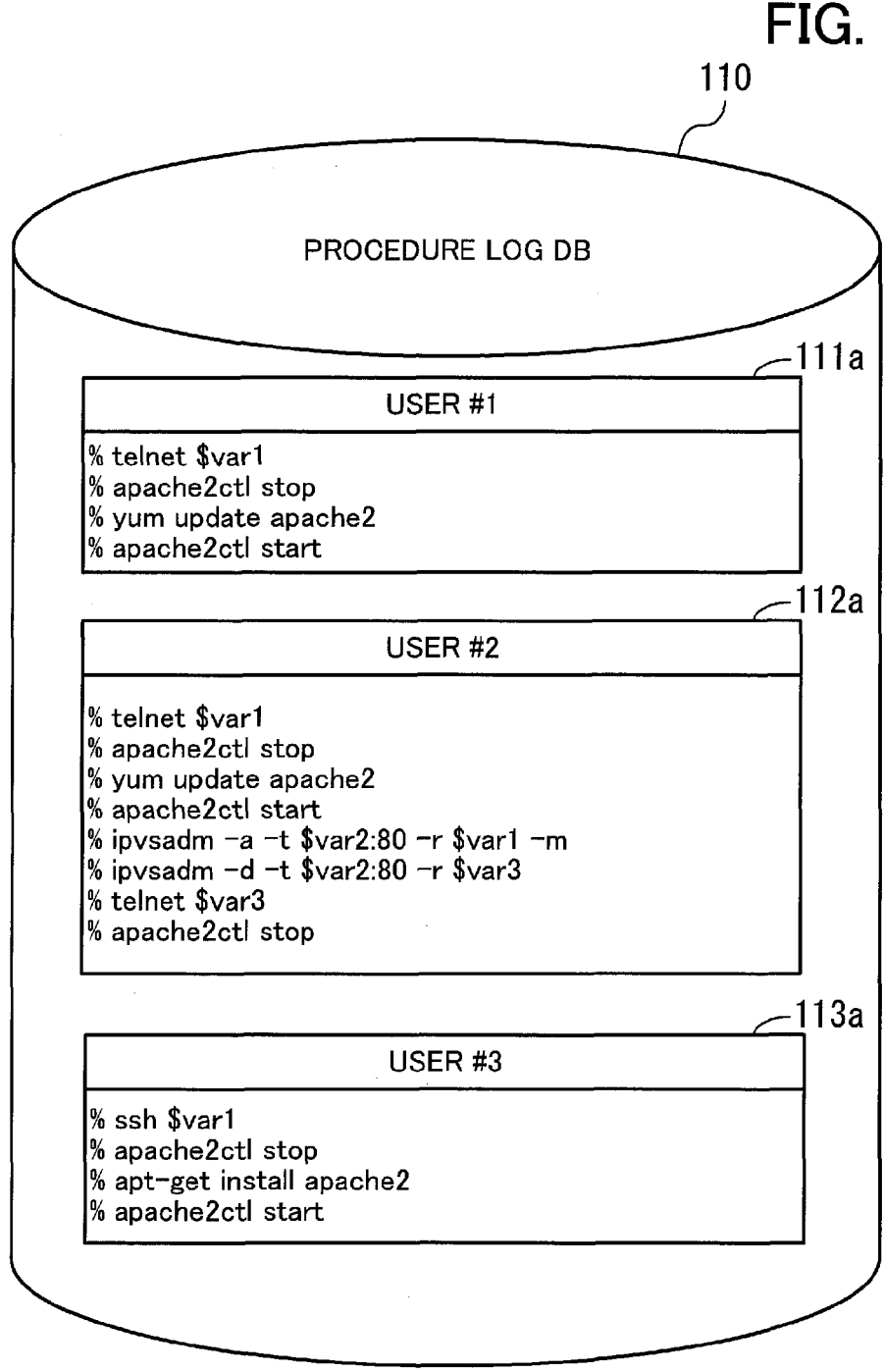
FIG. 28 illustrates an example of the procedure log database after normalization.

FIG. 28 illustrates an example of a procedure log database after normalization. As illustrated in FIG. 28, all IP addresses specific to the individual ICT systems have been changed to variable names in normalized procedure logs 111a, 112a, and 113a.

Figure 29:
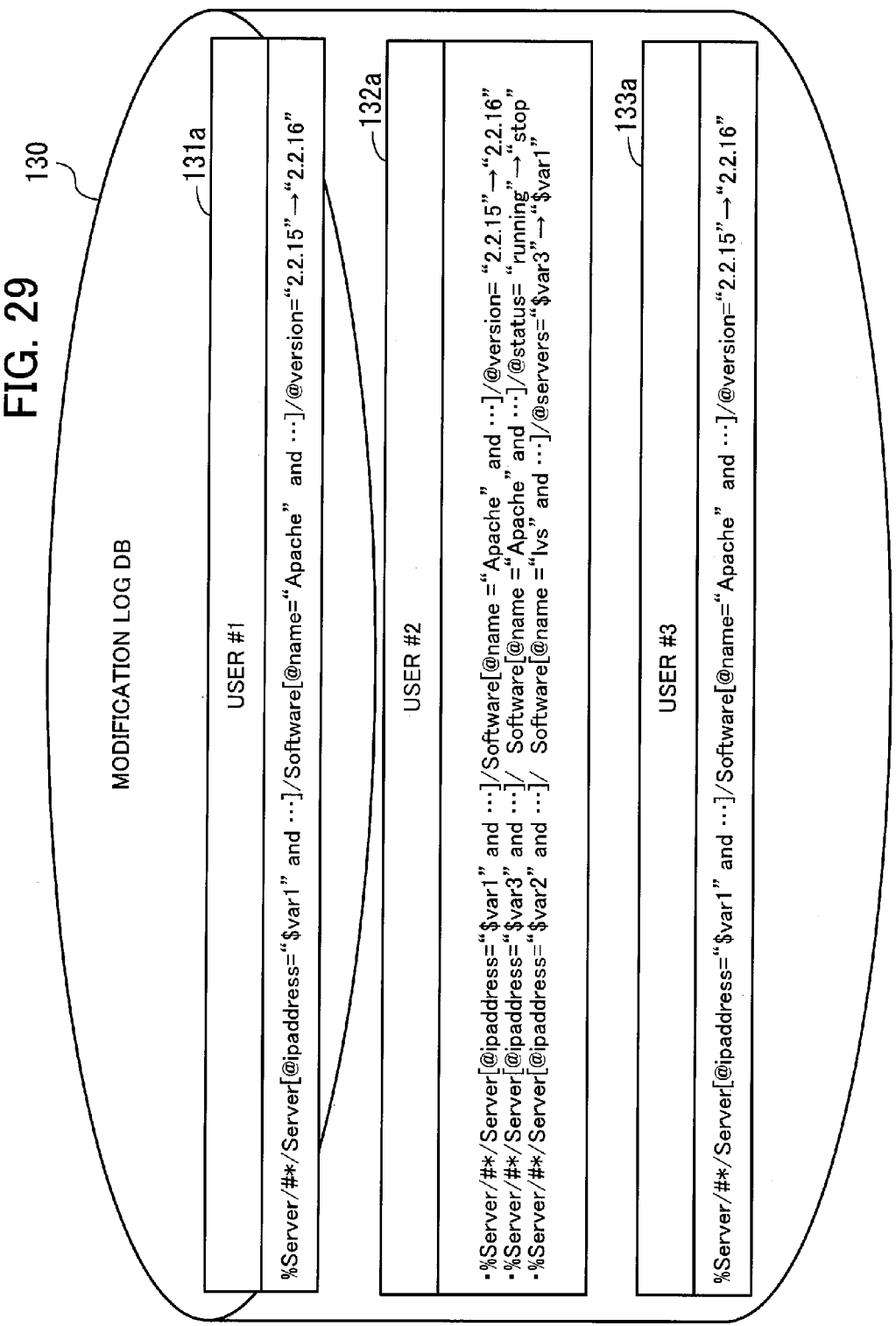
FIG. 29 illustrates an example of the modification log database after normalization.

FIG. 29 illustrates an example of a modification log database after normalization. As illustrated in FIG. 29, all IP addresses specific to the individual ICT systems have been changed to variable names in normalized modification logs 131a, 132a, and 133a.

In addition, with the normalization of the procedure log 110 and the modification log 130 illustrated in FIGS. 28 and 29, the variable correspondence table 151 of FIG. 11 is generated.

1-5. Input and Output Information Extracting Process

Figure 30:
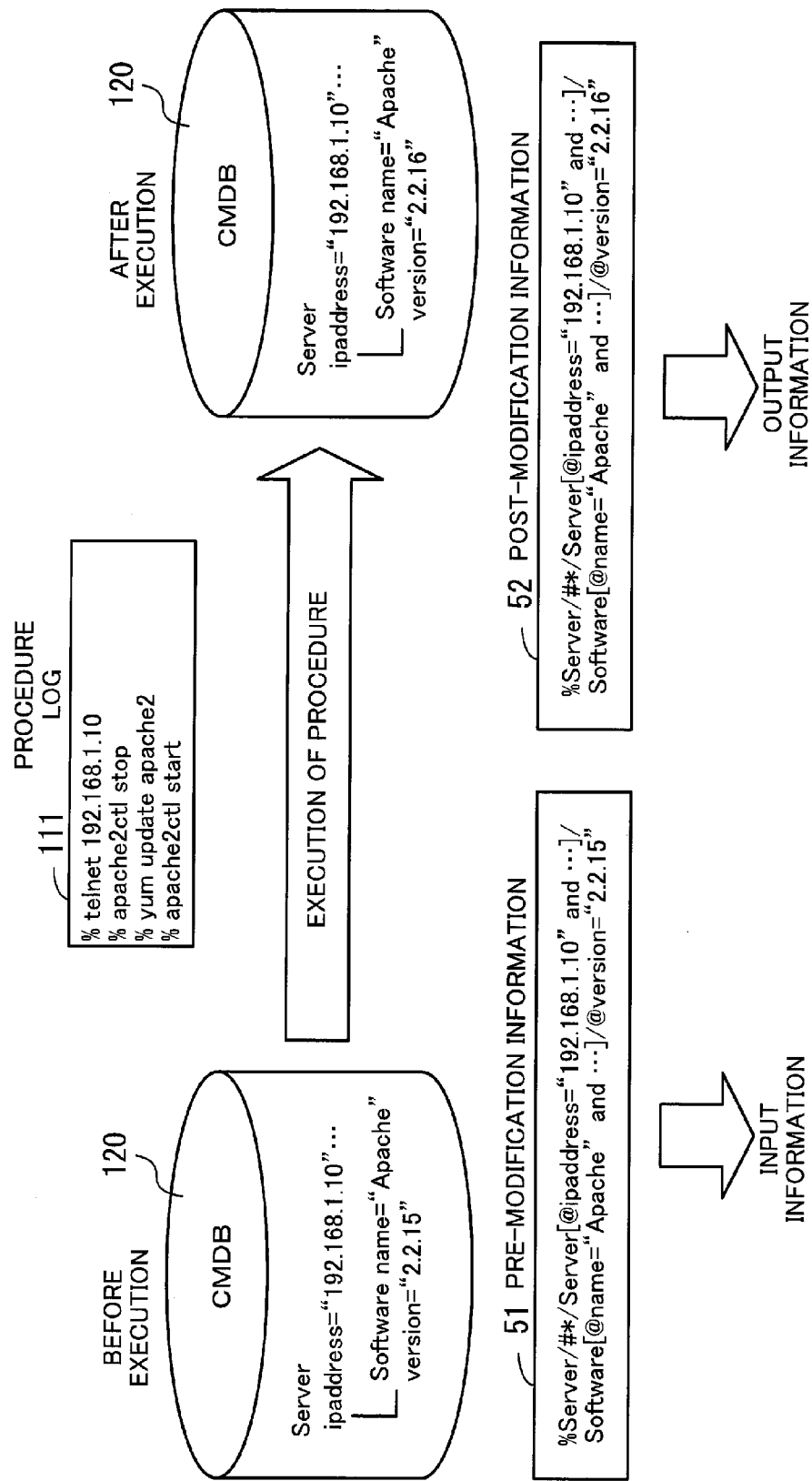
FIG. 30 illustrates an example of extracting input and output information.

Next described is the input and output information extracting process (step S15 of FIG. 15). The graph generating unit 193 extracts, as input and output information, pre-modification and post-modification information, respectively, of a section modified in a configuration information set as a result of a process having been executed by an ICT system according to a series of operations set out in a procedure log. FIG. 30 illustrates an example of extracting input and output information. The example of FIG. 30 is directed to extracting input information and output information for the case where a series of operations set out in the procedure log 111 is executed. According to this example, in the configuration information set, the version number of the Web server software has been changed. Therefore, the pre-modification information 51 including a version number before the modification and a location of the version number is extracted as the input information. In addition, the post-modification information 52 including a version number after the modification and a location of the version number is extracted as the output information. Note that the input and output information extracting process is carried out for each procedure log.

1-6. Digraph Generating Process

Next described is the digraph generating process (step S16 of FIG. 15). In the digraph generating process, the graph generating unit 193 separates individual operating information pieces of a procedure log as nodes, and then connects the separated operating information pieces by edges. The graph generating unit 193 connects the first operating information piece to the input information by an edge and connects the last operating information piece to the output information by an edge.

Figure 31:
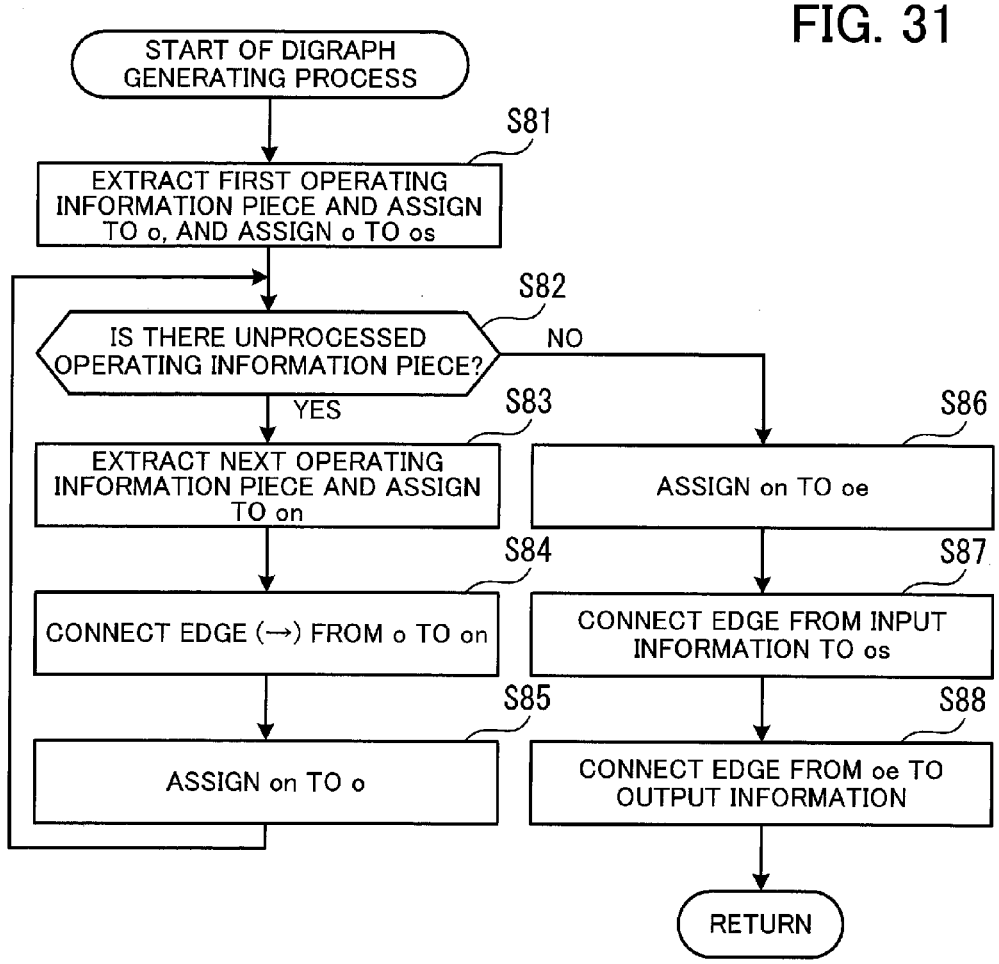
FIG. 31 is a flowchart illustrating a procedure example of a digraph generating process.

FIG. 31 is a flowchart illustrating a procedure example of a digraph generating process. The process of FIG. 31 is described next according to the step numbers in the flowchart. Note that the process of FIG. 31 is executed on a normalized procedure log each time after the normalized procedure log is generated by normalization of a procedure log.

[Step S81] The graph generating unit 193 extracts an operating information piece corresponding to the first operation from the normalized procedure log, and assigns the extracted operating information piece to Variable o. In addition, the graph generating unit 193 assigns, to Variable os, the operating information piece assigned to Variable o. At this time, the graph generating unit 193 generates a node corresponding to the operating information piece assigned to Variable o.

[Step S82] The graph generating unit 193 determines whether, in the normalized procedure log, there is an operating information piece not having undergone processing of steps S83 to S85. If there is an unprocessed operating information piece, the graph generating unit 193 proceeds to step S83. If not, the graph generating unit 193 proceeds to step S86.

[Step S83] The graph generating unit 193 extracts the next operating information piece, which is assigned to Variable on.

[Step S84] The graph generating unit 193 generates a node corresponding to the operating information piece assigned to Variable on, and connects an edge from the node of Variable o to the node of Variable on.

[Step S85] The graph generating unit 193 assigns the operating information piece assigned to Variable on to Variable o. Subsequently, the graph generating unit 193 proceeds to step S82.

[Step S86] After completing the processing of steps S83 to S85 for all operating information pieces, the graph generating unit 193 assigns the operating information piece assigned to Variable on to Variable oe.

[Step S87] The graph generating unit 193 connects an edge from the input information to a node corresponding to the operating information piece assigned to Variable os.

[Step S88] The graph generating unit 193 connects an edge from a node corresponding to the operating information piece assigned to Variable oe to the output information.

As a result of executing the above-described process on each normalized procedure log, digraphs are generated for the individual normalized procedure logs.

Figure 32:
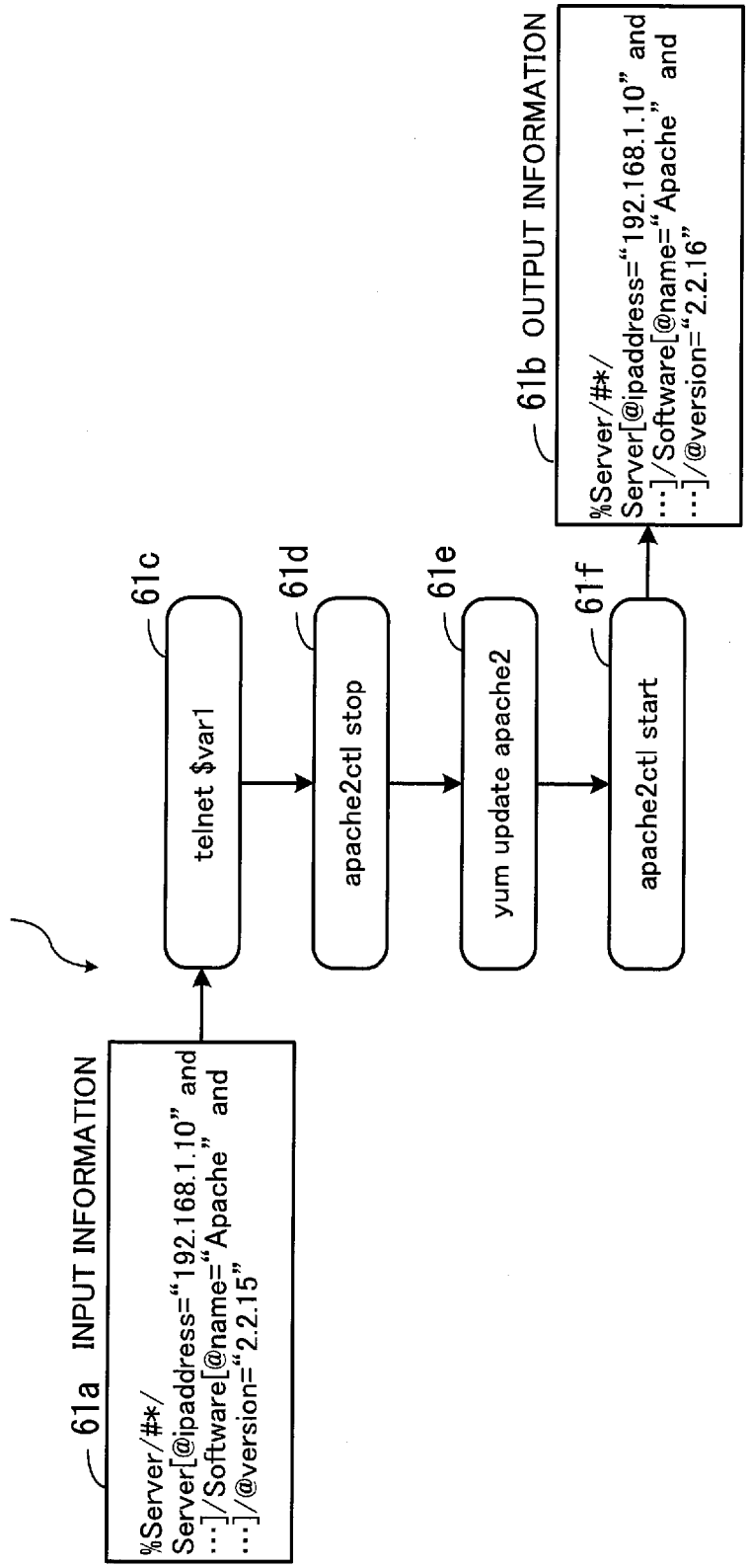
FIG. 32 illustrates a first digraph example.

FIG. 32 illustrates a first digraph example. FIG. 32 depicts a digraph 61 corresponding to the normalized procedure log 111a of FIG. 28. The digraph 61 includes input information 61a, output information 61b, and multiple nodes 61c, 61d, 61e, and 61f. The nodes 61c, 61d, 61e, and 61f are individually associated with operating information pieces included in the normalized procedure log 111a. The nodes 61c, 61d, 61e, and 61f are connected by edges in the execution order of operations indicated by the corresponding operating information pieces. In addition, an edge is connected from the input information 61a to the node 61c corresponding to the first operating information piece. Further, an edge is connected from the node 61f corresponding to the last operating information piece to the output information 61b.

Figure 33:
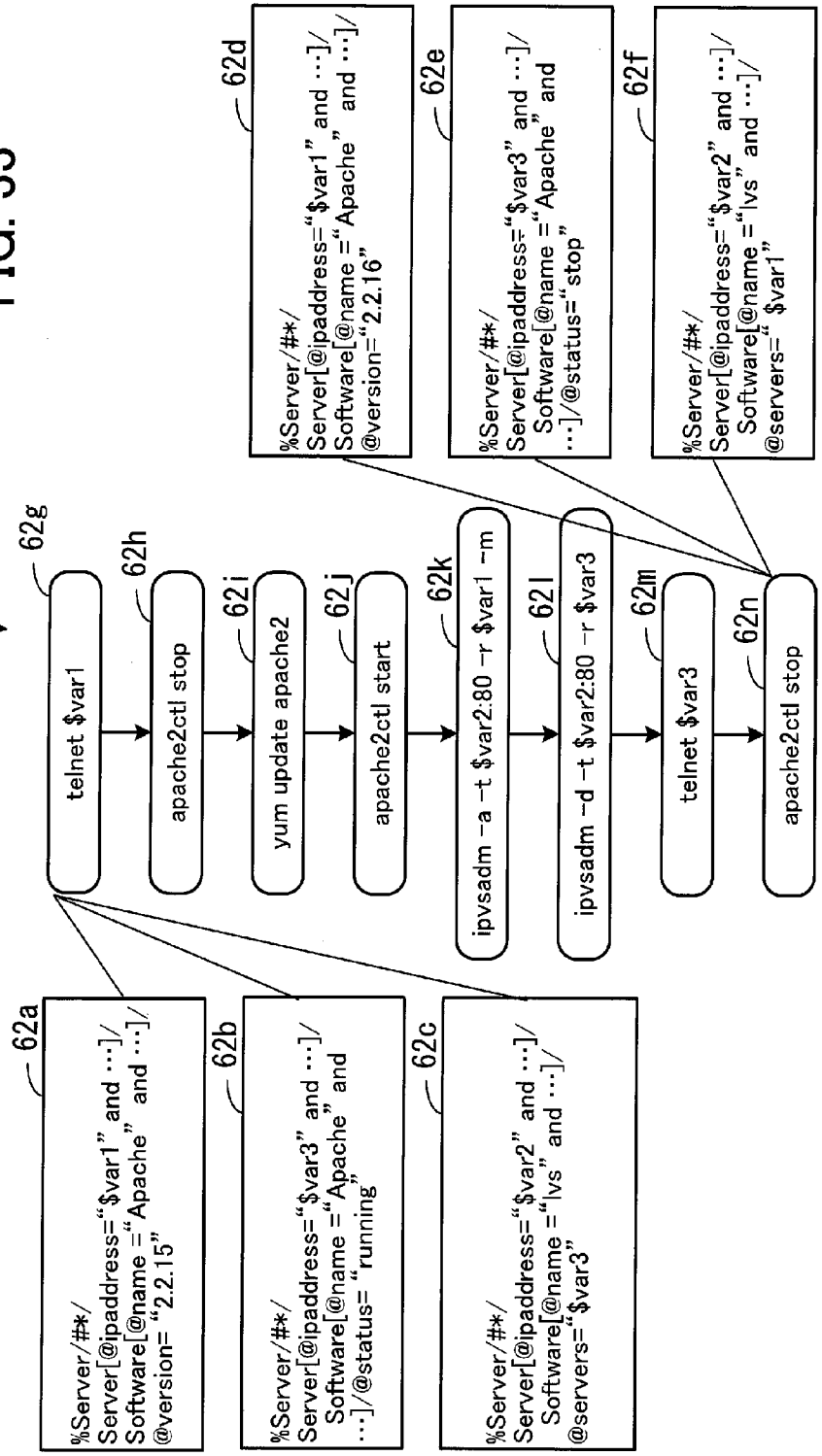
FIG. 33 illustrates a second digraph example.

FIG. 33 illustrates a second digraph example. FIG. 33 depicts a digraph 62 corresponding to the normalized procedure log 112a of FIG. 28. The digraph 62 includes three input information sets 62a, 62b, and 62c, three output information sets 62d, 62e, and 62f, and multiple nodes 62g, 62h, 62i, 62j, 62k, 62l, 62m, and 62n. Thus, the digraph 62 includes three each of input information sets and output information sets because three modifications have been made in a corresponding configuration information set of the CMDB 120 as a result of an operating procedure corresponding to the normalized procedure log 112a having been executed.

Figure 34:
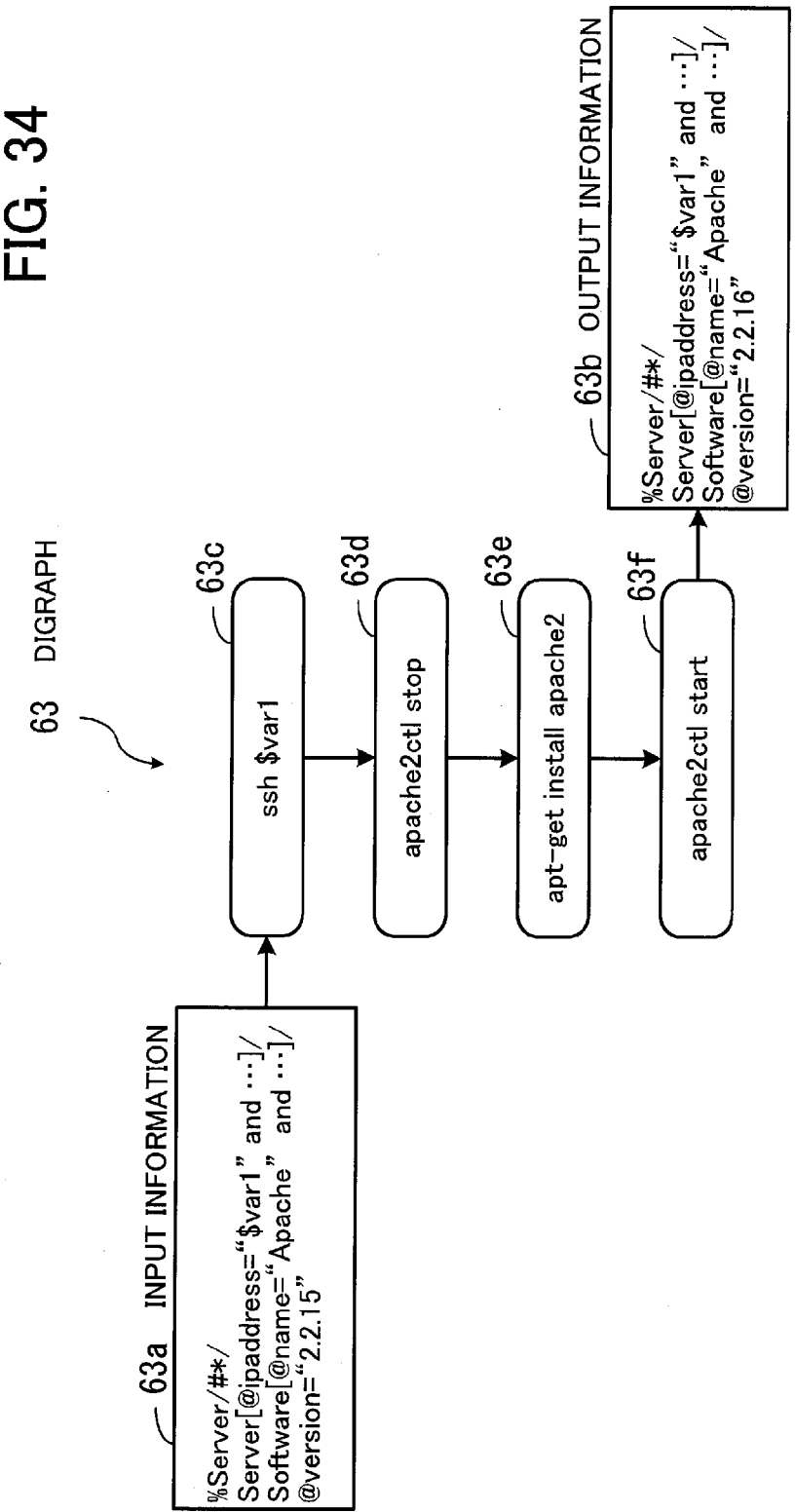
FIG. 34 illustrates a third digraph example.

FIG. 34 illustrates a third digraph example. FIG. 34 depicts a digraph 63 corresponding to the normalized procedure log 113a of FIG. 28. The digraph 63 includes input information 63a, output information 63b, and multiple nodes 63c, 63d, 63e, and 63f.

The digraphs 61 to 63 of FIGS. 32 to 34, respectively, are temporarily stored, for example, in a storage area within the RAM 102, managed by the graph generating unit 193.

1-7. Digraph Combining Process

Figure 35:
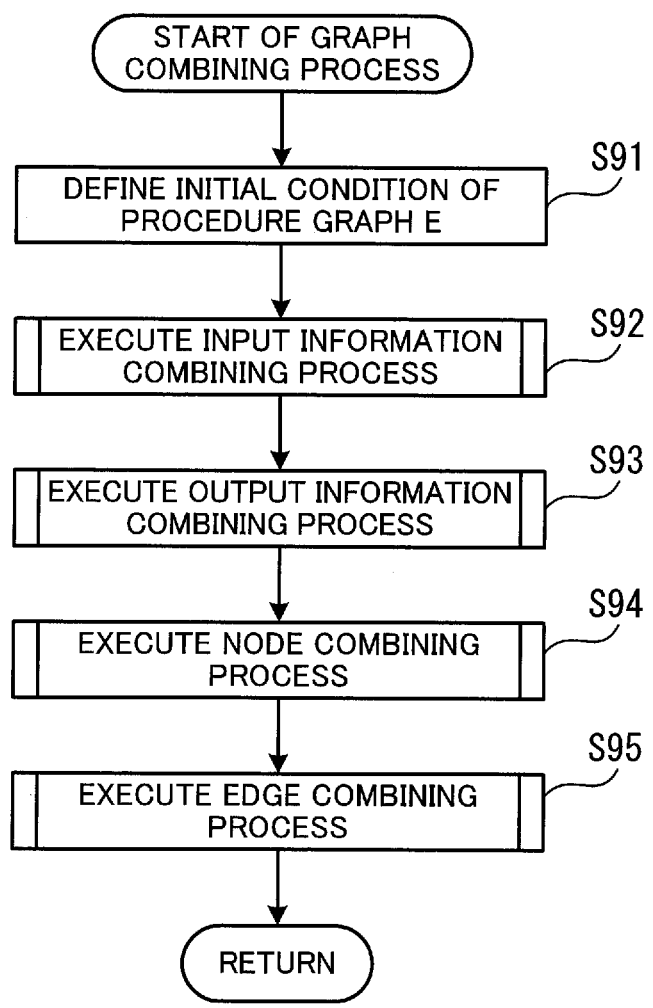
FIG. 35 is a flowchart illustrating a procedure example of a digraph combining process.

Next described is the digraph combining process. The graph generating unit 193 combines the generated digraphs 61 to 63 into one digraph. A digraph obtained by the combining process is the procedure graph 161 of FIG. 12. FIG. 35 is a flowchart illustrating a procedure example of a digraph combining process. The process of FIG. 35 is described next according to the step numbers in the flowchart.

[Step S91] The graph generating unit 193 defines an initial condition of a procedure graph E. The procedure graph E in the initial condition is empty. That is, the procedure graph E having no input information, output information, and nodes is defined.

[Step S92] The graph generating unit 193 executes an input information combining process. This process is described in detail later (see FIG. 36).

[Step S93] The graph generating unit 193 executes an output information combining process. This process is described in detail later (see FIG. 37).

[Step S94] The graph generating unit 193 executes a node combining process. This process is described in detail later (see FIG. 38).

[Step S95] The graph generating unit 193 executes an edge combining process. This process is described in detail later (see FIG. 39).

Figure 36:
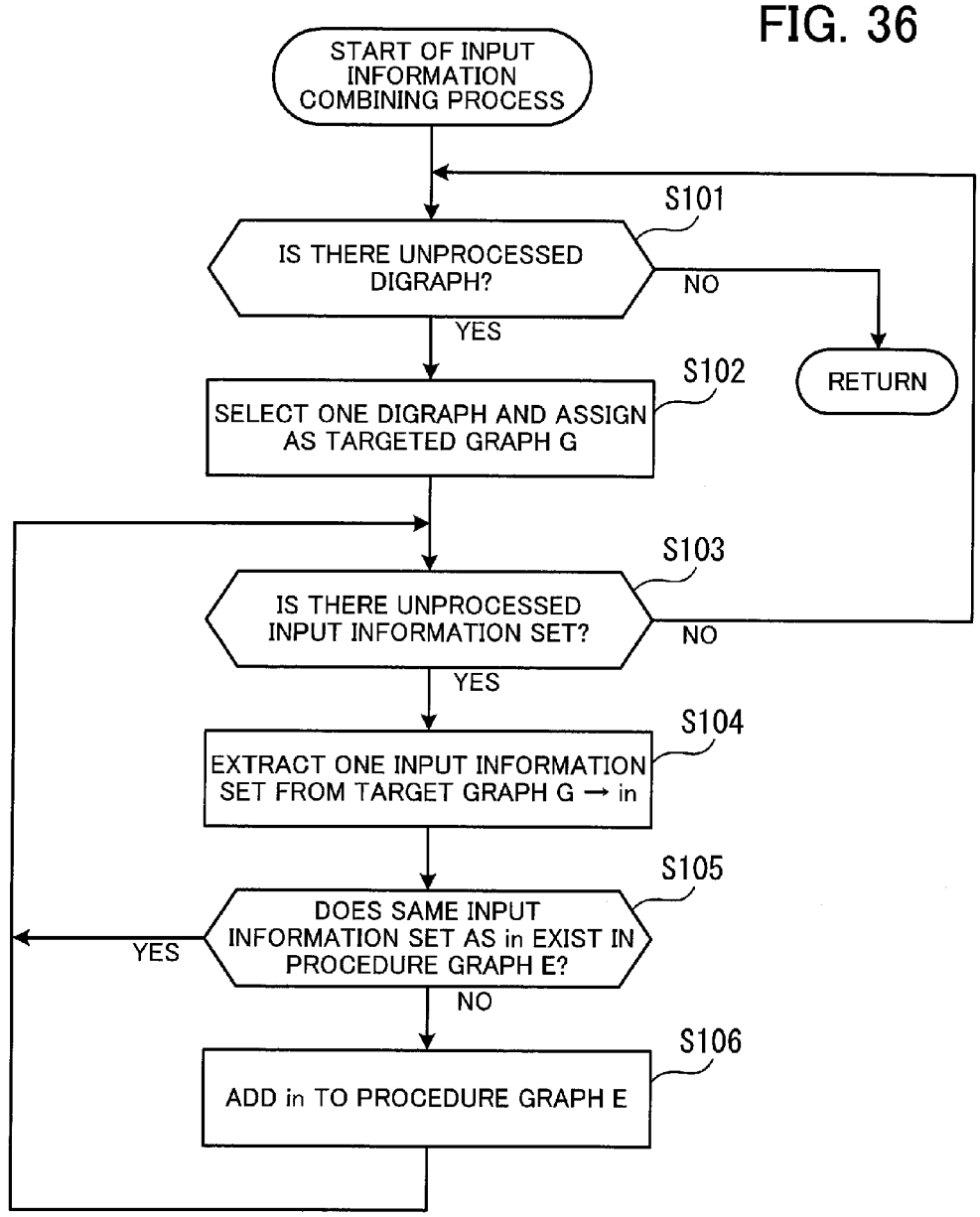
FIG. 36 is a flowchart illustrating a procedure example of an input information combining process.

The following describes in detail each of the processing steps of FIG. 35. FIG. 36 is a flowchart illustrating a procedure example of an input information combining process. The process of FIG. 36 is described next according to the step numbers in the flowchart.

[Step S101] The graph generating unit 193 determines whether, among multiple digraphs targeted for the process, there is a digraph not having undergone processing of steps S102 to S106. If there is an unprocessed digraph, the graph generating unit 193 proceeds to step S102. If not, the graph generating unit 193 ends the input information combining process.

[Step S102] The graph generating unit 193 selects one unprocessed digraph and assigns the selected digraph as a target graph G.

[Step S103] The graph generating unit 193 determines whether, in the target graph G, there is an input information set not having undergone processing of steps S104 to S106. If there is an unprocessed input information set, the graph generating unit 193 proceeds to step S104. If not, the graph generating unit 193 proceeds to step S101.

[Step S104] The graph generating unit 193 extracts, from the target graph G, one unprocessed input information set, which is then assigned as Variable in.

[Step S105] The graph generating unit 193 determines whether the same input information set as that assigned as Variable in exists in the procedure graph E.

If the same input information set exists, the graph generating unit 193 proceeds to step S103. If not, the graph generating unit 193 proceeds to step S106.

[Step S106] the graph generating unit 193 adds the input information set assigned as Variable in to the procedure graph E. Subsequently, the graph generating unit 193 proceeds to step S103.

Figure 37:
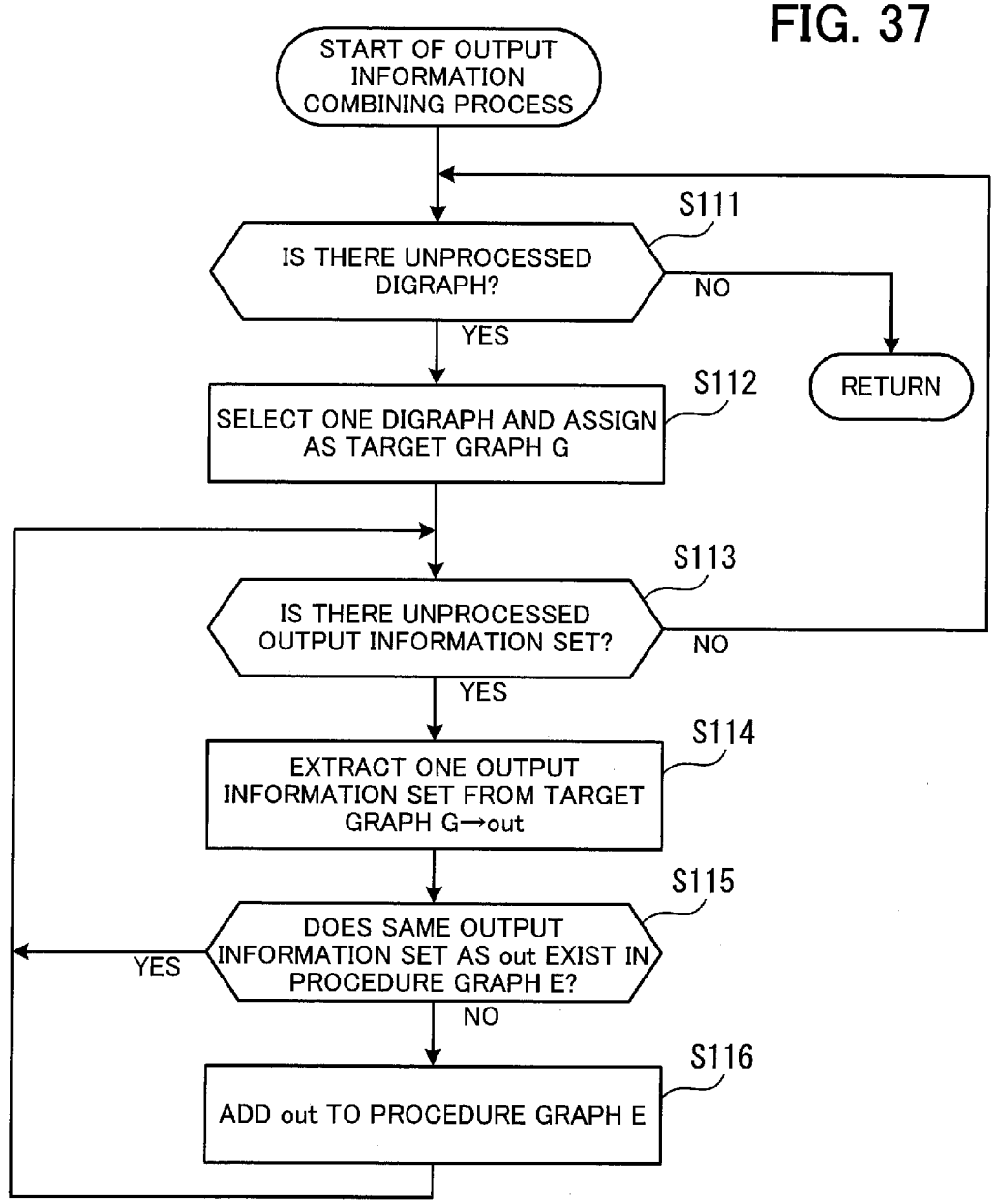
FIG. 37 is a flowchart illustrating a procedure example of an output information combining process.

FIG. 37 is a flowchart illustrating a procedure example of an output information combining process. The process of FIG. 37 is described next according to the step numbers in the flowchart.

[Step S111] The graph generating unit 193 determines whether, among multiple digraphs targeted for the process, there is a digraph not having undergone processing of steps S112 to S116. If there is an unprocessed digraph, the graph generating unit 193 proceeds to step S112. If not, the graph generating unit 193 ends the output information combining process.

[Step S112] The graph generating unit 193 selects one unprocessed digraph and assigns the selected digraph as a target graph G.

[Step S113] The graph generating unit 193 determines whether, in the target graph G, there is an output information set not having undergone processing of steps S114 to S116. If there is an unprocessed output information set, the graph generating unit 193 proceeds to step S114. If not, the graph generating unit 193 proceeds to step S111.

[Step S114] The graph generating unit 193 extracts, from the target graph G, one unprocessed output information set, which is then assigned as Variable out.

[Step S115] The graph generating unit 193 determines whether the same output information set as that assigned as Variable out exists in the procedure graph E. If the same output information exists, the graph generating unit 193 proceeds to step S113. If not, the graph generating unit 193 proceeds to step S116.

[Step S116] The graph generating unit 193 adds the output information set assigned as Variable out to the procedure graph E. Subsequently, the graph generating unit 193 proceeds to step S113.

Figure 38:
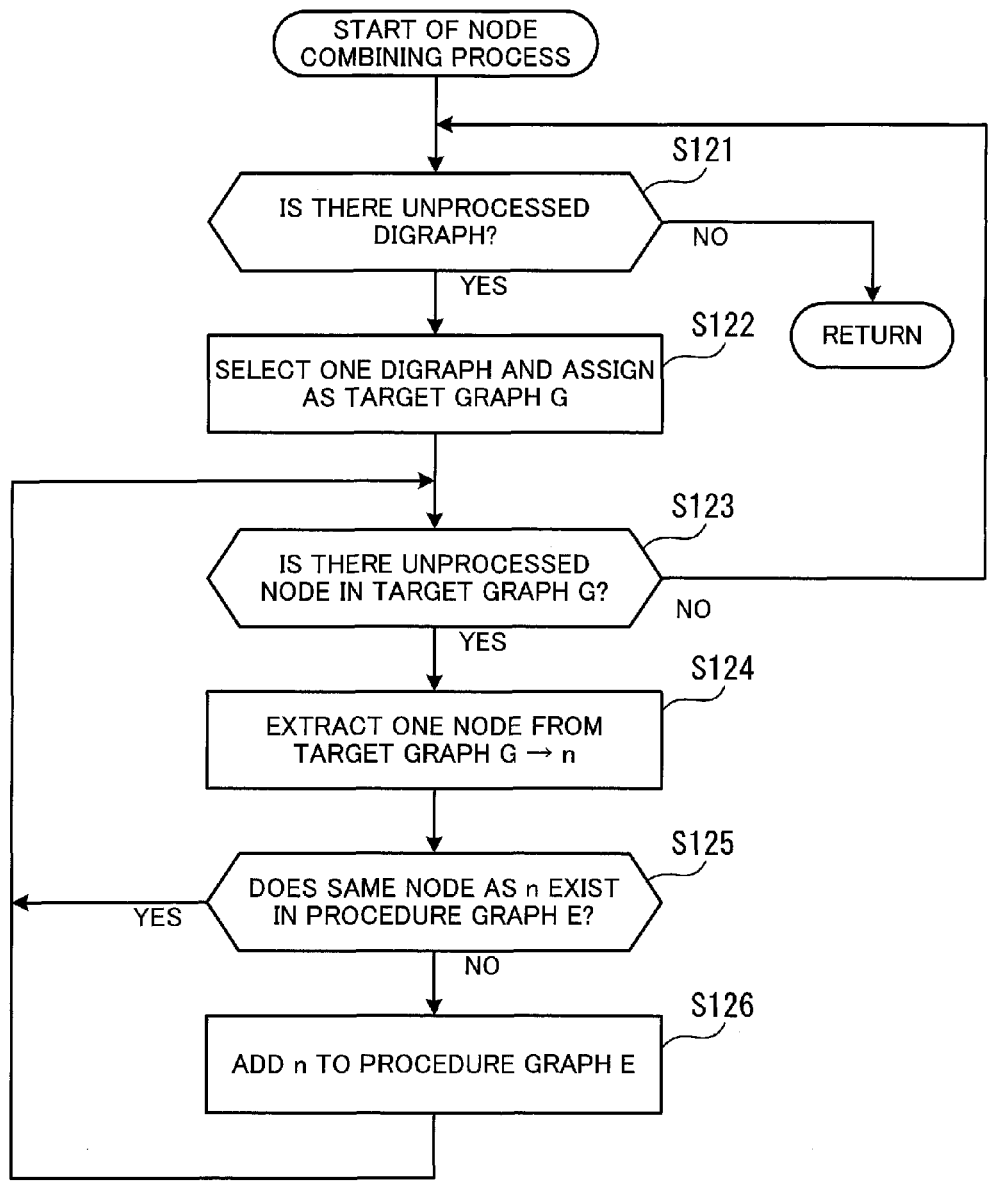
FIG. 38 is a flowchart illustrating a procedure example of a node combining process.

FIG. 38 is a flowchart illustrating a procedure example of a node combining process. The process of FIG. 38 is described next according to the step numbers in the flowchart.

[Step S121] The graph generating unit 193 determines whether, among multiple digraphs targeted for the process, there is a digraph not having undergone processing of steps S122 to S126. If there is an unprocessed digraph, the graph generating unit 193 proceeds to step S122. If not, the graph generating unit 193 ends the node combining process.

[Step S122] The graph generating unit 193 selects one unprocessed digraph and assigns the selected digraph as a target graph G.

[Step S123] The graph generating unit 193 determines whether, in the target graph G, there is an unprocessed node not having undergone processing of steps S124 to S126. If there is an unprocessed node, the graph generating unit 193 proceeds to step S124. If not, the graph generating unit 193 proceeds to step S121.

[Step S124] The graph generating unit 193 extracts, from the target graph G, one unprocessed node, which is then assigned as Variable n.

[Step S125] The graph generating unit 193 determines whether the same node as that assigned as Variable n exists in the procedure graph E. If the same node exists, the graph generating unit 193 proceeds to step S123. If not, the graph generating unit 193 proceeds to step S126.

[Step S126] the graph generating unit 193 adds the node assigned as Variable n to the procedure graph E. Subsequently, the graph generating unit 193 proceeds to step S123.

Figure 39:
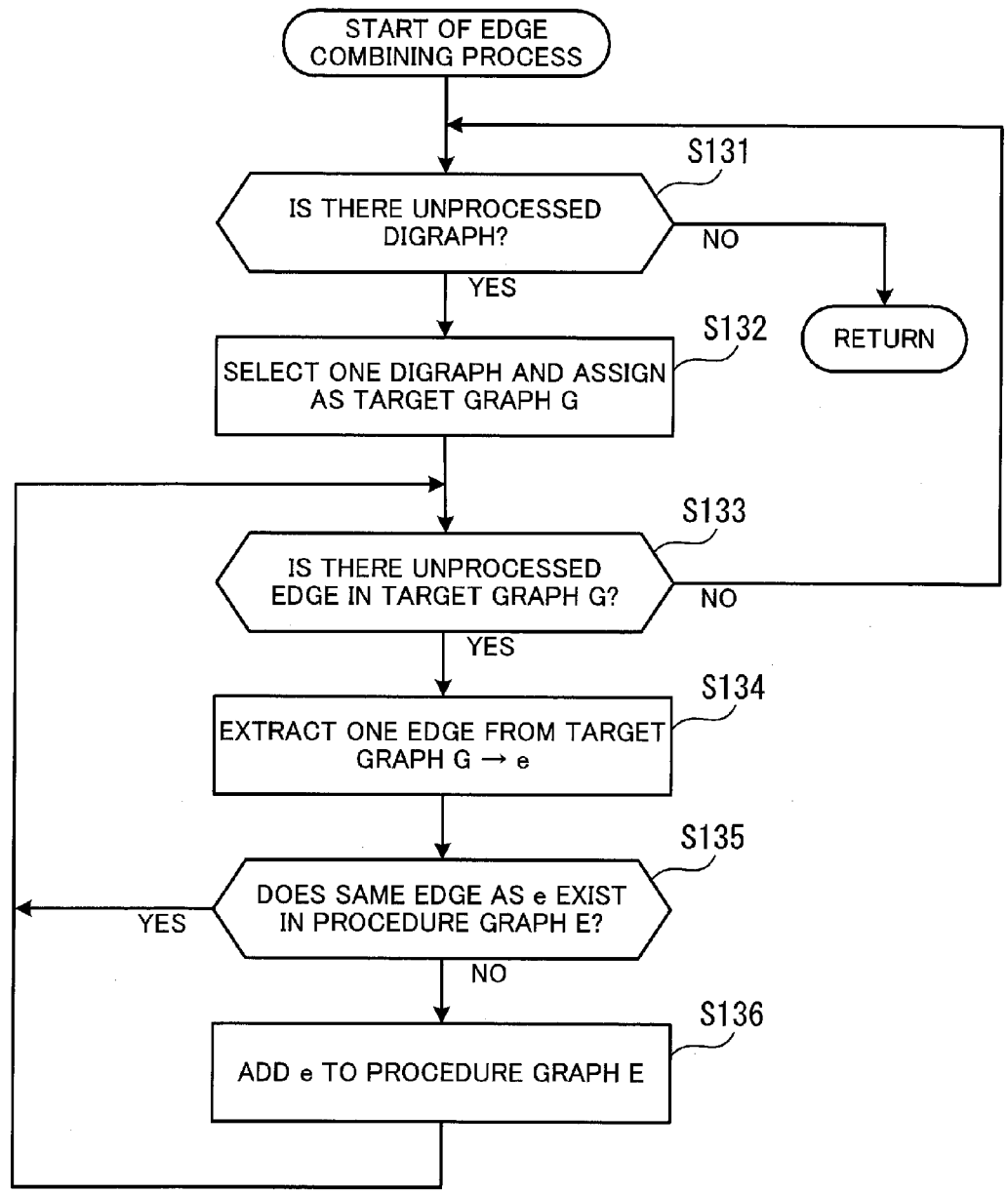
FIG. 39 is a flowchart illustrating a procedure example of an edge combining process.

FIG. 39 is a flowchart illustrating a procedure example of an edge combining process. The process of FIG. 39 is described next according to the step numbers in the flowchart.

[Step S131] The graph generating unit 193 determines whether, among multiple digraphs targeted for the process, there is a digraph not having undergone processing of steps S132 to S136. If there is an unprocessed digraph, the graph generating unit 193 proceeds to step S132. If not, the graph generating unit 193 ends the edge combining process.

[Step S132] The graph generating unit 193 selects one unprocessed digraph and sets the selected digraph as a target graph G.

[Step S133] The graph generating unit 193 determines whether, in the target graph G, there is an unprocessed edge not having undergone processing of steps S134 to S136. If there is an unprocessed edge, the graph generating unit 193 proceeds to step S134. If not, the graph generating unit 193 proceeds to step S131.

[Step S134] The graph generating unit 193 extracts, from the target graph G, one unprocessed edge, which is then assigned as Variable e.

[Step S135] The graph generating unit 193 determines whether the same edge as that assigned as Variable e exists in the procedure graph E. The same edge here means an edge having the same elements for its connection (the same input information set, output information set, or nodes) and having the same direction. If the same edge exists, the graph generating unit 193 proceeds to step S133. If not, the graph generating unit 193 proceeds to step S136.

[Step S136] The graph generating unit 193 adds the edge assigned as Variable e to the procedure graph E. At this point, the edge is added to the procedure graph E in such a manner as to connect its two elements while keeping the original direction. Subsequently, the graph generating unit 193 proceeds to step S133.

In the above-described manner, digraphs are combined. For example, the digraphs 61 to 63 of FIGS. 32 to 34 are combined to generate the procedure graph 161 of FIG. 12. The generated procedure graph 161 is stored in the procedure graph database 160.

2. Prospective Procedure Providing Process

The prospective procedure providing process is described next. The prospective procedure providing process is executed in response to a procedure request designating input and output information, issued by a user.

Figure 40:
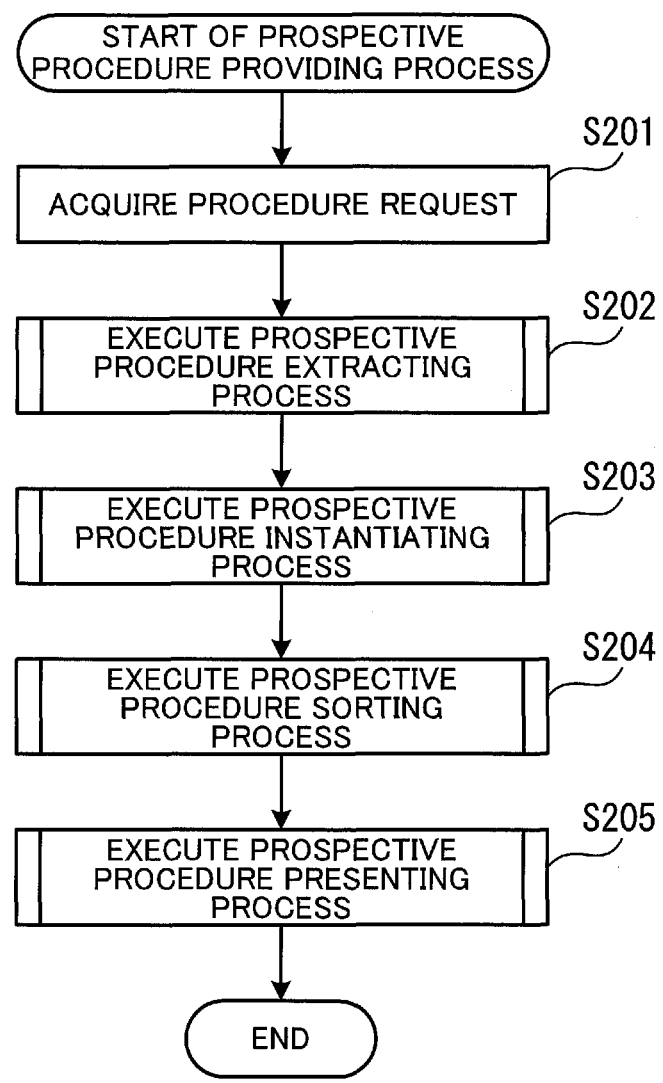
FIG. 40 illustrates a flowchart illustrating a procedure example of a prospective procedure providing process.

FIG. 40 illustrates a flowchart illustrating a procedure example of a prospective procedure providing process. The process of FIG. 40 is described next according to the step numbers in the flowchart.

[Step S201] The prospective procedure generating unit 194 acquires a procedure request from a terminal used by a user. The procedure request includes, for example, a name of a software resource of an ICT system, subject to update.

[Step S202] The prospective procedure generating unit 194 executes a prospective procedure extracting process of extracting prospective procedures from the procedure graph 161. This process is described in detail later (see FIG. 42).

[Step S203] The prospective procedure generating unit 194 executes a prospective procedure instantiating process of instantiating the extracted prospective procedures to be tailored to the user having input the procedure request. This process is described in detail later (see FIG. 46).

[Step S204] The sorting unit 195 executes a prospective procedure sorting process of sorting the order of the prospective procedures based on a predetermined criterion. This process is described in detail later (see FIGS. 48 to 52).

[Step S205] The sorting unit 195 executes a prospective procedure presenting process of transmitting ones ranked top among the sorted prospective procedures to the terminal. This process is described in detail later (see FIG. 57).

In the above-described manner, prospective procedures are provided to the user. The following describes in detail each of the processing steps of FIG. 40.

2-1. Procedure Request Acquiring Process

First described is the procedure request acquiring process (step S201 of FIG. 40). Assume in the following description that the user 24 transmits a procedure request to the administrative server 100 by using the terminal 34. For example, when configuration management software of the terminal 34 detects the latest version of a software resource in the ICT system 44, the user 24 displays a system configuration management screen to prompt update of the software resource.

Figure 41:
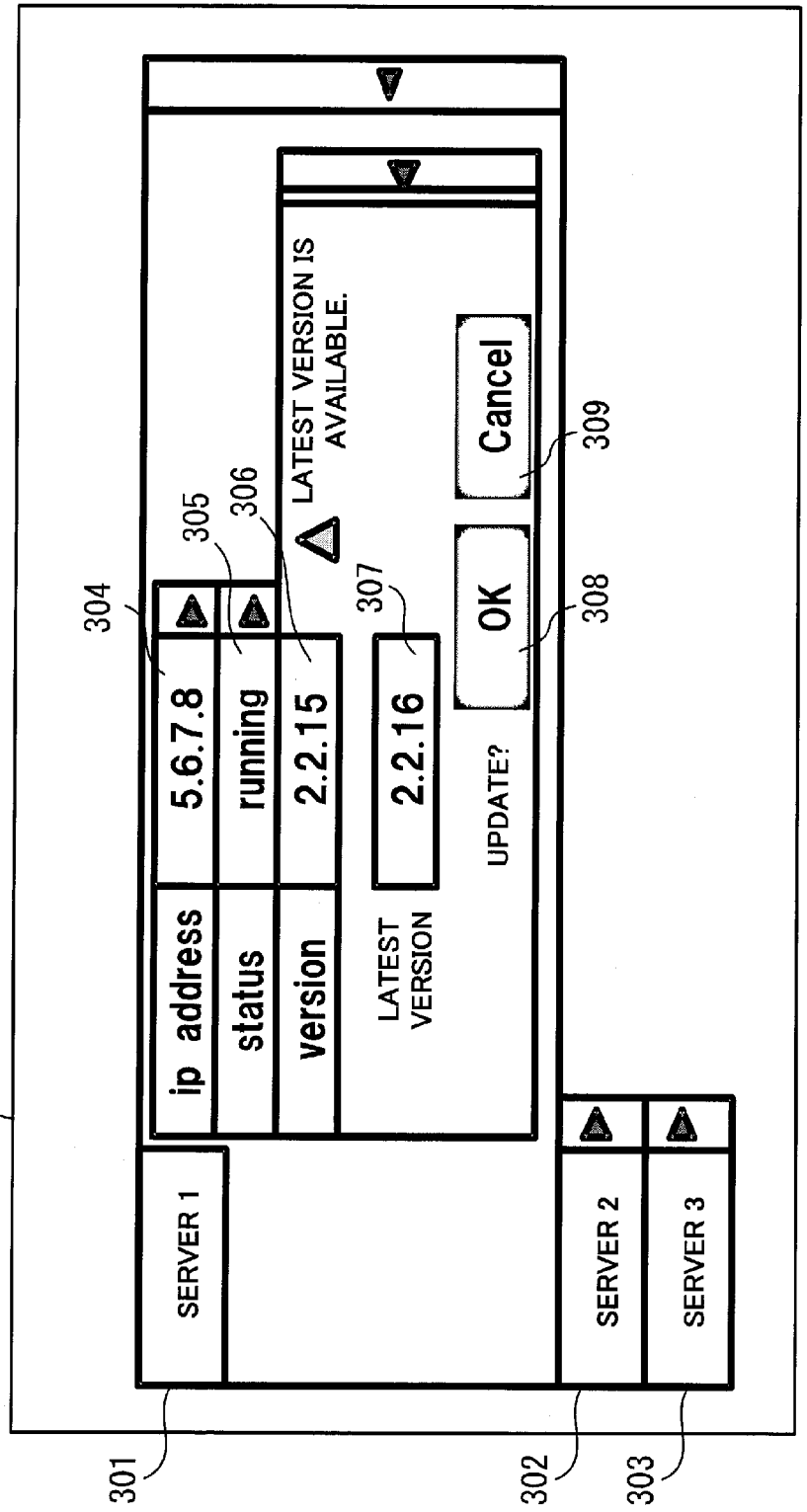
FIG. 41 illustrates an example of a system configuration management screen.

FIG. 41 illustrates an example of a system configuration management screen. On a system configuration management screen 300, server names 301 to 303 of servers included in the ICT system 44 are displayed. When the user selects one of the server names 301 to 303, a configuration of a software resource corresponding to the selected server name is displayed. In the example of FIG. 41, the configuration of 'server 1' is displayed.

Information displayed as the server configuration includes, for example, an IP address 304, status 305, and a version number 306 of the server. In addition, if the software resource corresponding to the server is not the latest version, a latest version 307 is also displayed. Along with the display of the latest version 307, an OK button 308 and a cancel button 309 to confirm or cancel the update to the latest version are displayed.

Upon selection of the OK button 308 by the user 24, the terminal 34 transmits, to the administrative server 100, a request for a procedure ('procedure request') to update the corresponding software resource to the latest version. According to the example of FIG. 41, a procedure request of updating the Web server software from Version 2.2.15 to Version 2.2.16 is transmitted. Subsequently, the administrative server 100 receives the transmitted procedure information, and the prospective procedure generating unit 194 then extracts prospective procedures for an update process according to the procedure request.

2-2. Prospective Procedure Extracting Process

Figure 42:
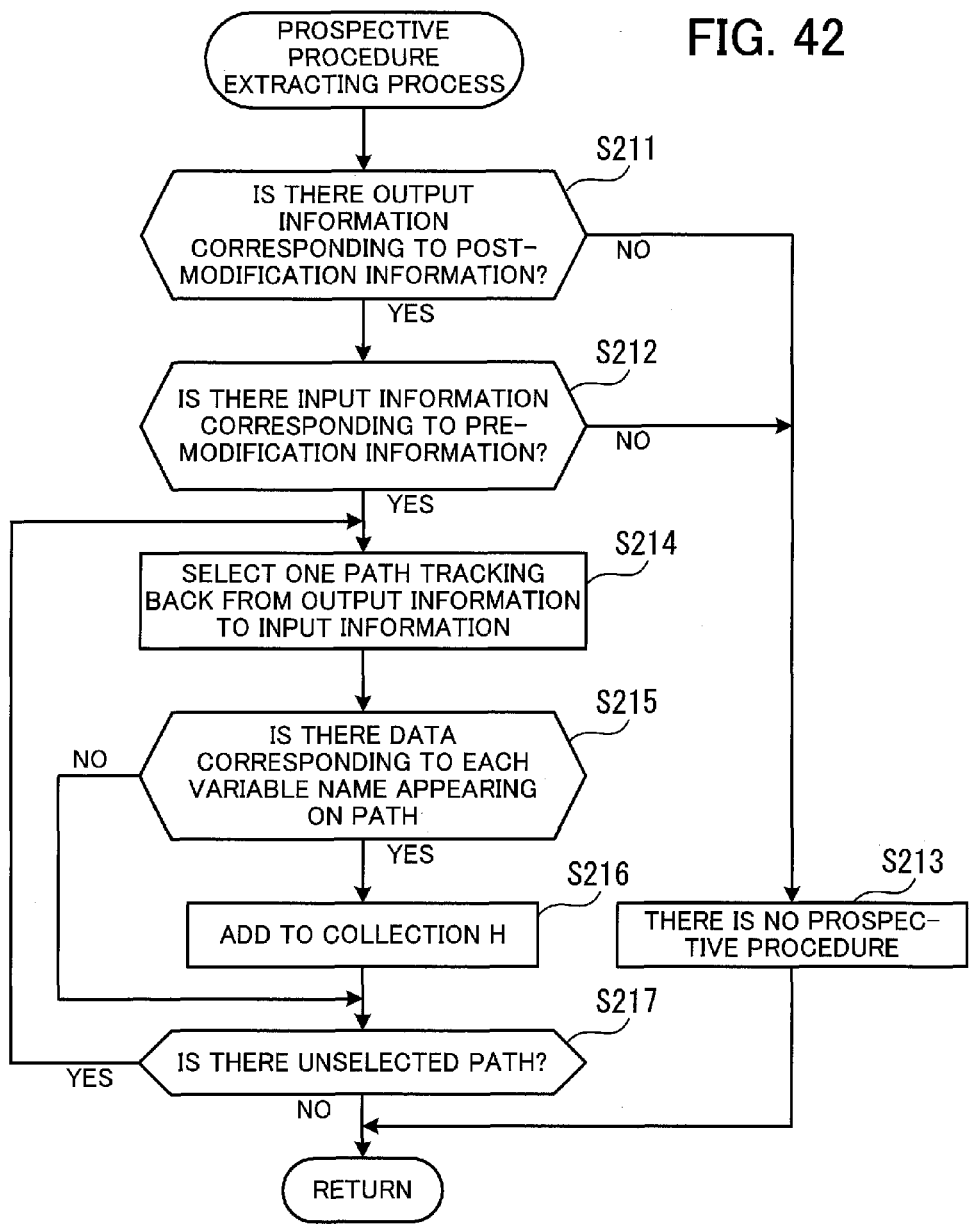
FIG. 42 is a flowchart illustrating a procedure example of a prospective procedure extracting process.

Next described is the prospective procedure extracting process (step S202 of FIG. 40). FIG. 42 is a flowchart illustrating a procedure example of a prospective procedure extracting process. The process of FIG. 42 is described next according to the step numbers in the flowchart.

[Step S211] The prospective procedure generating unit 194 determines whether there is output information corresponding to post-modification information. For example, the prospective procedure generating unit 194 determines a section to be modified in the configuration information set of the ICT system 44 for the case of the update process according to the procedure request being executed, and then creates post-modification information for the case of the modification being made. The post-modification information is an XPath expression defining a value of the section modified after the modification and a location of the modified section in the configuration information set within the CMDB 120. The prospective procedure generating unit 194 replaces, within the generated post-modification information, a character string matching a match pattern registered in the variable correspondence table 151 with a variable name corresponding to the match pattern. Then, the prospective procedure generating unit 194 determines whether output information identical to the normalized post-modification information is included in the procedure graph 161. If such output information is present in the procedure graph 161, the prospective procedure generating unit 194 determines that there is output information corresponding to the post-modification information. If there is output information corresponding to the post-modification information, the prospective procedure generating unit 194 proceeds to step S212. If not, the prospective procedure generating unit 194 proceeds to step S213.

[Step S212] The prospective procedure generating unit 194 determines whether there is input information corresponding to pre-modification information. For example, the prospective procedure generating unit 194 determines a section to be modified in the configuration information set of the ICT system 44 for the case of the update process according to the procedure request being executed, and then creates pre-modification information for the case of the modification being made. The pre-modification information is an XPath expression defining a value of the section to be modified in the modification and a location of the section in the configuration information set within the CMDB 120. The prospective procedure generating unit 194 replaces, within the generated pre-modification information, a character string matching a match pattern registered in the variable correspondence table 151 with a variable name corresponding to the match pattern. Then, the prospective procedure generating unit 194 determines whether input information identical to the normalized pre-modification information is included in the procedure graph 161. If such input information is present in the procedure graph 161, the prospective procedure generating unit 194 determines that there is input information corresponding to the pre-modification information. If there is input information corresponding to the pre-modification information, the prospective procedure generating unit 194 proceeds to step S214. If not, the prospective procedure generating unit 194 proceeds to step S213.

[Step S213] In the case where at least one of the output information corresponding to the post-modification information and the input information corresponding to the pre-modification information is not found, the prospective procedure generating unit 194 determines that there is no prospective procedure and, thus, ends the prospective procedure extracting process. Note that when there is no prospective procedure, the prospective processing providing process of FIG. 40 is also ended.

[Step S214] When both the output information corresponding to the post-modification information and the input information corresponding to the pre-modification information are found, the prospective procedure generating unit 194 selects, from the procedure graph 161, one path tracing back from the output information to the input information.

[Step S215] The prospective procedure generating unit 194 determines whether data corresponding to each variable name included in names of nodes on the selected path is present in the configuration information set of the ICT system 44 targeted for the process. If such data is found, the prospective procedure generating unit 194 proceeds to step S216. If not, the prospective procedure generating unit 194 proceeds to step S217.

[Step S216] The prospective procedure generating unit 194 generates a prospective procedure using the nodes on the selected path, and adds the generated prospective procedure to a collection H, which is a group of prospective procedures.

[Step S217] The prospective procedure generating unit 194 determines whether there is an unselected path extending from the output information to the input information. If there is an unselected path, the prospective procedure generating unit 194 proceeds to step S214. If not, the prospective procedure generating unit 194 ends the prospective procedure extracting process.

In the above-described manner, prospective procedures are extracted. The following describes the prospective procedure extracting process using a specific example.

Figure 43:
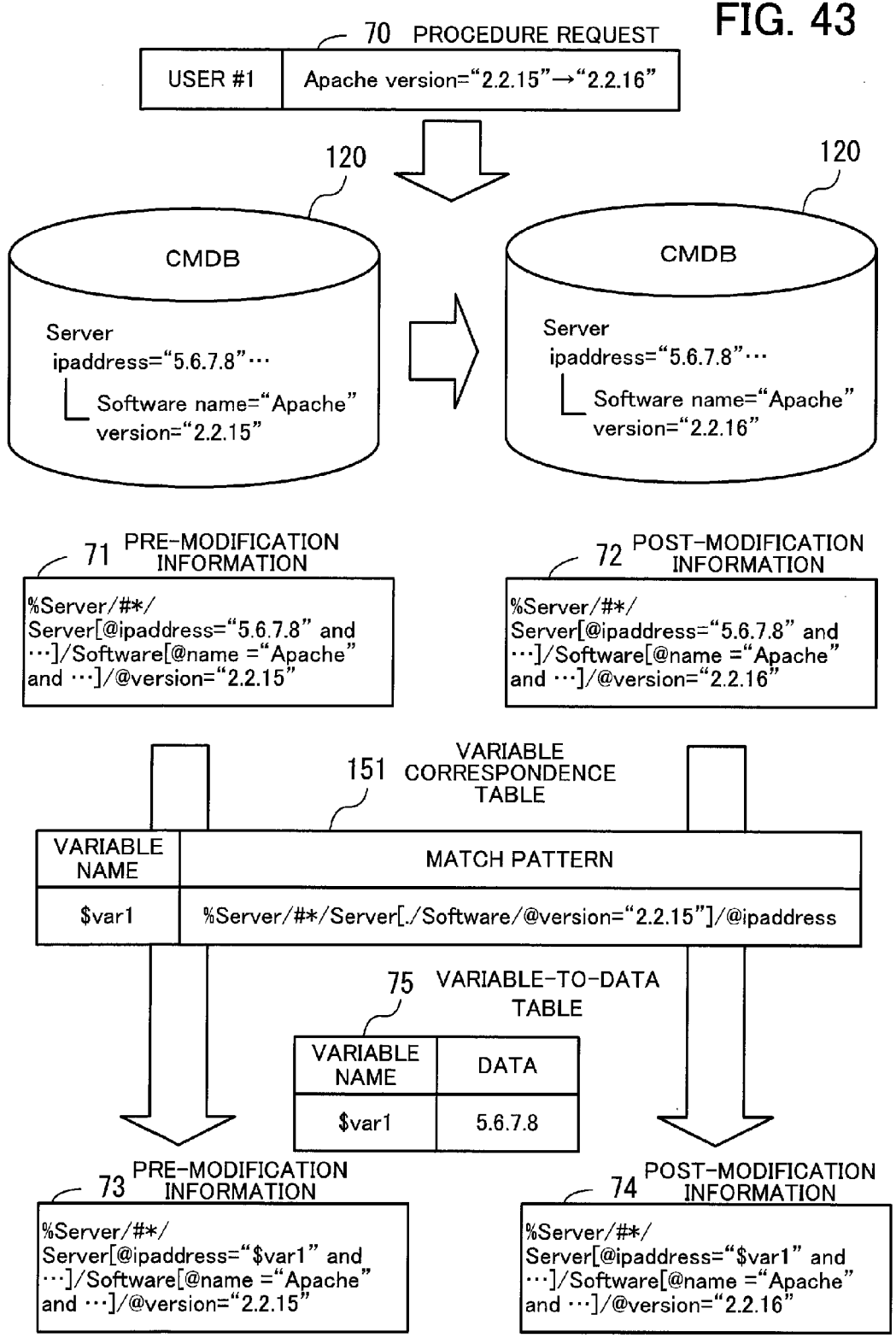
FIG. 43 illustrates an example of extracting and normalizing pre-modification information and post-modification information according to a procedure request.

FIG. 43 illustrates an example of extracting and normalizing pre-modification information and post-modification information according to a procedure request. Assume here that a procedure request 70 of updating Web server software from Version 2.2.15 to Version 2.2.16 is input from the terminal 34. The procedure request 70 includes, for example, a user ID of the user 24 using the terminal 34, which has transmitted the procedure request 70, and a content of configuration modification applied to the ICT system 44 managed by the user 24. In this case, based on a configuration information set of the ICT system 44 found in the CMDB 120, pre-modification information 71 and post-modification information 72 for the designated Web server software are generated.

The generated pre-modification information 71 and post-modification information 72 respectively include an IP address '5.6.7.8' of a server in the ICT system 44. The IP address is specific information and matches a match pattern in the variable correspondence table 151. Therefore, the IP address is replaced with the variable name '$var1' corresponding to the match pattern. Along with the replacing process, a variable-to-data table 75 including the paired original character string '5.6.7.8' and variable name '$var1' is generated. The variable-to-data table 75 is stored, for example, in a storage area within the RAM 102, managed by the prospective procedure generating unit 194. A pair of pre-modification information 73 and post-modification information 74 normalized in the above-described manner is then compared with the procedure graph 161, to extract prospective procedures.

Figure 44:
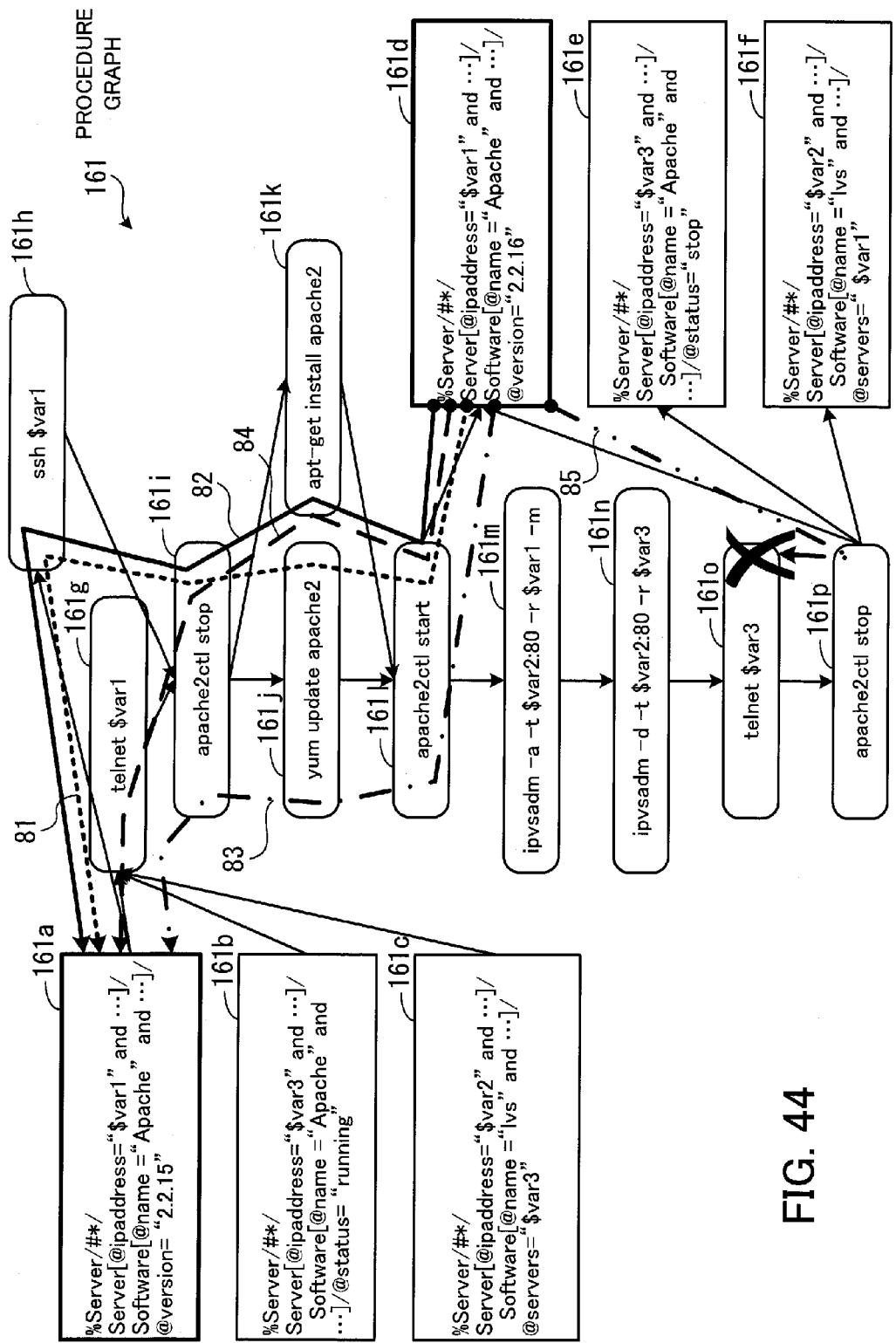
FIG. 44 illustrates extraction of prospective procedures.

FIG. 44 illustrates extraction of prospective procedures. When the paired normalized pre-modification information 73 and post-modification information 74 of FIG. 43 are compared with the procedure graph 161, the pre-modification information 73 matches the input information set 161a, and the post-modification information 74 matches the output information set 161d. Subsequently, paths 81 to 85 extending from the output information set 161d to the input information set 161a are examined to see whether each of the paths 81 to 85 is established without problems. That is, it is examined whether data corresponding to each variable name included in operating information pieces on the individual paths 81 to 85 is found in the configuration information set of the ICT system 44. Note here that each of the operating information pieces is represented by the name of a corresponding node on the individual paths 81 to 85. In other words, if data corresponding to each variable name included in the nodes of the individual paths 81 to 85 is not found in the configuration information set of the ICT system 44, a resource (either hardware or software) targeted for the operations is not included in the ICT system 44. In this case, as for a node including a variable name for which no corresponding data is found, an operation indicated by a corresponding operating information piece represented by the name of the node cannot be executed on the ICT system 44 with the current configuration.

As for each of the paths 81 to 84 in the example of FIG. 44, data corresponding to each variable name included in operating information pieces on the path exists in the configuration information set of the ICT system 44. However, data corresponding to a variable name '$var3' included in a name 'telnet $var3' of the node 1610 on the path 85 does not exist in the configuration information set of the ICT system 44. Note that the data corresponding to the variable name '$var3' means data matching a match pattern corresponding to the variable name '$var3'. As a result, according to the example of FIG. 44, a prospective procedure is generated based on each of the paths 81 to 84. The generated prospective procedures are digraphs, in each of which the input information set 161a, the output information set 161d, and nodes therebetween are connected by edges.

Figure 45:
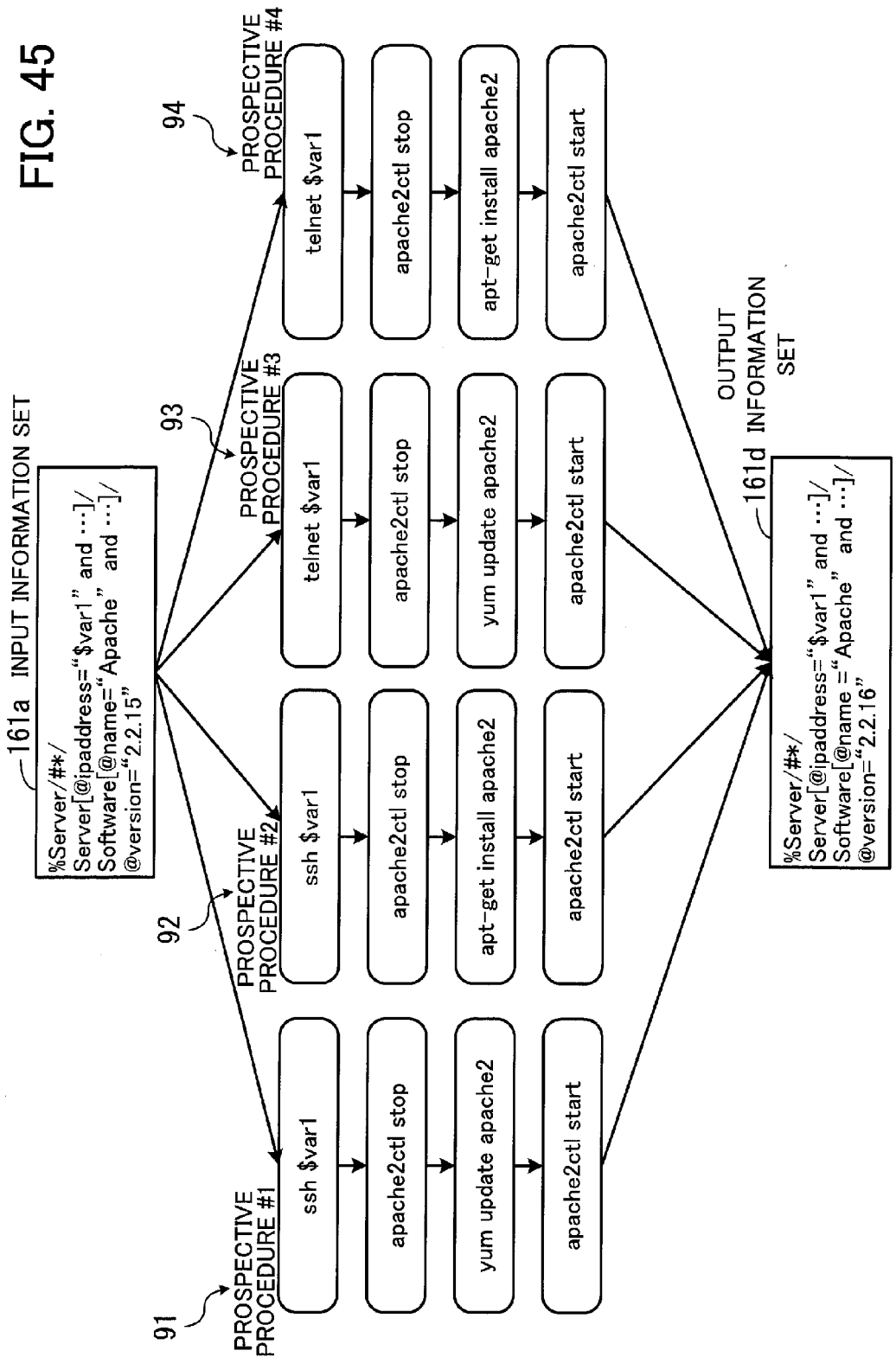
FIG. 45 illustrates an example of a prospective procedure group.

FIG. 45 illustrates an example of a prospective procedure group. The example of FIG. 45 depicts a prospective procedure group including four prospective procedures 91 to 94. The prospective procedure 91 is generated based on the path 81 of FIG. 44. Similarly, the prospective procedures 92, 93, and 94 are generated based on the paths 82, 83, and 84, respectively, of FIG. 44. To each of the prospective procedures 91 to 94, a prospective procedure number is assigned. The prospective procedure number of the prospective procedure 91 is '1'. Similarly, '2', '3', and '4' are assigned to the prospective procedures 92, 93, and 94, respectively, as their prospective procedure numbers. The generated prospective procedure group is stored, for example, in a storage device such as the RAM 102 and the HDD 103.

2-3. Prospective Procedure Instantiating Process

Figure 46:
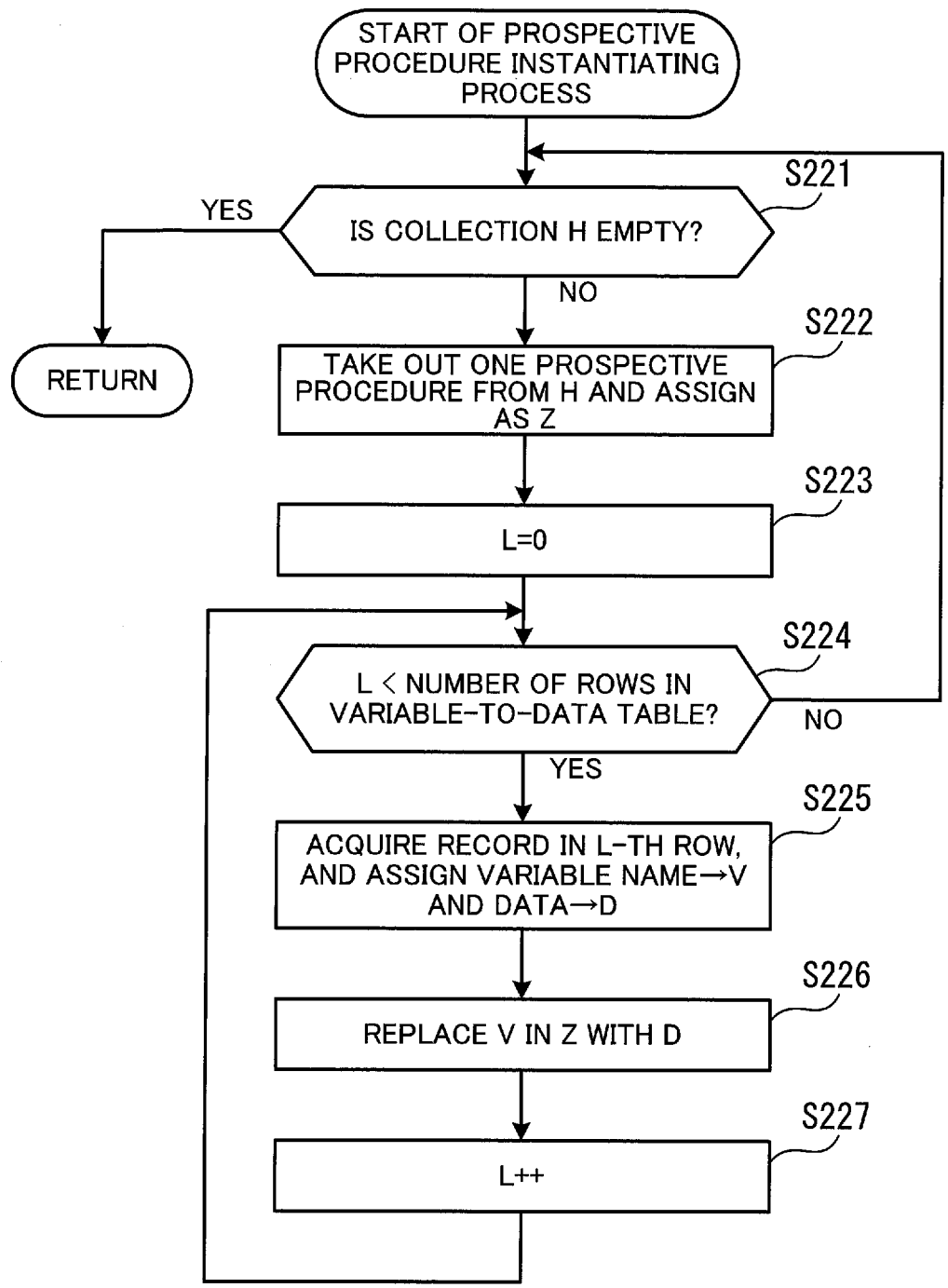
FIG. 46 is a flowchart illustrating a procedure example of a prospective procedure instantiating process.

Next described is the prospective procedure instantiating process (step S203 of FIG. 40). FIG. 46 is a flowchart illustrating a procedure example of a prospective procedure instantiating process. The process of FIG. 46 is described next according to the step numbers in the flowchart.

[Step S221] The prospective procedure generating unit 194 determines whether the collection H representing the prospective procedure group is empty. If the collection H is empty, the prospective procedure generating unit 194 ends the prospective procedure instantiating process. If not, the prospective procedure generating unit 194 proceeds to step S222.

[Step S222] The prospective procedure generating unit 194 takes out one prospective procedure from the collection H, which is then assigned as Variable Z.

[Step S223] The prospective procedure generating unit 194 assigns zero to Variable L.

[Step S224] The prospective procedure generating unit 194 determines whether the value of Variable L is smaller than the number of rows in the variable-to-data table 75 (see FIG. 43). If the Variable L is smaller, the prospective procedure generating unit 194 proceeds to step S225. On the other hand, if the Variable L is equal to or more than the number of rows in the variable-to-data table 75, the prospective procedure generating unit 194 proceeds to step S221.

[Step S225] The prospective procedure generating unit 194 acquires a record in the $L^{th}$ row of the variable-to-data table 75. Then, the prospective procedure generating unit 194 assigns a variable name and data of the acquired record to Variable V and Variable D, respectively.

[Step S226] The prospective procedure generating unit 194 executes a process of replacing, within character strings in the name of each node in the prospective procedure assigned as Variable Z, the variable name assigned as Variable V with the data assigned as Variable D.

[Step S227] The prospective procedure generating unit 194 increments the value of Variable L by one, and subsequently proceeds to step S224.

In this manner, variable names included in prospective procedures are replaced with specific information of a particular ICT system.

Figure 47:
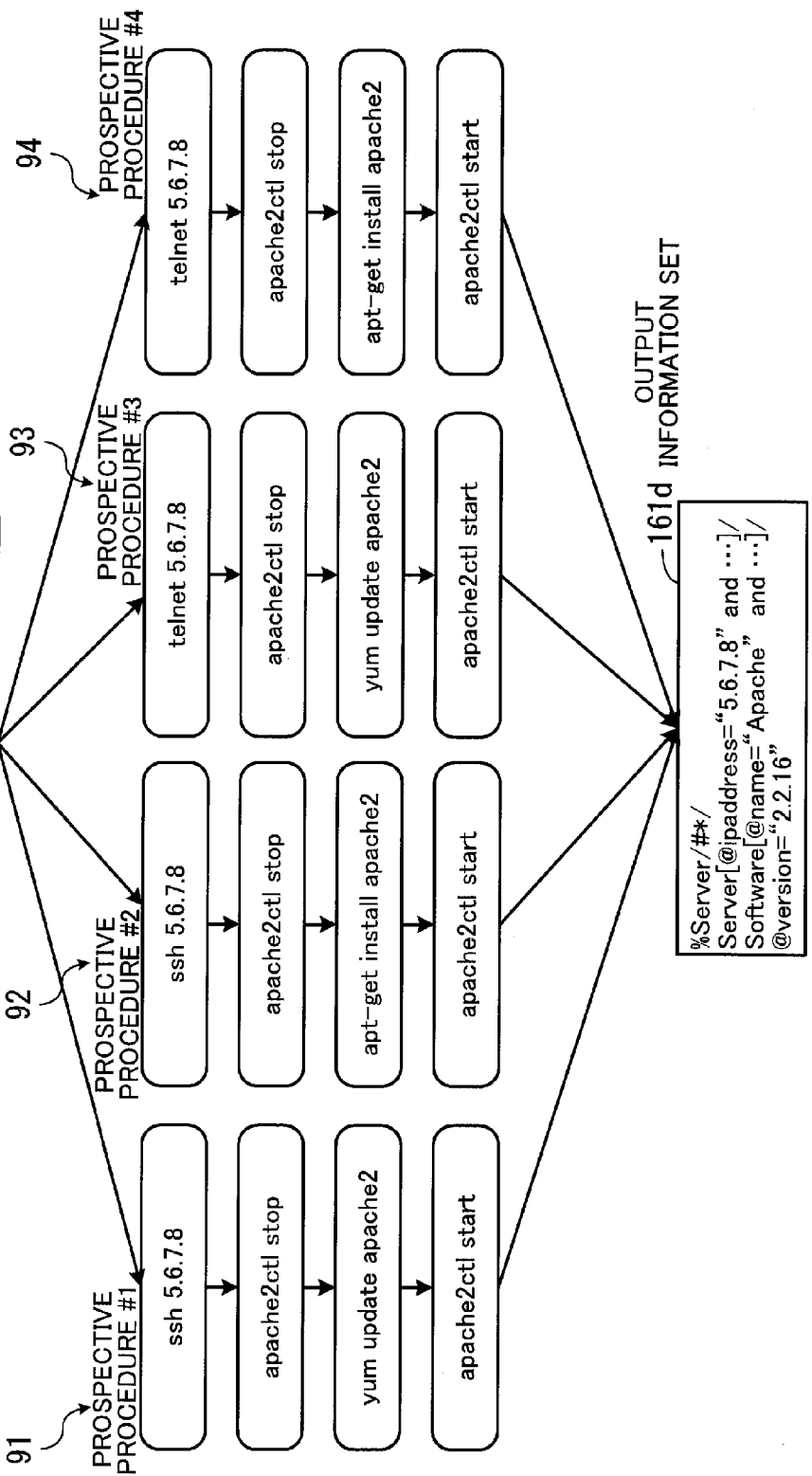
FIG. 47 illustrates an example of the prospective procedures after instantiation.

FIG. 47 illustrates an example of prospective procedures after instantiation. The individual prospective procedures 91 to 94 of FIG. 45 include the variable name '$var1'. With reference to the variable-to-data table of FIG. 43, the variable name '$var1' is associated with the data '5.6.7.8'. Therefore, the character string '$var1' of the prospective procedures 91 to 94 is replaced with '5.6.7.8'. The instantiated prospective procedure group is stored in, for example, in a storage device such as the RAM 102 and the HDD 103.

With a prospective procedure having undergone such an instantiating process, it is possible to make desired configuration modification of an ICT system by simply executing operations set out in the prospective procedure.

2-4. Prospective Procedure Sorting Process

Next described is the prospective procedure sorting process (step S204 of FIG. 40). The following are examples of a criterion used in the prospective procedure sorting process to sort the order of prospective procedures:

1) a prospective procedure used more by various users (unspecified users) is placed higher in rank;

2) a prospective procedure used more by a user having made a procedure request is placed higher in rank;

3) a prospective procedure with fewer operating steps is placed higher in rank;

4) a prospective procedure taking less operational time is placed higher in rank; and 5) a prospective procedure more fitting to a user's operation environment is placed higher in rank.

Note that the sorting unit 195 sorts the order of prospective procedures according to, for example, a sorting criterion selected in advance from the sorting criteria above. In the case where, for example, a user having made a procedure request designates a sorting criterion, the sorting unit 195 sorts the prospective procedures according to the designated criterion.

The following describes the prospective procedure sorting process according to each of the above-mentioned criteria. First described is a process of sorting the order of prospective procedures in such a manner that a prospective procedure used more by various users is placed higher in rank.

Figure 48:
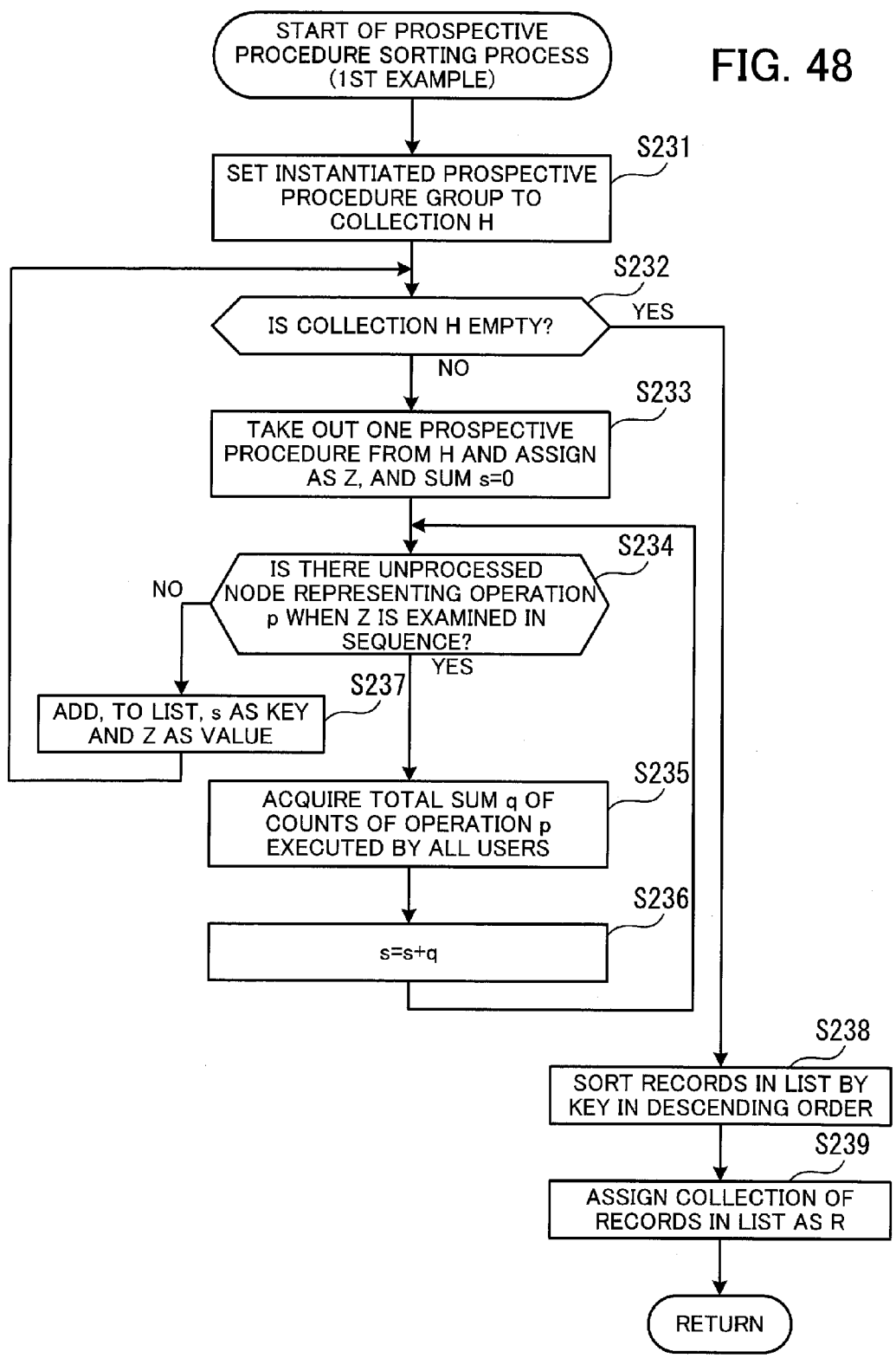
FIG. 48 is a flowchart illustrating a first example of a prospective procedure sorting process.

FIG. 48 is a flowchart illustrating a first example of a prospective procedure sorting process. The first example of the prospective procedure sorting process is directed to a sorting process procedure for the case where a prospective procedure used more by various users is placed higher in rank. The process of FIG. 48 is described next according to the step numbers in the flowchart.

[Step S231] The sorting unit 195 sets an instantiated prospective procedure group to the collection H.

[Step S232] The sorting unit 195 determines whether the collection H including the prospective procedure group is empty. If the collection H is empty, the sorting unit 195 proceeds to step S238. If not, the sorting unit 195 proceeds to step S233.

[Step S233] The sorting unit 195 takes out one prospective procedure from the collection H including the prospective procedure group, and assigns the prospective procedure number of the prospective procedure as Variable Z. At this point, the sorting unit 195 assigns zero to the value of Variable s representing a sum.

[Step S234] As for the prospective procedure identified by the prospective procedure number assigned as Variable Z, the sorting unit 195 examines nodes included in the prospective procedure, each node representing an operation. More specifically, the examination starts in sequence from the first node to thereby find a first unprocessed node in the sequence. If the first unprocessed node is found, the sorting unit 195 assigns, as Variable p, an operating information piece represented by the name of the node and then proceeds to step S235. If not, the sorting unit 195 proceeds to step S237.

[Step S235] The sorting unit 195 acquires, from each of the operation performance record tables (see FIG. 14) of the performance record storing unit 180, the number of times the operation assigned as Variable p has been executed. At this point, the sorting unit 195 sums the numbers of execution times of the operation assigned as Variable p acquired from the operation performance record tables 181, 182, and . . . associated with individual users, and assigns the sum as Variable q.

[Step S236] The sorting unit 195 adds the value of Variable p to the value of Variable s and assigns the result of the addition as a new value of Variable s. Subsequently, the sorting unit 195 proceeds to step S234.

[Step S237] The sorting unit 195 adds, to a prospective procedure list, a record having a key equal to the value of Variable s and a value equal to the prospective procedure number. Subsequently, the sorting unit 195 proceeds to step S232.

[Step S238] The sorting unit 195 sorts records in the prospective procedure list by key in descending order.

[Step S239] The sorting unit 195 assigns a collection of the records in the prospective procedure list as a collection R representing a sorting result. At this point, the order of the records in the prospective procedure list is maintained in the collection R.

In the above-described manner, it is possible to sort the order of prospective procedures in such a manner that a prospective procedure used more by various users is placed higher in rank.

Figure 49:
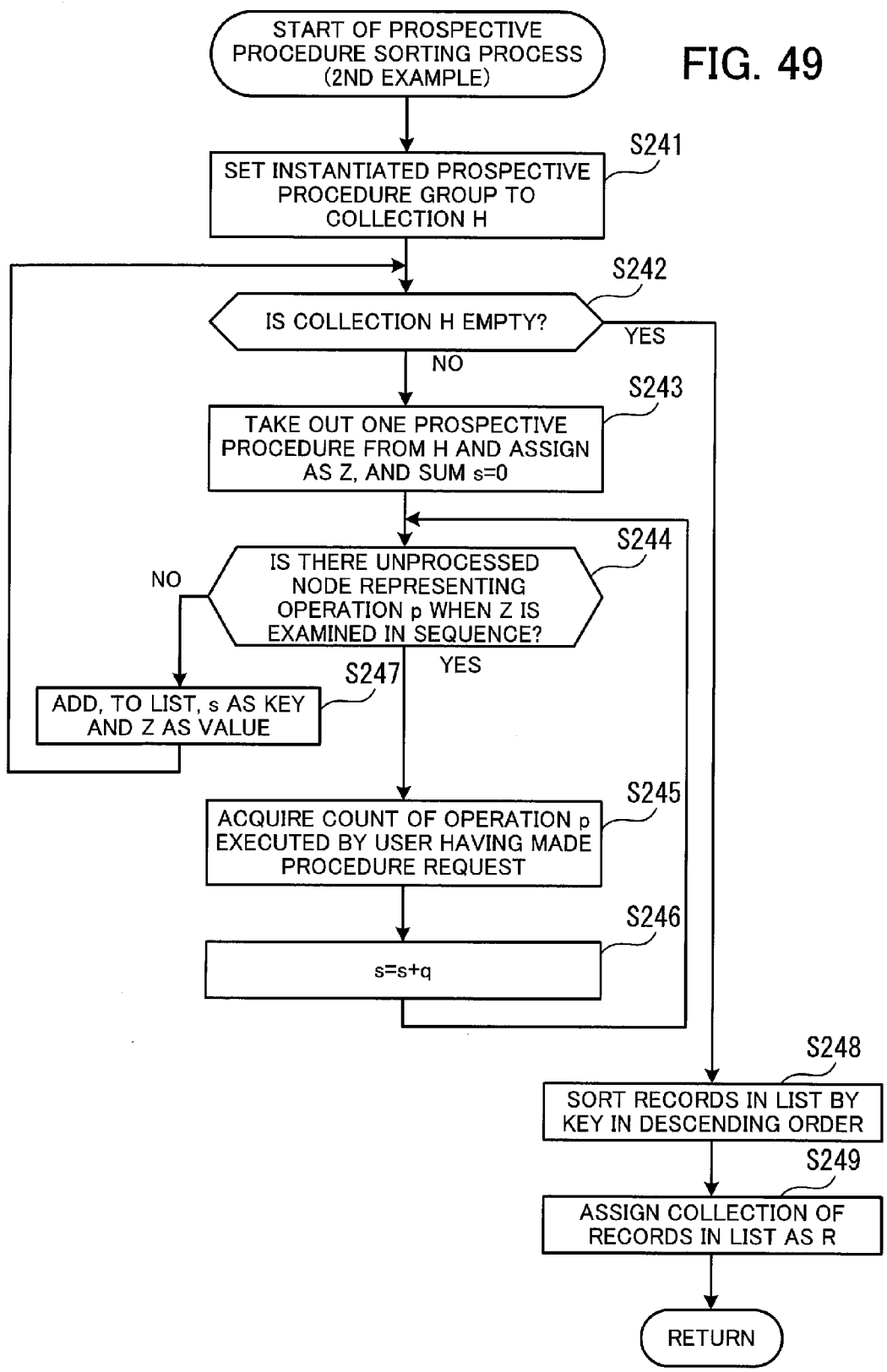
FIG. 49 is a flowchart illustrating a second example of the prospective procedure sorting process.

Next described is a process of sorting the order of prospective procedures in such a manner that a prospective procedure used more by a user having made a procedure request is placed higher in rank. FIG. 49 is a flowchart illustrating a second example of the prospective procedure sorting process. The second example of the prospective procedure sorting process is directed to a sorting process procedure for the case where a prospective procedure used more by a user having made a procedure request is placed higher in rank. Among steps S241 to S249 of FIG. 49, processing of steps S241 to S244 and steps S246 to S249 is the same as that of steps S231 to S234 and S236 to S239, respectively, in the flowchart of FIG. 48. Processing of step S245 is as stated below.

[Step S245] The sorting unit 195 acquires the number of times the operation assigned as Variable p has been executed only from an operation performance record table associate with the user having made the procedure request. Subsequently, the sorting unit 195 assigns the number of execution times of the operation executed by the user as Variable q.

In the above-described manner, it is possible to sort the order of prospective procedures in such a manner that a prospective procedure used more by a user having made a procedure request is placed higher in rank.

Figure 50:
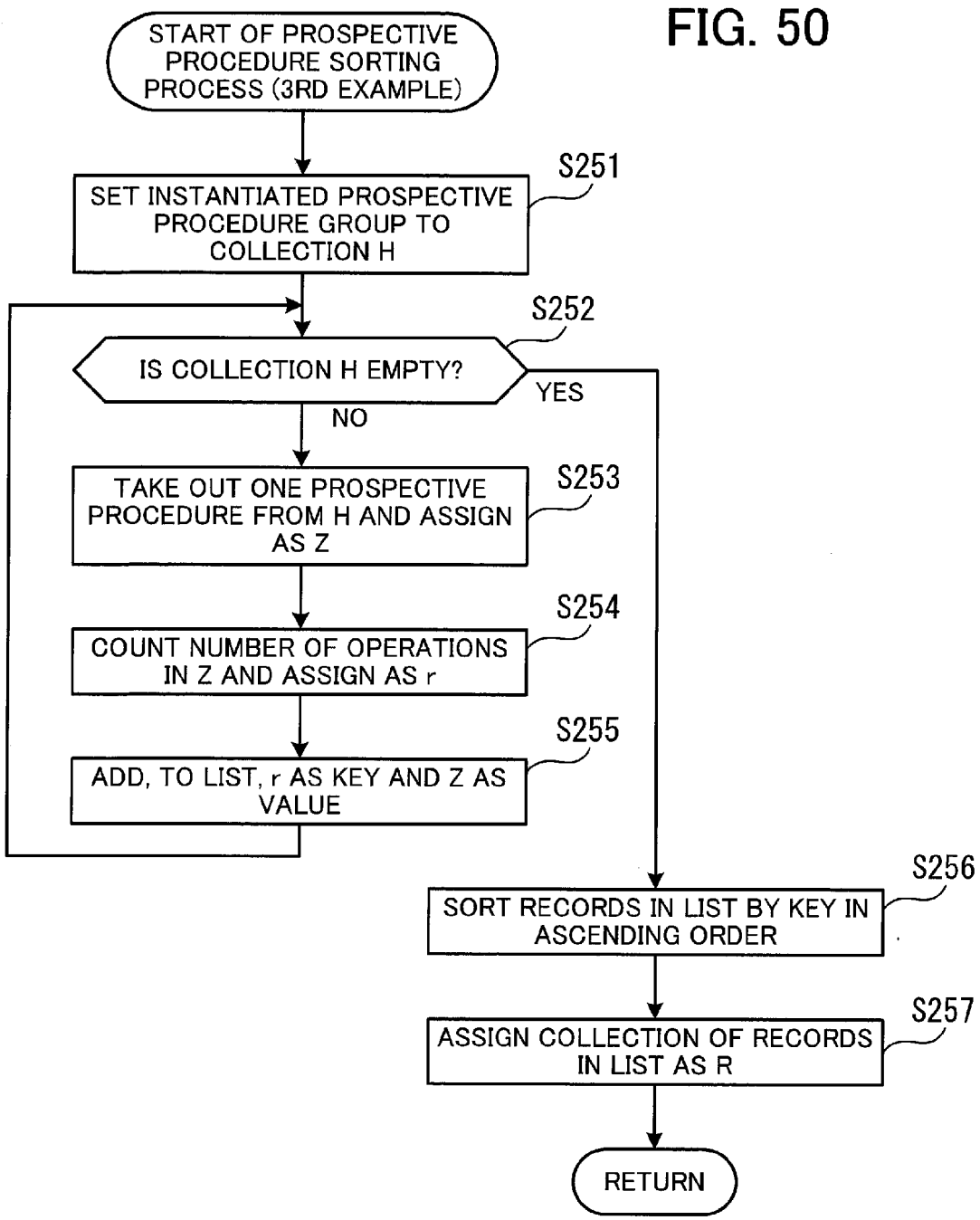
FIG. 50 is a flowchart illustrating a third example of the prospective procedure sorting process.

Next described is a process of sorting the order of prospective procedures in such a manner that a prospective procedure with fewer operating steps is placed higher in rank. FIG. 50 is a flowchart illustrating a third example of the prospective procedure sorting process. The third example of the prospective procedure sorting process is directed to a sorting process procedure for the case where a prospective procedure with fewer operating steps is placed higher in rank. The process of FIG. 50 is described next according to the step numbers in the flowchart.

[Step S251] The sorting unit 195 sets an instantiated prospective procedure group to the collection H.

[Step S252] The sorting unit 195 determines whether the collection H including the prospective procedure group is empty. If the collection H is empty, the sorting unit 195 proceeds to step S256. If not, the sorting unit 195 proceeds to step S253.

[Step S253] The sorting unit 195 takes out one prospective procedure from the collection H including the prospective procedure group, and assigns the prospective procedure number of the prospective procedure as Variable Z.

[Step S254] The sorting unit 195 counts the number of operations in the prospective procedure (i.e., the number of nodes in the prospective procedure) identified by the prospective procedure number assigned as Variable Z, and assigns the count result as Variable r.

[Step S255] The sorting unit 195 adds, to a prospective procedure list, a record having a key equal to the value of Variable r and a value equal to the prospective procedure number. Subsequently, the sorting unit 195 proceeds to step S252.

[Step S256] The sorting unit 195 sorts records in the prospective procedure list by key in ascending order.

[Step S257] The sorting unit 195 assigns a collection of the records in the prospective procedure list as a collection R representing a sorting result. At this point, the order of the records in the prospective procedure list is maintained in the collection R.

In the above-described manner, it is possible to sort the order of prospective procedures in such a manner that a prospective procedure with fewer operating steps is placed higher in rank.

Figure 51:
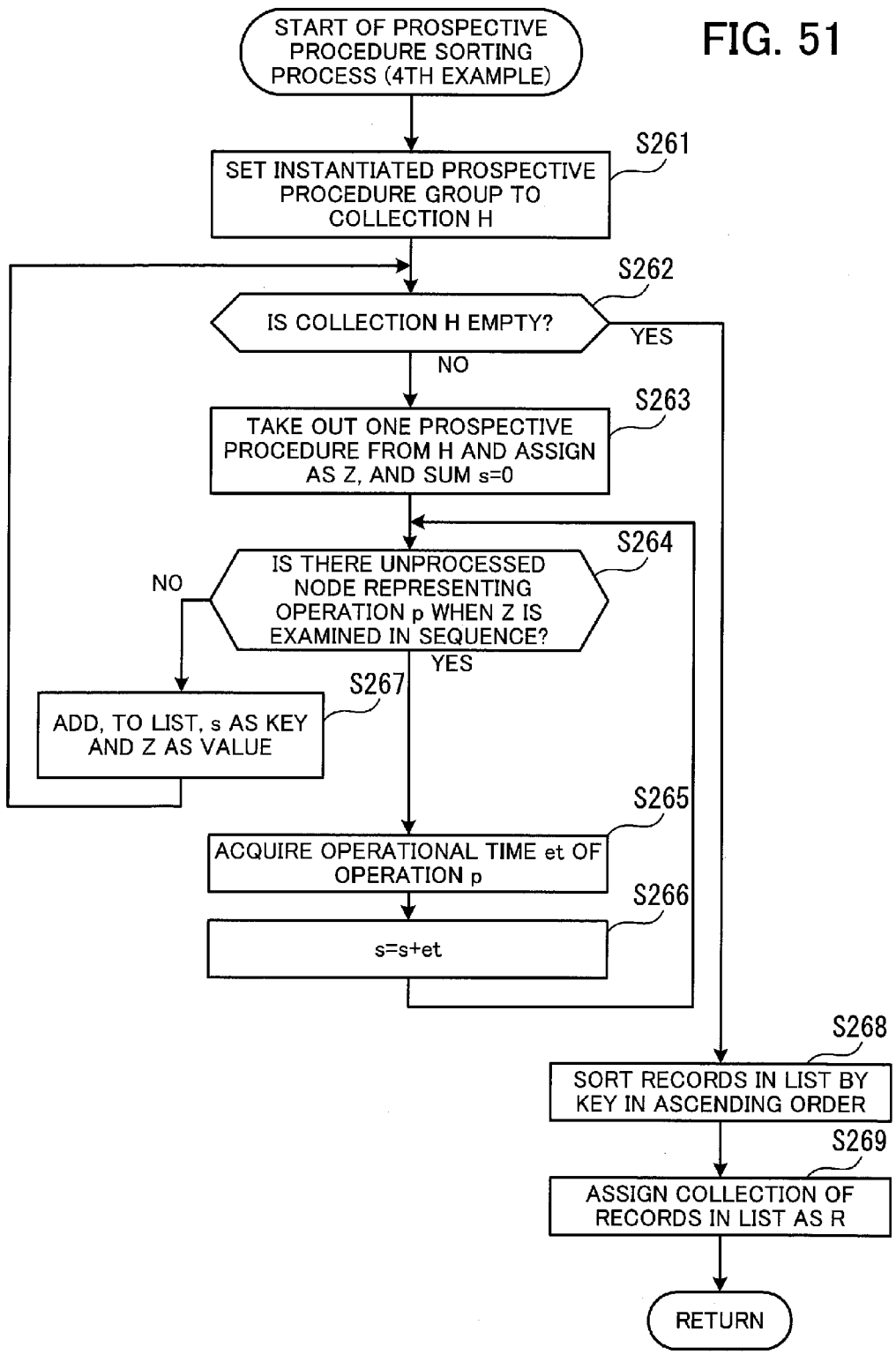
FIG. 51 is a flowchart illustrating a fourth example of the prospective procedure sorting process.

Next described is a process of sorting the order of prospective procedures in such a manner that a prospective procedure taking less operational time is placed higher in rank. FIG. 51 is a flowchart illustrating a fourth example of the prospective procedure sorting process. The fourth example of the prospective procedure sorting process is directed to a sorting process procedure for the case where a prospective procedure taking less operational time is placed higher in rank. Among steps S261 to S269 of FIG. 51, processing of steps S261 to S264, S267, and S269 is the same as that of steps S231 to S234, S237, and S239, respectively, in the flowchart of FIG. 48. Processing of steps S265, S266, and S268 is as stated below.

[Step S265] The sorting unit 195 acquires an operational time of the operation assigned as Variable p from the operational time performance record table 180*a* (see FIG. 14). Subsequently, the sorting unit 195 assigns the acquired operational time as Variable et.

[Step S266] The sorting unit 195 adds the value of Variable et to the value of Variable s and assigns the result of the addition as a new value of Variable s. Subsequently, the sorting unit 195 proceeds to step S264.

[Step S268] The sorting unit 195 sorts records in the prospective procedure list by key in ascending order.

In the above-described manner, it is possible to sort the order of prospective procedures in such a manner that a prospective procedure taking less operational time is placed higher in rank.

Next described is a process of sorting the order of prospective procedures in such a manner that a prospective procedure more fitting to a user's operation environment is placed higher in rank. Note that the 'prospective procedure more fitting to a user's operation environment' here means a prospective procedure having a higher command support rate, which rate indicates a proportion of the number of commands supported by a corresponding ICT system to the total number of commands input in relation to operations of the prospective procedure.

Figure 52:
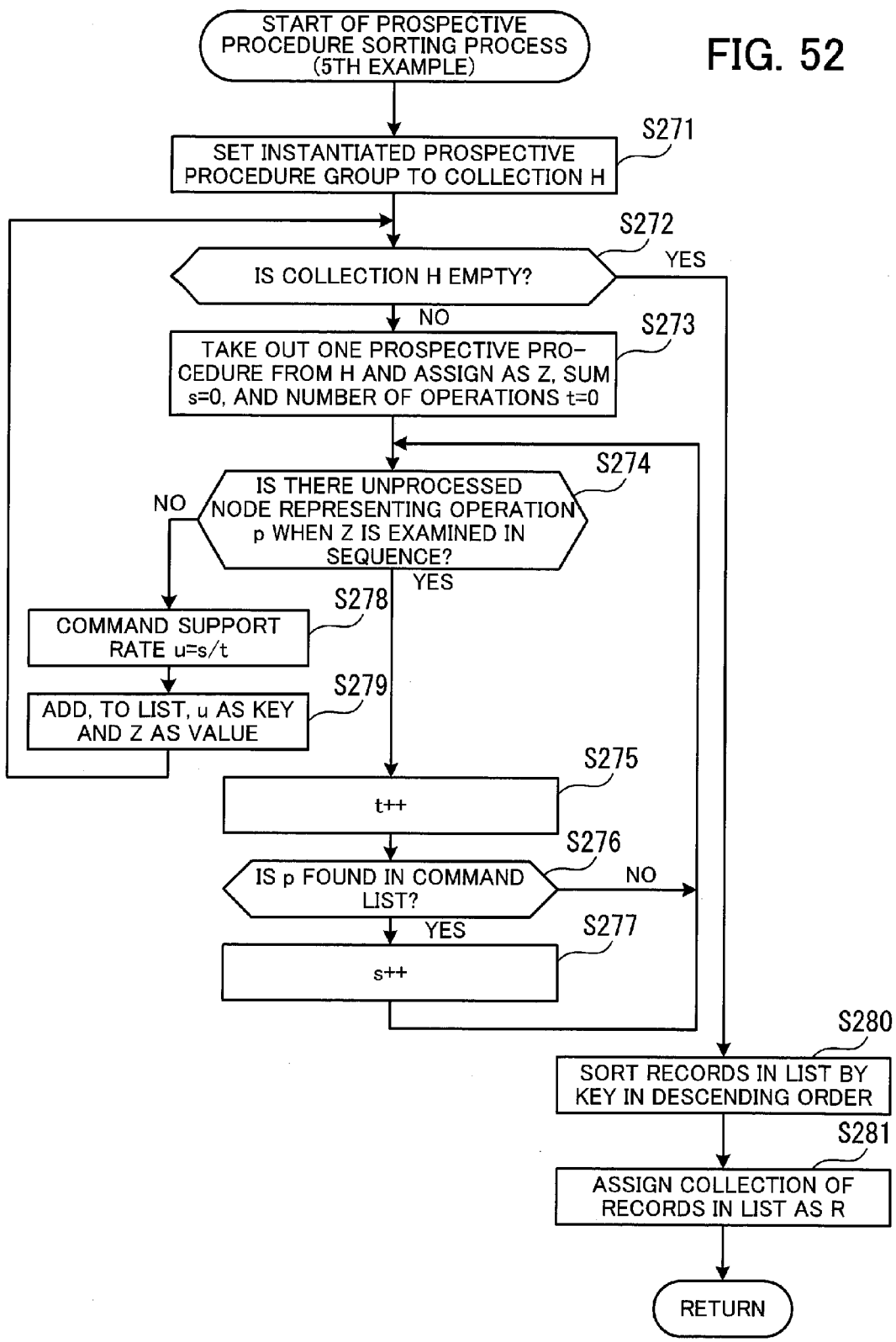
FIG. 52 is a flowchart illustrating a fifth example of the prospective procedure sorting process.

FIG. 52 is a flowchart illustrating a fifth example of the prospective procedure sorting process. The fifth example of the prospective procedure sorting process is directed to a sorting process procedure for the case where a prospective procedure more fitting to a user's operation environment is placed higher in rank. The process of FIG. 52 is described next according to the step numbers in the flowchart.

[Step S271] The sorting unit 195 sets an instantiated prospective procedure group to the collection H.

[Step S272] The sorting unit 195 determines whether the collection H including the prospective procedure group is empty. If the collection H is empty, the sorting unit 195 proceeds to step S280. If not, the sorting unit 195 proceeds to step S273.

[Step S273] The sorting unit 195 takes out one prospective procedure from the collection H including the prospective procedure group, and assigns the prospective procedure number of the prospective procedure as Variable Z. At this point, the sorting unit 195 assigns zero to both the value of Variable s representing a sum and the value of Variable t representing the number of operations.

[Step S274] As for the prospective procedure identified by the prospective procedure number assigned as Variable Z, the sorting unit 195 examines nodes included in the prospective procedure, each node representing an operation. More specifically, the examination starts in sequence from the first node to thereby find a first unprocessed node in the sequence. If the first unprocessed node is found, the sorting unit 195 assigns, as Variable p, an operating information piece represented by the name of the node and then proceeds to step S275. If not, the sorting unit 195 proceeds to step S278.

[Step S275] The sorting unit 195 increments the value of Variable t by one.

[Step S276] The sorting unit 195 determines whether a command input in relation to the operation assigned as Variable p is found in a command list (see FIG. 13) of the executable command storing unit 170, which command list is associated with a user having made a procedure request. If the command is found in the command list, the sorting unit 195 proceeds to step S277. If not, the sorting unit 195 proceeds to step S274.

[Step S277] The sorting unit 195 increments the value of Variable s by one, and then proceeds to step S274.

[Step S278] The sorting unit 195 divides the value of Variable s by the value of Variable t, and assigns the result of the division as Variable u representing the command support rate.

[Step S279] The sorting unit 195 adds, to a prospective procedure list, a record having a key equal to the value of Variable u and a value equal to the prospective procedure number. Subsequently, the sorting unit 195 proceeds to step S272.

[Step S280] The sorting unit 195 sorts records in the prospective procedure list by key in descending order.

[Step S281] The sorting unit 195 assigns a collection of the records in the prospective procedure list as a collection R representing a sorting result. At this point, the order of the records in the prospective procedure list is maintained in the collection R.

In the above-described manner, it is possible to sort the order of prospective procedures in such a manner that a prospective procedure more fitting to a user's operation environment is placed higher in rank.

The following gives specific examples of sorting the order of prospective procedures by the prospective procedure sorting process according to the second and fifth examples described above. Assume in the following examples that the user 24 with the user ID 'user #4' has made a procedure request.

First described is a specific example of sorting the order of prospective procedures according to the second example so that a prospective procedure used more by the user 24 having made the procedure request is placed higher in rank.

Figure 53:
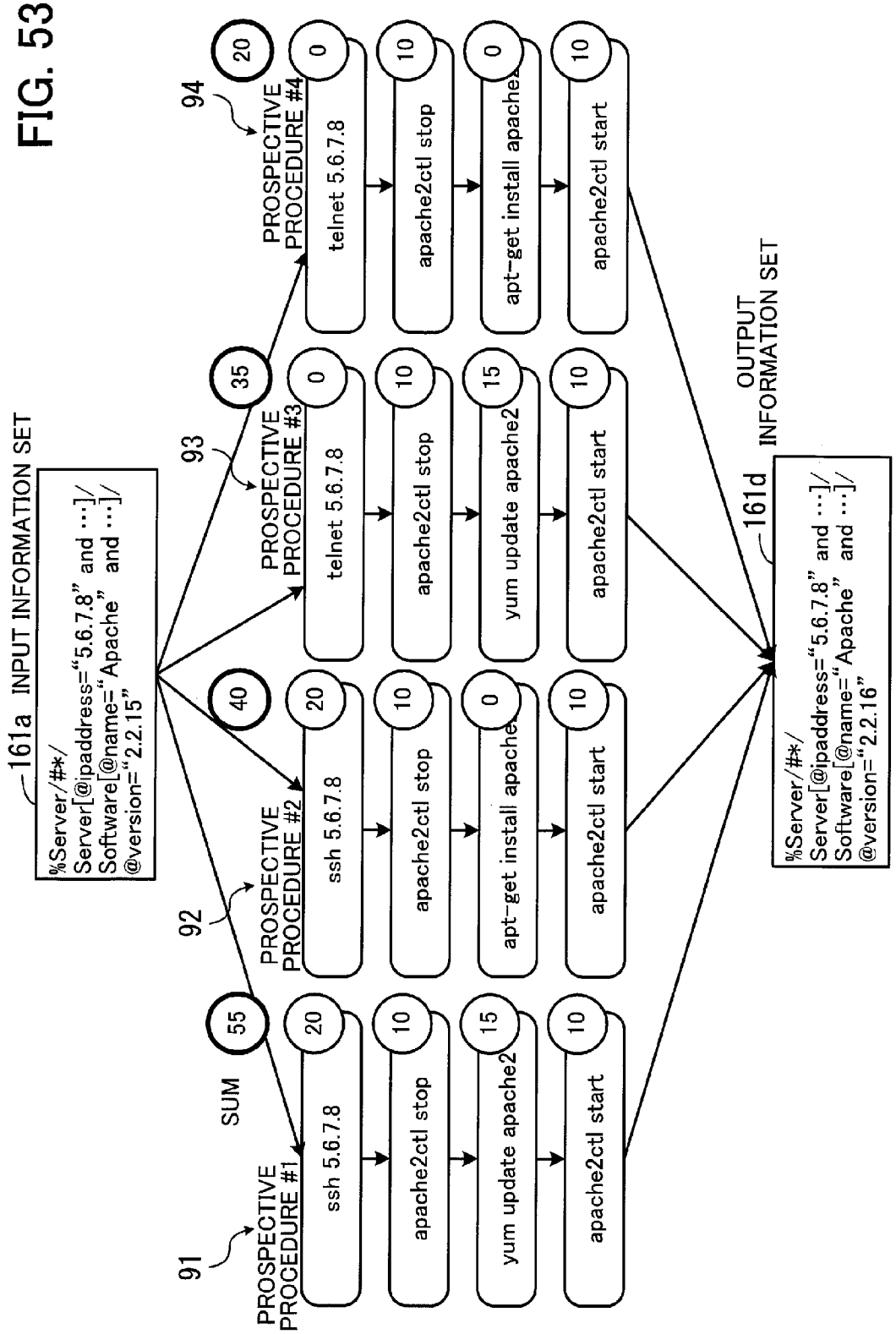
FIG. 53 illustrates an example of the count of execution of each operation included in individual prospective procedures.

FIG. 53 illustrates an example of the count of execution of each operation included in individual prospective procedures. The counts of execution of FIG. 53 are based on the operation performance record table 181 of FIG. 14. According to the operation performance record table 181, the user 24 has executed a command 'ssh' twenty times; a command 'yum update' fifteen times; a command 'apache2ctl start' ten times; and a command 'apache2ctl stop' ten times. Assume here that the user 24 has not executed commands 'telnet' and 'apt-get install apache2' since these commands are not registered in the operation performance record table 181. Based on such counts of execution, the sum of the counts of execution is calculated for each of the prospective procedures 91 to 94.

The sum of the counts of execution for the prospective procedure 91 is 55; the sum of the counts of execution for the prospective procedure 92 is 40; the sum of the counts of execution for the prospective procedure 93 is 35; and the sum of the counts of execution for the prospective procedure 94 is 20.

Accordingly, the prospective procedures in the prospective procedure list are sorted by the sum of the counts of execution in descending order. FIG. 54 illustrates an example of a sorted prospective procedure list. A prospective procedure list 95 includes columns of 'prospective procedure number' and 'sum'. Each field in the prospective procedure number column has a prospective procedure number of a prospective procedure. Each field in the sum column has a sum of the counts of execution related to a corresponding prospective procedure. As illustrated in FIG. 54, a prospective procedure having a larger sum of the counts of execution is placed higher in rank in the prospective procedure list 95. This allows a prospective procedure used more by the user 24 having made the procedure request to be placed higher in rank.

Figure 55:
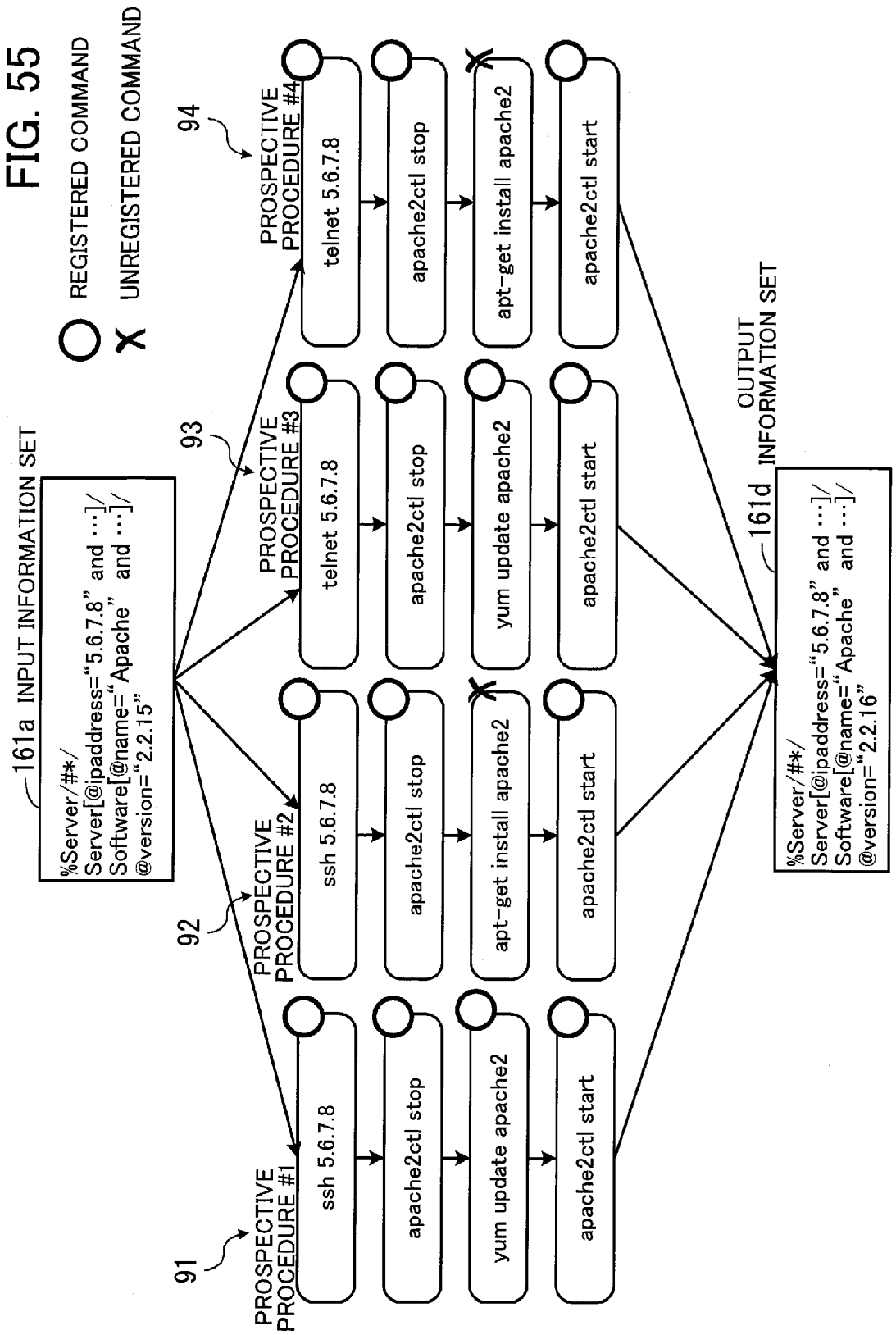
FIG. 55 illustrates an example of registered and unregistered commands corresponding to operations included in the individual prospective procedures.

Next described is a specific example of sorting the order of prospective procedures according to the fifth example so that a prospective procedure more fitting to a user's operation environment is placed higher in rank. FIG. 55 illustrates an example of registered and unregistered commands corresponding to operations included in individual prospective procedures. The registered and unregistered commands of FIG. 55 are based on the command list 171 of FIG. 13. In the command list 171, the commands 'ssh', 'yum', 'apache2ctl', and 'telnet' are registered, however, a command 'apt-get' is not registered. In this case, as for the prospective procedures 91 and 93, commands corresponding to all the operations have been registered. On the other hand, as for each of the prospective procedures 92 and 94, a command corresponding to one operation has been unregistered.

Based on the result of the examination on the registration of the commands, the command support rate of each prospective procedure is calculated and then registered in the prospective procedure list. Subsequently, the prospective procedures are sorted in descending order of the command support rate. Note that the command support rate of each prospective procedure is obtained by dividing the number of operations whose commands are executable in a corresponding ICT system by the total number of operations included in the prospective procedure.

FIG. 56 illustrates an example of a sorted prospective procedure list according to the command support rate. A prospective procedure list 96 of FIG. 56 includes columns of 'prospective procedure number' and 'command support rate'. Each field in the prospective procedure number column has a prospective procedure number of a prospective procedure. Each field in the command support rate column has a command support rate of a corresponding prospective procedure. As illustrated in FIG. 56, a prospective procedure having a higher command support rate is placed higher in rank in the prospective procedure list 96. In the example of FIG. 56, both the prospective procedures 91 and 93 with the prospective procedure numbers '1' and '3', respectively, have a command support rate of '1', thereby being placed higher in the prospective procedure list 96. On the other hand, both the prospective procedures 92 and 94 with the prospective procedure numbers '2' and '4', respectively, have a command support rate of '0.75', thereby being placed lower in the prospective procedure list 96.

2-5. Prospective Procedure Presenting Process

Figure 57:
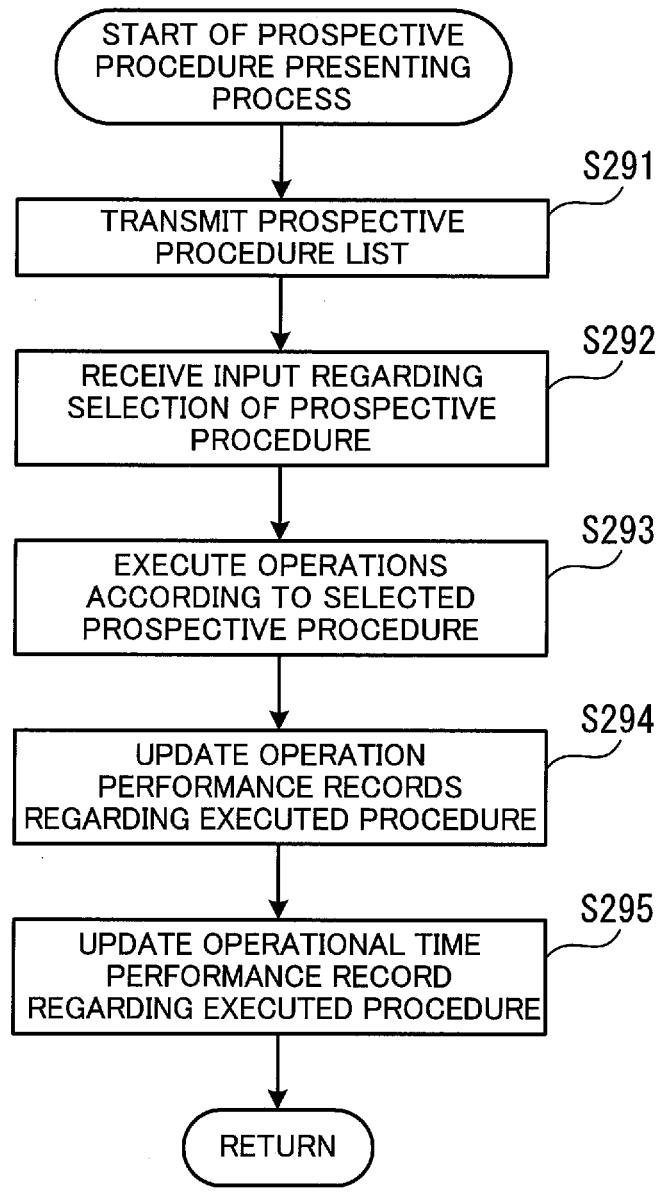
FIG. 57 is a flowchart illustrating a procedure example of a prospective procedure presenting process.

Next described is the prospective procedure presenting process (step S205 of FIG. 40). FIG. 57 is a flowchart illustrating a procedure example of a prospective procedure presenting process. The process of FIG. 57 is described next according to the step numbers in the flowchart.

[Step S291] The sorting unit 195 transmits contents of a prospective procedure list to a terminal having transmitted the procedure request.

[Step S292] The procedure executing unit 196 receives, from the terminal, an input regarding a selection of a prospective procedure.

[Step S293] In response to the input of the selection of a prospective procedure, the procedure executing unit 196 executes a series of operations indicated by operating information pieces on an ICT system corresponding to the terminal according to the selected prospective procedure.

[Step S294] Based on the executed series of operations, the information acquiring unit 191 updates operation performance records associated with a user having selected the prospective procedure. For example, the information acquiring unit 191 increments, in an operation performance record table associated with the user, a value in the performance column corresponding to each operating information piece included in the executed series of operations.

[Step S295] Based on the operational time taken for each of the executed series of operations, the information acquiring unit 191 updates an operational time performance record of the operation. For example, the information acquiring unit 191 measures time taken from the point when a content of an operating information piece for each operation is input to the ICT system to the point when a response to the input is returned, and the measured time is used as the operational time of the operation. Then, the information acquiring unit 191 updates, in the operational time performance record table 180a, an operational time already registered for the operation with the newly measured operational time.

In this manner, it is possible to present a list of prospective procedures to a user in response to a procedure request from the user, and also to cause a corresponding ICT system to execute a series of operations set out in a selected prospective procedure. Note that, in the example of FIG. 57, the administrative server 100 executes a series of operations. However, by referring to a prospective procedure presented on a terminal, a user may sequentially input each operation set out in the prospective procedure to the ICT system.

FIG. 58 illustrates a first example of a prospective procedure list displayed on a terminal. FIG. 58 depicts a prospective procedure display screen 310 displayed on a terminal for the case where a prospective procedure used more by a user having made a procedure request is placed higher in rank. On the prospective procedure display screen 310, a prospective procedure list 311 is displayed. Next to each prospective procedure of the prospective procedure list 311, a selection button 312 is provided. The user selects one of the selection buttons 312 to thereby refer to a content of a prospective procedure associated with the selected selection button 312. The content of the selected prospective procedure is displayed in a prospective procedure display section 313.

In addition, an OK button 314 and a cancel button 315 are provided on the prospective procedure display screen 310. The OK button 314 is used to execute operations according to the selected prospective procedure. When the OK button 314 is pressed, the following is transmitted from the terminal to the administrative server 100: a prospective procedure number of the prospective procedure being selected at the time the OK button 314 is pressed; and information indicating that the prospective procedure has been selected. On the other hand, when the cancel button 315 is pressed, the prospective procedure display screen 310 is closed without transmission of the selected prospective procedure to the administrative server 100.

FIG. 59 illustrates a second example of the prospective procedure list displayed on the terminal. FIG. 59 depicts a prospective procedure display screen 320 displayed on a terminal for the case where a prospective procedure more fitting to a user's operation environment is placed higher in rank. Similar to the prospective procedure display screen 310 of FIG. 58, the prospective procedure display screen 320 includes a prospective procedure list 321, a selection button 322, a prospective procedure display section 323, an OK button 324, and a cancel button 325.

Thus, the prospective procedure list and the content of the selected prospective procedure are displayed on the terminal, which facilitates the user to determine an appropriate operating procedure and operate a corresponding ICT system according to the displayed operating procedure. This improves the working efficiency of the user in managing the ICT system.

In addition, even in the case where the user accesses the ICT system from his/her terminal and operates the ICT system, the user simply carries out operations according to the procedure displayed on the prospective procedure display screen, thus preventing errors in operation.

In addition, according to the second embodiment, the administrative server 100 stores an operating procedure executed by each user as a procedure log, and generates a procedure graph by normalizing such procedure logs. This allows reuse of operating procedures carried out by the individual users 21 to 24 on the ICT systems 41 to 44, respectively. That is, the administrator of the administrative server 100 does not have to start from scratch to generate the procedure graph (i.e., no need to create a template for the procedure graph), thus reducing management burden on the administrative server 100.

Further, according to the second embodiment, when storing the operating procedures, the administrative server 100 generates a digraph by normalizing multiple procedure logs of the users using corresponding configuration information sets and combining the normalized procedure logs. The generated digraph is used as a procedure graph. In this process, as for individual operations in the operating procedures, the administrative server 100 regards, as the same operations, identical operations carried out on identical elements (physical hardware resources, or software resources such as virtual machine operating systems and applications) even if the operations are carried out on different ICT systems. Then, the administrative server 100 extracts operating procedures from the procedure graph based on input and output information designated by the user having made a procedure request, and applies a configuration information set associated with the user to the extracted operating procedures. With this, it is possible to generate prospective procedures by combining operations set out in multiple procedure logs rather than only simply using operating procedures set out in the individual procedure logs. This allows presentation of more appropriate prospective procedures to the user having made a procedure request.

Further, the administrative server 100 generates each match pattern representing a modification target by acquiring, from a configuration information set of a corresponding ICT system, an element (a physical hardware resource, or a software resource such as a virtual machine operating system and an application) for which a series of operations have been executed. The use of such match patterns allows conversion of variable names included in the procedure graph into specific information of an ICT system managed by the user having made a procedure request. In addition, since each match pattern is automatically generated when a procedure log is normalized, the administrative server 100 does not have to register the match pattern, thus reducing management burden on the administrative server 100.

Further, according to the second embodiment, operating procedures extracted according to a procedure request made by a user are used as prospective procedures, which are presented to the user after being sorted based on a predetermined criterion. This facilitates the user to determine an appropriate procedure from among multiple procedures capable of achieving modification in the configuration of an ICT system desired by the user.

Note that the user having made a procedure request may select a criterion used to sort the order of prospective procedures. With this, it is possible to present the user with the prospective procedures in the order that suits the user's purpose.

As described above, according to the second embodiment, it is possible to greatly reduce the workload of users to generate and manage operating procedures without increasing the management burden on the administrator of the administrative server 100.

(c) Other Embodiments

The second embodiment above is directed to presenting prospective procedures for modifying the configuration of an ICT system. However, the administrative server 100 of the second embodiment is able to generate prospective operating procedures for not only ICT systems but also various other types of systems. For example, an apparatus having the same functions as the administrative server 100 may acquire a procedure log for modifying settings of another apparatus whose operation is controlled by a built-in computer and then present prospective procedures based on the acquired procedure log.

In addition, the processing functions described in each of the embodiments above may be achieved by a computer. In this case, a program is provided which describes processing contents of the functions held by the information processing apparatus 1 and the administrative server 100. By executing the program on the computer, the above-described processing functions are achieved on the computer. The program in which the processing contents are described may be recorded on computer-readable recording media. Such computer-readable recording media include a magnetic storage device, an optical disk, a magneto-optical recording medium, and a semiconductor memory. Examples of the magnetic storage device are a HDD, a flexible disk (FD), and a magnetic tape. Examples of the optical disk are a DVD, a DVD-RAM, a CD-ROM, and a CD-RW. An example of the magneto-optical recording medium is a magneto-optical disk (MO).

In the case of distributing the program, for example, portable recording media, such as DVDs and CD-ROMs, on which the program is recorded are sold. In addition, the program may be stored in a memory device of a server computer and then transferred from the server computer to another computer via a network.

A computer for executing a program stores, for example, in its own memory device, the program which is originally recorded on a portable recording medium or transferred from the server computer. Subsequently, the computer reads the program from its own memory device and performs processing according to the program. Note that the computer is able to read the program directly from the portable recording medium and perform processing according to the program. In addition, the computer is able to sequentially perform processing according to a received program each time such a program is transferred from the server computer.

In addition, at least part of the above-described processing functions may be achieved by an electronic circuit, such as a digital signal processor (DSP), an application specific integrated circuit (ASIC), and a programmable logic device (PLD).

It is possible to promote the efficiency of operations on system configuration modification.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a processor configured to perform a procedure including:
acquiring a procedure log indicating a series of operations for a configuration modification, input to a management-target system and including, into a collection of procedure information sets, the procedure log after replacing a specific information piece in the procedure log with a corresponding variable name;
extracting, from the collection of procedure information sets, a procedure information set indicating an operating procedure according to a content of the configuration modification to be applied to a modification-target system; and
replacing a variable name in the extracted procedure information set with a corresponding specific information piece of the modification-target system, which specific information piece is acquired from a configuration information set defining a configuration of the modification-target system.

2. The information processing apparatus according to claim 1, wherein the replacing includes acquiring the specific information piece from a location in the configuration information set by determining the location of the specific information piece with reference to a storage device that stores therein correspondences between the variable names included in the collection of procedure information sets and location information pieces individually indicating locations in configuration information sets defining configurations of individual systems, at which locations the specific information pieces individually corresponding to the variable names are found.

3. The information processing apparatus according to claim 1, wherein the replacing of the specific information piece in the procedure log includes detecting, in the procedure log, a character string matching a predefined string pattern and determining the character string, which is a value set for an attribute, as the specific information piece.

4. The information processing apparatus according to claim 1, wherein the procedure further includes detecting, from a configuration information set defining a configuration of the management-target system, an attribute of the replaced specific information piece in the procedure log and generating a location information piece defining an appearance location of the attribute in the configuration information set.

5. The information processing apparatus according to claim 4, wherein the generation of the location information piece includes including, in the location information piece, a relative location of the attribute to a location of information to be modified in the configuration information set according to the configuration modification.

6. The information processing apparatus according to claim 1, wherein the procedure further includes generating, based on the procedure log in plurality, digraphs in each of which pre-modification information and post-modification information of a configuration modified by the series of operations set out in a corresponding one of the procedure logs are connected by edges via nodes corresponding one-to-one with the operations of the procedure log, and representing the collection of procedure information sets using a procedure graph generated by combining the digraphs by bringing common operations therein together.

7. The information processing apparatus according to claim 6, wherein the extracting includes identifying a pre-modification configuration and a post-modification configuration for a case where configuration modification operations according to the content of the configuration modification to be applied to the modification-target system are executed, extracting, from the procedure graph, a path extending from the pre-modification configuration to the post-modification configuration along a direction of each edge therebetween, and extracting, from the collection of procedure information sets, a series of operations corresponding to nodes on the extracted path as the procedure information set according to the content of the configuration modification to be applied to the modification-target system.

8. The information processing apparatus according to claim 1, wherein the procedure further includes sorting, when a plurality of procedure information sets are extracted by the extracting, an order of the procedure information sets according to a predetermined criterion.

9. The information processing apparatus according to claim 8, wherein the sorting includes sorting the order of the procedure information sets in such a manner that a procedure information set including operations used more by unspecified users is placed higher in rank.

10. The information processing apparatus according to claim 8, wherein the sorting includes sorting the order of the procedure information sets in such a manner that a procedure information set including operations used more by a user managing the modification-target system is placed higher in rank.

11. The information processing apparatus according to claim 8, wherein the sorting includes sorting the order of the procedure information sets in such a manner that a procedure information set including fewer operations is placed higher in rank.

12. The information processing apparatus according to claim 8, wherein the sorting includes sorting the order of the procedure information sets in such a manner that a procedure information set taking less operational time according to operations included therein is placed higher in rank.

13. The information processing apparatus according to claim 8, wherein the sorting includes sorting the order of the procedure information sets in such a manner that a procedure information set having a higher ratio of operations executable on the modification-target system against total operations included in the procedure information set is placed higher in rank.

14. An information processing method comprising:
acquiring, by a processor, a procedure log indicating a series of operations for a configuration modification, input to a management-target system and including, into a collection of procedure information sets, the procedure log after replacing a specific information piece in the procedure log with a corresponding variable name;
extracting, by the processor, from the collection of procedure information sets, a procedure information set indicating an operating procedure according to a content of the configuration modification to be applied to a modification-target system; and
replacing, by the processor, a variable name in the extracted procedure information set with a corresponding specific information piece of the modification-target system, which specific information piece is acquired from a configuration information set defining a configuration of the modification-target system.

15. A non-transitory computer-readable storage medium storing an information processing program, the information processing program causing a computer to perform a procedure comprising:
acquiring a procedure log indicating a series of operations for a configuration modification, input to a management-target system and including, into a collection of procedure information sets, the procedure log after replacing a specific information piece in the procedure log with a corresponding variable name;
extracting, from the collection of procedure information sets, a procedure information set indicating an operating procedure according to a content of the configuration modification to be applied to a modification-target system; and
replacing a variable name in the extracted procedure information set with a corresponding specific information piece of the modification-target system, which specific information piece is acquired from a configuration information set defining a configuration of the modification-target system.

* * * * *